(12) United States Patent
Zerenner et al.

(10) Patent No.: US 8,301,535 B1
(45) Date of Patent: Oct. 30, 2012

(54) SYSTEM AND METHOD FOR ANALYZING AND SEARCHING FINANCIAL INSTRUMENT DATA

(75) Inventors: Ernest H. Zerenner, Wilmington, DE (US); Gilbert A. Segal, Hockessin, DE (US); Gregory James Zerenner, Newark, DE (US)

(73) Assignee: Power Financial Group, Inc., Wilmington, DE (US)

( * ) Notice: Subject to any disclaimer, the term of this patent is extended or adjusted under 35 U.S.C. 154(b) by 1409 days.

(21) Appl. No.: 09/676,374

(22) Filed: Sep. 29, 2000

(51) Int. Cl.
*G06Q 40/00* (2006.01)
(52) U.S. Cl. ............... 705/36 R; 705/37; 705/44
(58) Field of Classification Search .......... 706/36, 706/37, 44
See application file for complete search history.

(56) References Cited

U.S. PATENT DOCUMENTS

| | | | |
|---|---|---|---|
| 4,209,845 A | 6/1980 | Berger et al. | 364/900 |
| 4,334,270 A | 6/1982 | Towers | 364/300 |
| 4,566,066 A | 1/1986 | Towers | |
| 4,611,280 A | 9/1986 | Linderman | 364/300 |
| 4,648,037 A | 3/1987 | Valentino | |
| 4,674,044 A | 6/1987 | Kalmus et al. | 364/408 |
| 4,774,666 A | 9/1988 | Miyao et al. | 364/419 |
| 4,823,265 A | 4/1989 | Nelson | 364/408 |
| 4,846,687 A | 7/1989 | White et al. | 434/112 |
| 4,870,610 A | 9/1989 | Belfer | 364/900 |
| 4,878,843 A | 11/1989 | Kuch | 434/112 |
| 4,961,139 A | 10/1990 | Hong et al. | |
| 4,989,141 A | 1/1991 | Lyons et al. | |
| 5,101,353 A | 3/1992 | Lupien et al. | |
| 5,161,103 A | 11/1992 | Kosaka et al. | |
| 5,169,342 A | 12/1992 | Steele et al. | 434/112 |
| 5,189,056 A | 2/1993 | Orlando et al. | |
| 5,193,056 A | 3/1993 | Boes | |
| 5,218,700 A | 6/1993 | Beechick | 395/259.2 |
| 5,220,500 A | 6/1993 | Baird et al. | |
| 5,247,575 A | 9/1993 | Sprague et al. | |
| 5,257,938 A | 11/1993 | Tien | 434/128 |
| 5,260,999 A | 11/1993 | Wyman | 384/4 |
| 5,262,942 A | 11/1993 | Earle | 364/408 |
| 5,270,922 A | 12/1993 | Higgins | 364/408 |
| 5,297,031 A | 3/1994 | Gutterman et al. | 364/408 |
| 5,297,032 A | 3/1994 | Trojan et al. | |
| 5,302,132 A | 4/1994 | Corder | 434/156 |

(Continued)

FOREIGN PATENT DOCUMENTS

GB 2161003 1/1986

(Continued)

OTHER PUBLICATIONS

AIQ Systems (www.aiqsystems.com).*

(Continued)

*Primary Examiner* — Daniel S Felten
(74) *Attorney, Agent, or Firm* — Woodcock Washburn LLP

(57) ABSTRACT

Systems and methods for financial data analysis are provided. A system is provided wherein financial data associated with stocks and stock options is collected from multiple sources and calculations performed thereon to derive values for a set of searchable screening parameters related to searching stock option spreads. Users may access the system and provide values and ranges of values for searching the set of searchable screening parameters. In response, users are presented with the set of option spreads, in sorted order, that satisfy the user-supplied search values. Users may select to execute an option spread in which case the system automatically executes the plurality of option trades that underly the spread.

48 Claims, 40 Drawing Sheets

U.S. PATENT DOCUMENTS

| | | | |
|---|---|---|---|
| 5,347,452 | A | 9/1994 | Bay, Jr. .................... 364/408 |
| 5,349,368 | A | 9/1994 | Takeda et al. ................ 345/115 |
| 5,414,838 | A | 5/1995 | Kolton et al. ................ 395/600 |
| 5,497,317 | A | 3/1996 | Hawkins et al. |
| 5,502,637 | A | 3/1996 | Beaulieu et al. |
| 5,537,618 | A | 7/1996 | Boulton et al. ............... 395/161 |
| 5,544,281 | A | 8/1996 | Maruoka et al. ................ 395/68 |
| 5,590,325 | A | 12/1996 | Kolton et al. |
| 5,594,910 | A | 1/1997 | Filepp et al. |
| 5,630,123 | A | 5/1997 | Hogge .......................... 395/607 |
| 5,644,727 | A | 7/1997 | Atkins |
| 5,675,746 | A | 10/1997 | Marshall |
| 5,741,136 | A | 4/1998 | Kirksey et al. ................ 434/169 |
| 5,749,077 | A | 5/1998 | Campbell |
| 5,754,939 | A | 5/1998 | Herz et al. ...................... 455/4.2 |
| 5,761,661 | A | 6/1998 | Coussens et al. .................. 707/9 |
| 5,784,696 | A | 7/1998 | Melnikoff ...................... 705/36 |
| 5,809,483 | A | 9/1998 | Broka et al. ..................... 705/37 |
| 5,854,997 | A | 12/1998 | Sukeda et al. ..................... 704/3 |
| 5,862,223 | A | 1/1999 | Walker et al. ................... 380/25 |
| 5,862,325 | A | 1/1999 | Reed et al. ............... 395/200.31 |
| 5,864,871 | A | 1/1999 | Kitain et al. .................. 707/104 |
| 5,893,079 | A | 4/1999 | Cwenar |
| 5,911,136 | A | 6/1999 | Atkins ............................. 705/36 |
| 5,913,202 | A | 6/1999 | Motoyama ..................... 705/35 |
| 5,918,217 | A | 6/1999 | Maggioncalda et al. ....... 705/36 |
| 5,978,778 | A | 11/1999 | O'Shaughnessy .............. 705/36 |
| 6,012,042 | A | 1/2000 | Black et al. ..................... 705/36 |
| 6,021,397 | A | 2/2000 | Jones et al. |
| 6,049,783 | A | 4/2000 | Seagal et al. ..................... 705/37 |
| 6,058,378 | A | 5/2000 | Clark et al. ..................... 705/37 |
| 6,064,985 | A | 5/2000 | Anderson |
| 6,078,924 | A | 6/2000 | Ainsbury et al. |
| 6,226,623 | B1 | 5/2001 | Schein et al. |
| 6,317,726 | B1 | 11/2001 | O'Shaughnessy .............. 705/36 |
| 6,321,212 | B1 | 11/2001 | Lange ............................. 705/37 |
| 6,839,686 | B1 | 1/2005 | Galant |
| 7,024,384 | B2 | 4/2006 | Daughtery, III |
| 7,165,042 | B1 | 1/2007 | Segal et al. ...................... 705/36 |
| 7,212,997 | B1 | 5/2007 | Pine et al ........................ 705/36 |
| 2001/0056392 | A1 | 12/2001 | Daugherty, III ............... 705/36 |
| 2002/0128955 | A1 | 9/2002 | Brady et al. |
| 2002/0138390 | A1 | 9/2002 | May |
| 2002/0174056 | A1 | 11/2002 | Sefein et al. |
| 2003/0023536 | A1 | 1/2003 | Hollerman et al. |
| 2003/0028468 | A1 | 2/2003 | Wong et al. |
| 2003/0033240 | A1 | 2/2003 | Balson et al. |
| 2003/0069821 | A1 | 4/2003 | Williams |
| 2003/0069826 | A1 | 4/2003 | Guidi et al. |
| 2003/0101125 | A1 | 5/2003 | McGill et al. |
| 2003/0139993 | A1 | 7/2003 | Feuerverger |
| 2004/0068457 | A1 | 4/2004 | Tao et al. |
| 2004/0267657 | A1 | 12/2004 | Hecht |
| 2005/0015449 | A1 | 1/2005 | Klos et al. |
| 2005/0075962 | A1 | 4/2005 | Dunne |
| 2005/0108148 | A1 | 5/2005 | Carlson |
| 2005/0131796 | A1 | 6/2005 | Bridges et al. |
| 2005/0216390 | A1 | 9/2005 | Snider et al. |
| 2005/0228735 | A1 | 10/2005 | Duquette |
| 2006/0020526 | A1 | 1/2006 | Viner |
| 2006/0080193 | A1 | 4/2006 | McMurtray et al. |
| 2006/0259417 | A1 | 11/2006 | Marynowski et al. |

FOREIGN PATENT DOCUMENTS

| | | |
|---|---|---|
| GB | 2210714 | 6/1989 |
| WO | WO 97/42591 | 11/1997 |
| WO | WO 98/09229 | 3/1998 |

OTHER PUBLICATIONS www.poweropt.com.*
Track Data Announces Its AIQ Systems Division Released Its Option Analysis Software Product—OptionExpert Business Wire: New York: Nov. 9, 1999.*
PowerOptions, First in WEB based interactive options search engines, http://www.poweropt.com/, 2001, 1 page.
OptionFind.com, www.optionfind.com, © 1998 Productivity Systems, 3 pages.
OptionsNewsletter: Stock Options made Easy, http://www.optionsnewsletter.com, © QuoteMedia, 18 pages.
E*Trade-research from Investors, www.etrade.com, © 1997 E*Trade Securities, 7 pages.
INVESTools-Trusted Advice for Independent Investors, www.investools.com, © 2000, 4 pages.
Yahoo!Finance, www.yahoo.com, © 2000, 2 pages.
Hoovers Online, The Business Network, www.hoovers.com, 2000, 1 page.
Covered Call Screening www.investorsmind.com, © 1996-2000 Investorsmind.com, 2 pages.
OptionsXpress-Option Screener, www.optionsxpress.com, ®2000, 1 page.
Merrill Lynch- www.newmlol.com, © 2001,15 pages.
Your Finance Resource, www.investmentdiscovery.com, 2006, 2 pages.
www.optionsearcher.com, © 2001-2006 OptionSearcher.com, 5 pages.
Optionetics.com: An Investment Education Resource for Stock and Options Traders, www.optionetics.com, © 1995-2006, 19 pages.
OptionMonitor, Your Source for Covered Call Option Data and Analysis, www.optionmonitor.com, © 2001-2006 Option Review, Inc., 10 pages.
www.msn.com, Home page, 2006 © Microsoft, 13 pages.
Financial Planning and Small Business Software for Individuals-Official Quicken Site, http://quicken.intuit.com, © 2006 Intuit, Inc., 10 pages.
Carey, T.W., "Calls of the Mild", *Barron's Technology Week*, Apr. 29, 2002, 1 page.
OptionFind.com, www.optionfind.com, Feb. 24, 2000, 6 pages.
OptionsXpress-Option Screener, www.optionsxpress.com, Oct. 3, 2005, 4 pages.
Thomas Evan., Power Options Plus, Feb. 2002, 31(3), 56-57.
PowerOptions Plus.com, The Best Way to Find, Compare, Analyze, and make Money on Option Investions, www.poweropt.com, © 1997-2002, 1 page.
www.poweropt.com, PowerOptions, Oct. 12, 1999 and Jun. 6, 2002, web.archive.org (Wayback Machine), pp. 1-9.
In the United States Patent and Trademark Office, in re.: U.S. Appl. No. 11/243,216, filed Oct. 4, 2005, Non-Final Office Action dated Mar. 11, 2008, 23 pages.
In the United States Patent and Trademark Office, in re.: U.S. Appl. No. 11/611,043, filed Dec. 14, 2006, Non-Final Office Action dated Feb. 4, 2009, 6 pages.
In the United States Patent and Trademark Office, in re.: U.S. Appl. No. 10/607,418, filed Jun. 26, 2003, Non-Final Office Action dated Dec. 27, 2007, 11 pages.
In the United States Patent and Trademark Office, in re.: U.S. Appl. No. 10/607,418, filed Jun. 26, 2003, Non-Final Office Action dated Jul. 20, 2009, 23 pages.
In the United States Patent and Trademark Office, in re.: U.S. Appl. No. 10/607,418, filed Jun. 26, 2003, Non-Final Office Action dated Jun. 6, 2008, 20 pages.
In the United States Patent and Trademark Office, in re.: U.S. Appl. No. 10/607,418, filed Jun. 26, 2003, Non-Final Office Action dated May 16, 2007, 11 pages.
In the United States Patent and Trademark Office, in re.: U.S. Appl. No. 10/607,418, filed Jun. 26, 2003, Final Office Action dated Nov. 24, 2008, 19 pages.
In the United States Patent and Trademark Office, in re.: U.S. Appl. No. 11/820,952, filed June 21, 2007, Non Final Office Action dated Oct. 5, 2009, 8 pages.
U.S. Appl. No. 10/607,418, filed Jun. 2003, Zerenner, et al.
U.S. Appl. No. 11/243,216, filed Oct. 2005, Zerenner, E.
U.S. Appl. No. 11/611,043, filed Dec. 2006, Segal, G. et al.
U.S. Appl. No. 11/820,952, filed Jun. 2007, Zerenner, et al.
Boczar, "An Introduction to options and other financial derivative strategies", Trusts & Estates, Feb. 1997, vol. 136, Issue 3, p. 43, 20 pages.
Poweropt.com, "PowerOptionsPlus—Tool Menu, Easy Startup Guide, Registration p.", http://www.poweropt.com/toolmenu.asp, http://www.poweropt.com/startupquide.asp, http://www.poweropt.com/pricing.asp, accessed Dec. 13, 2011, 7 pages.

U.S. Appl. No. 12/823,203: Non-Final Rejection dated Jan. 5, 2012, 40 pages.
"Data Broadcasting Corporation Unveils Multiple-User Real-Time Stock Market Investment Tool", PR Newswire, Apr. 8, 1997, 2 pages.
"Equity Research/Portfolio Analytics Support", Wall Street & Technology, (no month available) 1993, 136, Abstract.
"Faster Access to Newly Released Research via Investext", Information Today, Mar. 1993, 5(1).
"First Call Notes to be Available on Fidelity's MAXXESS & MAXXnet", Business Wire, Jun. 1997, 2 pages.
"Hoover's, Inc. Introduces StockScreener Free World Wide Web Service for Investors", Information Today, Sep. 1997, 45(1).
"IBM InfoSage Web-Based Service Debuts", Information Today, (no month available) 1996, 3 pages.
"On the Street Online, New & Noteworthy", Jan. 28-30, 1996.
"R.R. Donnelley Financial and IPO Crossroads Launch Highly Searchable IPO Database Website", PR Newswire, Dec. 1996, 1204, 4 pages.
Telescan Inc. (Stock analysis Software) (1995 Guide to Computerized Trading), Futures (Cedar Falls, Iowa), Jul. 1995, 3 pages.
"Telescan launches Internet's First Complete Real-Time Information and Analysis Service for the Financial Markets", PR Newswire, Apr. 5, 1995, 3 pages.
"Telescan, Inc. Launches Internet's First Complete Real-Time Information and Analysis Service for the Financial Markets", PR Newswire, Apr. 1995, 405NY036.
"Telescan, Inc. Launches ProSearch 5.0: Fast Stock Screening Software Program Targets All Investors", Business Wire, Jun. 1996, 6060617.
"Telescan, Inc. launches ProSearch 5.0: Fast Stock Screening Software Program Targets All Investors", Business Wire, Jun. 6, 1996, 3 pages.
"Telescan, Inc.", Futures, Jul. 1995, 46.
"ZDNet Introduces Inter@active Investor, Web's Most Comprehensive Source of Financial News and Information on Tech Companies", PR Newswire, Feb. 1998, 202.
Armstrong, "Navigate the Networks Like a Wall Street Pro", Business Week, Oct. 2004, 224, Abstract.
Barboza, "Reading the Tea Leaves Via Stock Analysis Software", New York Times, Sep. 21, 1997, 2 pages.
Carey, "Fidelity On-Line Express", PC Magazine, Jan. 1995, 14(1), 204(1), Abstract.
Cronin, "Is Giving Away Data a Smart Way to Profit?", Fortune, Dec. 1997, 258, Abstract.
Cullen, "Investing the High Tech Way (On-Line Products for Investors)", High Technology, Jun. 1987, 68, Abstract.
Dreyfuss, "How to Invest with Your PC", Fortune, Oct. 1990, 211(3).
Foust, "Screening Stocks on Your PC Screen", Business Week, Oct. 1993, 142(2), Abstract.

Gianturco, "Investment Software: Broker in a Box", Forbes, Inc., Apr. 8, 1996, 157(7), S82(1) 3 pages.
Gianturco, "Using Your PC to Pick the Best Fund Finder. (Steele Systems' Mutual Fund expert, Telescan's Mutual Fund Search, Value Line Publishing's Value Line Fund Analyzer and Morningstar's Ascent, Principia and Principia Plus fund-picking programs) (Forbes ASAP) (Software Review) (Evaluation)", Forbes, Oct. 1996, S41, 5 pages.
Gold, "Profile Increases Range of Online Service", Newsbytes, Jun. 1990.
Grinder, "An Overview of Financial Services Resources on the Internet", Financial Services Review, (no month available) 1997, 6(2), 125-140.
http://web.archive.org/web/19991110210901/telescan prod prolerts.htm Telescan, ProSearch Alerts, Accessed May 5, 2010.
http://web.archive.org/web/20000309144734/telescan com/telescan prod procrit.htrn Telescan, ProSearch Alerts, Accessed May 5, 2010.
Kan, "Street Smart 1.0", MacWorld, Feb. 1995, 59, Abstract.
Kawamoto, "On the Street . . . Online", New & Noteworthy, Jan. 1996, 2 pages.
Moad, "Sabre Rattled", Pc Week Executive, Jan. 29, 1996, E1-E2.
Ojala, "The Dollar Sign", http://www.onlineinc.com/database, Aug./Sep. 1996, Database, 82-88.
Price-Evans, "Investment Software: Plotting a Course on Supercharts", Investors Chronicle, Feb. 3, 1995.
Retkwa, "Financial pp. You Can Now Obtain Investment Intelligence That Rivals That of Professional Traders", Internetworld, Feb. 1996, 66(6), Abstract.
Rosen, "Fitting the Plan to the Person", the New York Times, Nov. 16, 1986, Section 12, p. 40, col. 1.
Sahgal, "Oltp Spells Success in Time-Pressed '90s", Wall Street Computer Review, Jan. 1990, S42, Abstract.
Stern, "Trade in Your Old Way of Investing: With These Electronic Tools You Can Bring the Hottest Market Data Home Quickly", Home Office Computing, Jul. 1993, 62, Abstract.
U.S. Appl. No. 10/607,418, Notice of Allowance dated Feb. 5, 2010, 14 pages.
U.S. Appl. No. 11/611,043, Final Rejection dated Nov. 24, 2009, 7 pages.
U.S. Appl. No. 11/611,043, Non-Final Office Action dated Feb. 4, 2009, 6 pages.
Weiner, "Software Packages for Investors", Fortune, (no. month available) 1986, 114, 185(3).
Yakal, "Personal Investment Software, Investment 101", PC Magazine, Nov. 19, 1996, 15(20), 341(9), 9 pages.
U.S. Appl. No. 11/820,952, Final Rejection dated Jul. 22, 2010, 7 pages.

* cited by examiner

| | | | | | | | | | | | | | | | | % To Dbl. | |
|---|---|---|---|---|---|---|---|---|---|---|---|---|---|---|---|---|---|
CY | CYVI | 44.50 | OCT 45.0 | 4.88 | 40 | 1339 | 73 | 9.6 | | 26 | 29 | 63 | 1.5 | 86 | 0.0 | 121 | 1.1 | 0.45 | 0.90 | 0.88 | 0.77 | 19 | Cypres
| | | | | | | | | | | | | 1.4 | 137 | 0.0 | 565 | 1.3 | 0.42 | 1.11 | 0.66 | 0.74 | 16 | Micror
XLNX | XLWVQ | 84.31 | OCT 85.0 | 8.25 | 13 | 198 | 86 | 8.8 | | 32 | 42 | 79 | 1.6 | 92 | 0.0 | 329 | 2.0 | 0.45 | 0.98 | 0.73 | 0.73 | 16 | Xilinix
| | | | | | | | | | | | | 1.5 | 91 | 0.0 | 131 | 1.9 | 0.44 | 0.80 | 0.85 | 0.69 | 16 | Novelli
DTI | ITQVR | 93.50 | OCT 90.0 | 7.38 | 5 | 32 | 112 | 8.2 | | 36 | 52 | 98 | 1.1 | 133 | 0.0 | 104 | 1.2 | 0.38 | 0.71 | 0.99 | 0.74 | 16 | Integra
| | | | | | | | | | | | | 1.5 | 62 | 0.0 | 29 | 0.9 | 0.40 | 1.07 | 0.67 | 0.71 | 16 | Am Tc
MU | MUYVV | 70.81 | OCT 72.5 | 7.63 | 13 | 572 | 210 | 8.0 | | 114 | 54 | 61 | 1.4 | 137 | 0.0 | 565 | 1.3 | 0.48 | 1.09 | 0.66 | 0.74 | 17 | Micror
| | | | | | | | | | | | | 1.6 | 69 | 0.0 | 325 | 1.5 | 0.44 | 0.99 | 0.60 | 0.60 | 13 | Apple
MU | MUVU | 70.81 | OCT 67.5 | 5.13 | 12 | 632 | 210 | 7.6 | | 114 | 54 | 61 | 1.4 | 137 | 0.0 | 565 | 1.3 | 0.36 | 1.15 | 0.66 | 0.74 | 16 | Micror
| | | | | | | | | | | | | 1.9 | 175 | 0.0 | 85 | 1.4 | 0.43 | 0.91 | 0.65 | 0.57 | 13 | Genzyr
XLNX | XLWVP | 84.31 | OCT 80.0 | 6.00 | 11 | 640 | 86 | 7.5 | | 32 | 42 | 79 | 1.6 | 92 | 0.0 | 329 | 2.0 | 0.36 | 1.01 | 0.73 | 0.73 | 16 | Xilinix
| | | | | | | | | | | | | 1.8 | 56 | 0.0 | 81 | 1.3 | 0.46 | 0.81 | 0.85 | 0.63 | 16 | Andre
AMGN | YAAVN | 72.00 | OCT 70.0 | 5.13 | 925 | 3155 | 91 | 7.3 | | 21 | 67 | 81 | 1.7 | 124 | 0.0 | 1,028 | 1.3 | 0.39 | 1.24 | 0.55 | 0.65 | 14 | Amger
| | | | | | | | | | | | | 1.8 | 164 | 1.0 | 114 | 1.0 | 0.37 | 1.84 | 0.39 | 0.63 | 13 | Countr
IVX | IVXVH | 38.81 | OCT 40.0 | 4.13 | 21 | 255 | 362 | 7.1 | | 20 | 61 | 67 | 1.4 | 183 | 0.0 | 159 | 0.5 | 0.45 | 0.65 | 1.10 | 0.69 | 16 | vax C
| | | | | | | | | | | | | 1.6 | 218 | 0.0 | 92 | 0.9 | 0.34 | 0.83 | 0.86 | 0.75 | 16 | King P
CMVI | COZVR | 91.56 | OCT 90.0 | 6.38 | 12 | 679 | 100 | 7.1 | | 20 | 51 | 61 | 1.2 | 100 | 0.0 | 156 | 1.7 | 0.41 | 0.82 | 0.72 | 0.58 | 13 | Comve
| | | | | | | | | | | | | 1.7 | 88 | 0.0 | 2,808 | 1.8 | 0.46 | 1.10 | 0.49 | 0.55 | 13 | Oracle
AMAT | ANCVO | 77.38 | OCT 75.0 | 4.88 | 40 | 3377 | 49 | 6.5 | | 48 | 38 | 53 | 1.5 | 113 | 0.0 | 808 | 1.7 | 0.39 | 0.98 | 0.61 | 0.61 | 13 | Apple
| | | | | | | | | | | | | | | 0.0 | 431 | 1.9 | 0.33 | 0.78 | 0.85 | 0.69 | 14 | Novell

| Stock Symbol | Stock Price | Sell Option | Strike | Bid | Buy Option | Strike | Ask | % Return | Net Credit | Break Even | Volatility | Company |
|---|---|---|---|---|---|---|---|---|---|---|---|---|
| T | 30.56 | TVG | 35.0 | 4.88 | TVF | 30.0 | 1.50 | 207.69 | 3.38 | 31.63 | 0.37 | AT&T Corp. |
| TRRA | 40.00 | TURVY | 45.0 | 9.25 | TURVX | 40.0 | 5.88 | 207.69 | 3.38 | 41.63 | 0.74 | Terra Bitwav, Inc. |
| DOW | 25.56 | DOWWF | 30.0 | 4.63 | DOWVE | 25.0 | 1.25 | 207.69 | 3.38 | 26.63 | 0.43 | Dow Chemical Co. (Th |
| ANDW | 30.06 | AQNVG | 35.0 | 6.25 | AQNVF | 30.0 | 2.94 | 196.30 | 3.31 | 31.69 | 0.85 | Andrew Corp. |
| BMCS | 25.25 | BCQVF | 30.0 | 5.63 | BCQVE | 25.0 | 2.50 | 166.67 | 3.13 | 26.88 | 1.33 | BMC Software Inc. |
| CD | 13.00 | CDVC | 15.0 | 2.19 | CDVV | 12.5 | 0.63 | 166.67 | 1.56 | 13.44 | 0.54 | Cendant Corp. |
| GENU | 8.06 | GQHVB | 10.0 | 2.13 | GQHVU | 7.5 | 0.56 | 166.67 | 1.56 | 8.44 | 0.77 | Genuity Inc. |
| DCX | 50.56 | DCXVK | 55.0 | 4.63 | DCXVJ | 50.0 | 1.50 | 166.67 | 3.13 | 51.88 | 0.25 | Daimlerchrysler AG |
| FON | 30.25 | FONVG | 35.0 | 5.38 | FONVF | 30.0 | 2.25 | 166.67 | 3.13 | 31.88 | 0.59 | Sprint Corp. |
| DT | 40.00 | DTVI | 45.0 | 5.50 | DTVH | 40.0 | 2.50 | 150.00 | 3.00 | 42.00 | 0.57 | Deutsche Telekom AG |
| ASYT | 26.00 | QQYVF | 30.0 | 5.75 | QQYVE | 25.0 | 2.75 | 150.00 | 3.00 | 27.00 | 1.30 | Asyst Technologies I |
| HLIT | 30.00 | LOQVG | 35.0 | 7.13 | LOQVF | 30.0 | 4.13 | 150.00 | 3.00 | 32.00 | 1.69 | Harmonic Lightwaves |
| PCLN | 25.94 | PUZVF | 30.0 | 5.75 | PUZVE | 25.0 | 2.75 | 150.00 | 3.00 | 27.00 | 1.00 | Priceline.com Inc. |
| HD | 50.50 | HDVK | 55.0 | 5.13 | HDVJ | 50.0 | 2.25 | 135.29 | 2.88 | 52.13 | 0.48 | Home Depot Inc.. |
| CNET | 30.69 | QKZVG | 35.0 | 5.88 | QKWVF | 30.0 | 3.00 | 135.29 | 2.88 | 32.13 | 1.00 | CNET Inc. |
| GAP | 12.81 | GAPVC | 15.0 | 2.31 | GAPVV | 12.5 | 0.88 | 135.29 | 1.44 | 13.56 | 0.29 | Great Atlantic & Pat. |
| LU | 41.13 | LUVI | 45.0 | 4.88 | LUVH | 40.0 | 2.00 | 135.29 | 2.88 | 42.13 | 0.58 | Lucent Technologies |
| MSFT | 70.06 | MSQVO | 75.0 | 6.13 | MSQVN | 70.0 | 3.25 | 135.29 | 2.88 | 72.13 | 0.33 | Microsoft Corp |

Figure 14A

Power Options

Prices from 9/7/00 9:08:43 PM EST    October ordered by Percent Return - Not Filtered    Bear-Call Spread    Wizard

| Stock Symbol | Stock Price | Sell Option | Strike | Bid | Buy Option | Strike | Ask | % Return | Net Credit | Break Even | Volatility | Company |
|---|---|---|---|---|---|---|---|---|---|---|---|---|
| PWJ | 69.75 | PWJJM | 65.0 | 5.50 | PWJJN | 70.0 | 1.94 | 247.83 | 3.56 | 68.56 | 0.68 | Paine Webber Group I |
| WFC | 45.00 | WFCJH | 40.0 | 5.63 | WFCJI | 45.0 | 2.25 | 207.69 | 3.38 | 43.38 | 0.39 | Wells Fargo & Co. |
| FDX | 39.82 | FDXJG | 35.0 | 5.50 | FDXJH | 40.0 | 2.25 | 185.71 | 3.25 | 38.25 | 0.36 | Federal Express Corp |
| FNV | 7.31 | FNVJA | 5.0 | 2.75 | FNVJU | 7.5 | 1.19 | 166.67 | 1.56 | 6.56 | 0.94 | FINOVA Group Inc. (T |
| UPS | 54.56 | UPSJJ | 50.0 | 5.50 | UPSJK | 55.0 | 2.38 | 166.67 | 3.13 | 53.13 | 0.22 | United Parcel Servic |
| SCG | 28.88 | SCGJE | 25.0 | 3.75 | SCGJF | 30.0 | 0.69 | 158.06 | 3.06 | 28.06 | 0.30 | Scana Corp. |
| BA | 58.50 | BAJK | 55.0 | 5.75 | BAJL | 60.0 | 2.69 | 158.06 | 3.06 | 58.06 | 0.32 | Boeing Co. (The) |
| XOM | 83.75 | XOMJP | 80.0 | 5.50 | XOMJQ | 85.0 | 2.50 | 150.00 | 3.00 | 83.00 | 0.24 | Exxon Mobil Corp. |
| GMH | 34.94 | GMHJF | 30.0 | 5.63 | GMHJG | 35.0 | 2.63 | 150.00 | 3.00 | 33.00 | 0.57 | General Motors Corp. |
| SLE | 19.63 | SLEJW | 17.5 | 2.31 | SLEJD | 20.0 | 0.81 | 150.00 | 1.50 | 19.00 | 0.24 | Sara Lee Corp. |
| PKD | 7.31 | PKDJA | 5.0 | 2.25 | PKDJU | 7.5 | 0.75 | 150.00 | 1.50 | 6.50 | 0.59 | Parker Drilling Co. |
| GE | 59.00 | GEJK | 55.0 | 5.00 | GEWJL | 60.0 | 2.06 | 142.42 | 2.94 | 57.94 | 0.33 | General Electric Co. |
| FOX | 28.63 | FOXJE | 25.0 | 4.25 | FOXJF | 30.0 | 1.31 | 142.42 | 2.94 | 27.94 | 0.35 | Fox Entertainment Gr |
| KMG | 64.50 | KMGJL | 60.0 | 6.13 | KMGJM | 65.0 | 3.25 | 135.29 | 2.88 | 62.88 | 0.29 | Kerr-McGee Corp. |
| KR | 22.25 | KRJD | 20.0 | 2.63 | KRJX | 22.5 | 1.19 | 135.29 | 1.44 | 21.44 | 0.44 | Kroger Co. (The) |
| BAC | 54.38 | BACJJ | 50.0 | 5.75 | BACJK | 55.0 | 2.88 | 135.29 | 2.88 | 52.88 | 0.40 | BankAmerica Corp. |
| RD | 63.25 | RDJL | 60.0 | 4.38 | RDJM | 65.0 | 1.50 | 135.29 | 2.88 | 62.88 | 0.23 | Royal Dutch Petroleu |
| TX | 54.13 | TXJJ | 50.0 | 5.00 | TXJK | 55.0 | 2.13 | 135.29 | 2.88 | 52.88 | 0.30 | Texaco Inc. |

PowerOptions

*Turning options into decisions.*

Findor | Portfolios | Gains | Reports | myAccount | OneStrike | Calculator | Helpers

Profit/Loss — SnapShot

☑ Email my portfolios every day.  Standard Spreads ▾  9/29/00 1:47:32 PM   Sold Portfolios

| Ln | Issue Symbol | Description | Qty | Trans. Date | Age | Net Cost $ | Net Position Price | Last Price | Change Today | Position Change | Gain/ Loss $ | Gain/ loss % | Market Value |
|----|--------------|-------------|-----|-------------|-----|------------|--------------------|------------|--------------|-----------------|--------------|--------------|--------------|
| 1 | XLNX | Xilinx Inc. | 200 | 7/29/00 | 62 | 16,400 | 82.00 | 85.44 | -2.31 | 3.44 | 687.50 | 4.2 | 17,087.50 |
| 2 | XLWJQ | OCT 85.00 CALL IXLNX | -2 | 7/30/00 | (22) | -7,100 | 35.50 | 5.75 | -1.63 | -29.75 | 5,950.00 | 83.8 | -1,150.00 |
|   |   |   |   |   | Total Costs | 9,300 |   |   |   |   | Market Value Sum |   | 15,937.50 |
| Starting Basis 100,000.00 |   |   |   |   |   |   |   |   |   |   | Cash On Hand |   | 88,700.00 |
|   |   |   |   | Return on Account | 4.6 % |   |   |   |   |   | Total Value |   | 104,637.50 |

ALERT - The following options dropped 90% in price:
Line 2 (underlined hot links go to an action page)

A "?" for Cur. Price means no price was given.

| Symbol | Description | Type Trade | Quantity | Trans.Date | Comm/Fee | Price(Decimals) |
|--------|-------------|------------|----------|------------|----------|-----------------|
|  | Stock ▾ | Bought ▾ |  | 5 / 29 / 2000 |  |  |
| Unc no. | | INSERT EDIT REPLACE DELETE CLOSE | | | HELP | |

Figure 21A

| | | | | | | | | | | | | | | |
|---|---|---|---|---|---|---|---|---|---|---|---|---|---|---|
| 62.5 | CWYJZ | 5.00 | 5.01 | 16 | 29853 | 8.5 | 6.2% | 5.7% | 0.60 | 0.47 | 11 | CWYVZ | 3.25 | 3.19 | 85 | 10084 | 5.4 |
| 65.0 | CWYJM | 3.75 | 3.79 | 1800 | 16278 | 6.2 | 8.1% | 5.8% | 0.51 | 0.47 | 9 | CWYVM | | | 572 | 11150 | |
| 67.5 | CWYJU | 2.63 | 2.81 | 64 | 12543 | 4.3 | 10.2% | 3.9% | 0.41 | 0.44 | 8 | CWYVU | 5.88 | 5.96 | 137 | 1361 | 10.1 |
| | | | | | | | | | | | | | | | | | |
| 62.5 | CWYAZ | 8.50 | 8.51 | 3 | 5113 | | 12.9% | 11.2% | 0.62 | 0.47 | 19 | CWYMZ | | | 0 | 2138 | |
| 63.4 | ZYZAV | 194.50 | 8.08 | 0 | 308 | 0.0 | 0.0% | 303.7% | 0.60 | 0.00 | 0 | ZYZMV | 0.00 | 0.00 | 0 | 530 | 0.0 |
| 65.0 | CWYAM | 7.50 | 7.34 | 226 | 18827 | | 15.3% | 11.5% | 0.56 | 0.47 | 19 | CWYMM | | 7.03 | 105 | 7283 | 12.6 |
| 66.6 | ZYZAW | 189.63 | 6.65 | 5 | 1456 | 0.0 | 0.0% | 284.6% | 0.53 | 0.00 | 0 | ZYZMW | | 0.00 | 0 | 787 | 0.0 |
| | | | | | | | | | | | | | | | | | |
| 55.0 | CWYDK | 10.00 | 15.02 | 0 | 38 | | 14.9% | 11.2% | 0.76 | 0.53 | 31 | CWYPK | | 4.32 | 140 | 467 | 7.3 |
| 60.0 | CWYDL | 12.38 | 12.23 | 5 | 140 | 24.0 | 16.5% | 13.3% | 0.68 | 0.47 | 25 | CWYPL | 6.50 | 6.13 | 45 | 235 | 11.3 |
| 65.0 | CWYDM | 10.00 | 9.86 | 27 | 761 | 18.6 | 20.6% | 15.4% | 0.59 | 0.47 | 22 | CWYPM | | 8.58 | 66 | 227 | |
| 70.0 | CWYDN | 7.50 | 7.90 | 30 | 913 | 13.3 | 24.2% | 10.7% | 0.51 | 0.44 | 19 | CWYPN | 11.00 | 11.43 | 0 | 126 | 20.8 |
| | | | | | | | | | | | | | | | | | |
| 60.0 | WVAL | 17.50 | 17.58 | 61 | 19069 | 37.7 | 29.4% | 21.3% | 0.70 | 0.47 | 38 | WVML | | 8.79 | 7 | 5977 | |
| 62.5 | WVAZ | 16.75 | 16.47 | 0 | 1526 | 35.5 | 32.6% | 24.1% | 0.68 | 0.47 | 38 | WVMZ | 10.13 | 9.98 | 0 | 873 | 18.8 |
| 65.0 | WVAM | 15.50 | 15.13 | 207 | 19403 | 32.0 | 34.4% | 23.8% | 0.65 | 0.47 | 31 | WVMM | | 11.23 | 50 | 3937 | 20.7 |
| 67.5 | WVAU | 14.38 | 14.45 | 55 | 4639 | 29.0 | 36.4% | 21.3% | 0.63 | 0.47 | 31 | WVMU | 12.63 | 12.55 | 0 | 647 | 24.6 |
| | | | | | | | | | | | | | | | | | |
| 55.0 | VYCAK | 25.63 | 24.97 | 20 | 1538 | 67.0 | 43.8% | 26.2% | 0.78 | 0.47 | 50 | VYCMK | | 8.73 | 5 | 8174 | |
| 60.0 | VYCAL | 23.38 | 22.83 | 24 | 2092 | 57.7 | 48.1% | 30.5% | 0.74 | 0.47 | 44 | VYCML | 11.63 | 10.45 | 0 | 493 | 22.2 |
| 65.0 | VYCAM | 21.00 | 20.80 | 74 | 912 | 51.2 | 53.8% | 33.3% | 0.70 | 0.47 | 44 | VYCMM | | 12.00 | 5 | 361 | 27.0 |
| 70.0 | VYCAN | 19.50 | 19.13 | 53 | 1391 | 43.9 | 57.7% | 27.9% | 0.67 | 0.47 | 44 | VYCMN | 16.25 | 15.33 | 0 | 358 | 34.1 |

Figure 22B

POWEROPTIONS
BULL PUT SPREAD CHAIN FOR Agilent Technologies Corp. (A)

Prices for Monday 9/25/00 2:28:06 PM EST.

Price = $49.13    October Expiration date 10/21/00  26 days left

| Strike | Sell Option | Bid Price | Strike | Buy Option | Ask Price | % Return | Net Credit | Break Even |
|---|---|---|---|---|---|---|---|---|
| 45 | AVI | 1.44 | 40 | AVH | 0.31 | 29.20 | 1.13 | 43.87 |
| 50 | AVJ | 3.63 | 45 | AVI | 1.63 | 66.67 | 2.00 | 48.00 |
| 55 | AVK | 7.13 | 50 | AVJ | 3.63 | 233.33 | 3.50 | 51.50 |
| 60 | AVL | 11.13 | 55 | AVK | 7.38 | 300.00 | 3.75 | 56.25 |
| 65 | AVM | 15.63 | 60 | AVL | 11.38 | 566.67 | 4.25 | 60.75 |

Price = $49.13    November Expiration date 11/18/00  54 days left

| Strike | Sell Option | Bid Price | Strike | Buy Option | Ask Price | % Return | Net Credit | Break Even |
|---|---|---|---|---|---|---|---|---|
| 45 | AWI | 3.13 | 40 | AWH | 1.44 | 51.06 | 1.69 | 43.31 |
| 50 | AWJ | 5.50 | 45 | AWI | 3.13 | 90.11 | 2.37 | 47.63 |
| 55 | AWK | 8.50 | 50 | AWJ | 5.50 | 150.00 | 3.00 | 52.00 |
| 60 | AWL | 12.13 | 55 | AWK | 8.50 | 264.96 | 3.63 | 56.37 |
| 65 | AWM | 16.38 | 60 | AWL | 12.13 | 566.67 | 4.25 | 60.75 |

Price = $49.13    January Expiration date 1/20/00  117 days left

| Strike | Sell Option | Bid Price | Strike | Buy Option | Ask Price | % Return | Net Credit | Break Even |
|---|---|---|---|---|---|---|---|---|
| 45 | AMI | 5.13 | 40 | AMH | 3.00 | 74.22 | 2.13 | 42.87 |
| 50 | AMJ | 7.75 | 45 | AMI | 5.13 | 110.08 | 2.62 | 47.38 |
| 55 | AMK | 10.75 | 50 | AMJ | 7.75 | 150.00 | 3.00 | 52.00 |
| 60 | AML | 13.88 | 55 | AMK | 10.75 | 167.38 | 3.13 | 56.87 |
| 65 | AMM | 18.13 | 60 | AML | 13.88 | 566.67 | 4.25 | 60.75 |

Price = $49.13    February Expiration date 2/17/00  145 days left

| Strike | Sell Option | Bid Price | Strike | Buy Option | Ask Price | % Return | Net Credit | Break Even |
|---|---|---|---|---|---|---|---|---|
| 45 | ANI | 6.00 | 40 | ANH | 3.88 | 73.61 | 2.12 | 42.88 |
| 50 | ANJ | 8.63 | 45 | ANI | 6.00 | 110.97 | 2.63 | 47.37 |
| 55 | ANK | 11.75 | 50 | ANJ | 8.63 | 165.96 | 3.12 | 51.88 |
| 60 | ANL | 15.13 | 55 | ANK | 11.75 | 208.64 | 3.38 | 56.62 |
| 65 | ANM | 18.88 | 60 | ANL | 15.13 | 300.00 | 3.75 | 61.25 |

Figure 23

PowerOptions

| | | | | | | | | More Information |
|---|---|---|---|---|---|---|---|---|
| 1 | WESTBURNE | T.WBI | 1.0 | 1.0 | 0.51 | 4 | N/A | 1.76 | 1.86 | ... |
| 2 | RICHELIEU | T.RCH | 1.3 | 1.3 | 0.29 | N/A | 0.25 | 0.95 | 1.09 | ... |
| 3 | LOWES COS | LOW | 1.6 | 1.6 | 0.73 | 0 | 0.54 | 2.24 | 2.73 | ... |
| 4 | FASTENAL | FAST | 1.6 | 1.7 | 0.55 | 0 | 0.56 | 2.17 | 2.67 | ... |
| 4 | HUGHES SUP | HUG | 1.7 | 1.7 | 0.96 | 1 | 0.96 | 3.06 | 3.41 | ... |
| 6 | HOME DEPOT | HD | 1.8 | 1.9 | 0.36 | 0 | 0.31 | 1.25 | 1.55 | ... |
| 7 | BUILDING M | BMHC | 1.8 | 2.0 | 0.55 | 2 | 0.66 | 1.78 | 1.87 | ... |
| 8 | SODISCO-HQ | T.SOD | 2.0 | 2.0 | 0.33 | N/A | N/A | 0.91 | 0.40 | ... |
| 9 | UNIVL FST | UFPI | 2.4 | 2.4 | 0.63 | -5 | 0.49 | 1.65 | 1.85 | ... |
| 10 | BARNETT IN | BNTT | 2.7 | 2.7 | 0.19 | -17 | N/A | 1.16 | 0.00 | ... |
| 11 | HUTTIG BLD | HBP | 3.0 | 3.0 | 0.24 | -25 | 0.31 | 0.93 | 1.07 | ... |
| 12 | HOMEBASE I | HBI | 3.5 | 3.5 | 0.07 | 0 | -0.12 | -0.30 | 0.00 | ... |

*Patented Technologies*    TOP · TUTORIAL · F.A.Q. · LINKS · HOME · EMAIL    *Copyright © 1997-2000 by PowerOptions - All Rights Reserved*

Figure 25

High P/E

Prices from Friday, 9/8/00 9:05:56 PM EST.

| Stock Sym | Option Sym | Stock Price | Expire/Strike | Opt. Bid | Opt Vol. | Open Int. | % Opt Vol. | % not Assnd | % Assnd | Epsg | P/E | % Rnge | Avg. Rec. | % Vol | % Yld | Shrs (Mil) | Beta | Delta | BS Ratio | Volat | Imp. Volat | % To Dbl |
|---|---|---|---|---|---|---|---|---|---|---|---|---|---|---|---|---|---|---|---|---|---|---|
| MMCN | CMQJB | 111.19 | OCT 110.0 | 13.13 | 1 | 120 | 43 | 13.4 | 12.2 | 306 | 741 | 89 | 2.4 | 93 | 0.0 | 33 | 1.5 | 0.59 | 0.77 | 1.07 | 0.81 | 17 |
| MMCN | CMQJC | 111.19 | OCT 115.0 | 10.63 | 1 | 28 | 43 | 10.6 | 14.4 | 306 | 741 | 89 | 2.4 | 93 | 0.0 | 33 | 1.5 | 0.54 | 0.71 | 1.07 | 0.81 | 16 |
| EBAY | QXBJM | 65.80 | OCT 65.0 | 6.50 | 170 | 628 | 52 | 11.0 | 9.6 | 100 | 731 | 27 | 1.7 | 71 | 0.0 | 268 | 2.2 | 0.59 | 0.74 | 0.91 | 0.68 | 14 |
| EBAY | QXBJU | 65.80 | OCT 67.5 | 6.00 | 0 | 352 | 52 | 10.0 | 12.9 | 100 | 731 | 27 | 1.7 | 71 | 0.0 | 268 | 2.2 | 0.54 | 0.78 | 0.91 | 0.74 | 14 |
| LHSP | XQLJF | 28.69 | OCT 30.0 | 2.81 | 10 | 2218 | 67 | 10.9 | 15.9 | 41 | 631 | 23 | 1.5 | 34 | 0.0 | 142 | 0.9 | 0.52 | 0.87 | 0.94 | 0.83 | 16 |
| NTAP | ULMJB | 113.56 | OCT 110.0 | 14.38 | 60 | 394 | 97 | 14.5 | 10.9 | 41 | 631 | 90 | 1.2 | 129 | 0.0 | 312 | 2.4 | 0.61 | 0.90 | 0.90 | 0.79 | 19 |
| NTAP | ULMJC | 113.56 | OCT 115.0 | 11.50 | 441 | 446 | 97 | 11.3 | 12.7 | 450 | 623 | 90 | 1.2 | 129 | 0.0 | 312 | 2.4 | 0.55 | 0.84 | 0.90 | 0.79 | 16 |
| RIMM | RUIJO | 74.75 | OCT 75.0 | 8.50 | 55 | 157 | 50 | 12.8 | 13.2 | 450 | 623 | 34 | 1.6 | 58 | 0.0 | 71 | 1.8 | 0.57 | 0.81 | 1.02 | 0.83 | 16 |
| STLW | SZQJH | 41.31 | OCT 40.0 | 4.38 | 60 | 228 | 44 | 11.8 | 8.3 | 67 | 595 | 51 | 1.2 | 55 | 0.0 | 63 | 1.9 | 0.61 | 0.64 | 1.08 | 0.61 | 16 |
| DOX | DOXJM | 67.75 | OCT 65.0 | 7.13 | 0 | 1880 | 27 | 11.8 | 7.2 | 38 | 565 | 63 | 1.3 | 85 | 0.0 | 207 | 1.0 | 0.64 | 1.04 | 0.56 | 0.56 | 16 |

SYSTEM AND METHOD FOR ANALYZING AND SEARCHING FINANCIAL INSTRUMENT DATA

CROSS-REFERENCE TO RELATED CASES

This application is related by subject matter to U.S. patent application Ser. No. 09/086,738, entitled Interactive Internet Analysis Method, now U.S. Pat. No. 6,049,783 issued Apr. 11, 2000. This application is related by subject matter to U.S. patent application Ser. No. 09/524,205, entitled "Interactive Internet Analysis Method," filed Mar. 3, 2000, now U.S. Pat. No. 7,165,042 issued Jan. 16, 2007. This application is also related by subject matter to U.S. patent application Ser. No. 10/607,418, entitled "Improved System and Method for Analyzing and Searching Financial Instrument Data" filed on Jun. 23, 2003. This application is also related by subject matter to U.S. patent application Ser. No. 11/243,216, entitled "System And Method For Searching For High Return Options" filed on Oct. 4, 2005. This application is also related by subject matter to U.S. patent application Ser. No. 11/611,043, entitled "Interactive Internet Analysis Method" filed on Dec. 14, 2006. This application is also related by subject matter to U.S. patent application Ser. No. 11/820,952, entitled "Option Search Criteria Testing" filed on Jun. 21, 2007.

FIELD OF THE INVENTION

The present invention relates generally to on-line financial data systems, and more particularly, to computer network systems and methods for searching for financial instruments using user-defined parameters.

BACKGROUND OF THE INVENTION

Traditionally, individual investors have relied upon printed media such as newspapers and magazines to gather financial data for use in making investment decisions as to financial instruments such as stocks, mutual funds, bonds, commodities, indexes, currencies and their derivatives. For example, newspapers often list the results from the most recent trading day for stocks and mutual funds. Individuals consult such printed media and make investment decisions based in part on the information found therein.

The information that is available via print media is limited, however, in several respects. For example, the type and number of statistics that are provided is small and non-customizable. It is common, for example, that printed media list the closing price of a financial instrument along with an indication of how the financial instrument fared in the most recent day of trading. However, there are numerous other financial data items regarding financial instruments that an investor may wish to review in order to make buy and sell decisions. Because the desired data items are not available, an investor may need to make laborious data calculations him or herself, or simply go without the set of desired investment data and make investment decisions with less than the optimal level of information.

The financial data that is available from printed media is also limited in that the information is often stale or out-of-date. The value of stocks, bonds, options, and other financial instruments fluctuate throughout the trading day, making certain transactions that an investor may be considering more or less attractive. However, these fluctuations are not reflected in a print media source that lists only the values at the close of the market. Thus, the financial data gathered through print media is often out-of-date, even if it contains data from the previous day of trading.

Furthermore, the financial data that is available through printed media is limited in that it cannot be sorted and searched automatically. For example, if an investor wishes to identify all stocks with a particular characteristic such as, for example, a price under $100, the investor needs to scan the printed media by hand and note for him or herself which stocks satisfy the investor's criteria. Such a process is cumbersome and subject to human error.

Automated systems have been developed to address shortcomings in the information provided by printed media. Generally, existing automated systems provide access to timely financial data. The data may be updated at short intervals and in some instances may be updated in near real-time. However, existing automated systems have failed to provide many existing needs of non institutional investors. For example, the statistics that are provided by existing on-line systems, as was the case with printed media, are limited and do not provide the breadth of data items that investors may desire in order to make informed decisions. Existing on-line systems have also failed to provide non-institutional investors the capability to format complex searches for sophisticated investment strategies such as stock option spreads that involve positions in multiple instruments. Existing systems likewise lack functionality to assist novice users in developing complex searches for such sophisticated option strategies. Furthermore, existing systems lack the capability to automatically execute trades of sophisticated investment strategies such as an option spreads that involve a plurality of instruments.

Accordingly, there is a need in the art for improved on-line systems for analyzing financial instrument data. Specifically, there is a need for systems and methods for collecting financial data from multiple sources, calculating values for a broad set of searchable investment parameters related to sophisticated investment strategies such as derivatives, and servicing requests for user-defined searches of the searchable investment parameters. There is similarly a need for systems and methods that assist users in generating searches and which automatically execute trades of sophisticated investment strategies upon user request.

SUMMARY OF THE INVENTION

Briefly, the present invention meets these and other needs in the art by providing computerized network systems and methods for financial data analysis. According to an aspect of the invention, a system is provided wherein financial data associated with stocks and stock options, as well as other financial instruments and their derivatives, is collected from multiple sources and calculations performed thereon to derive values for a set of searchable screening parameters related to sophisticated investment strategies such as option spreads. Non-institutional investors access the system and provide values and ranges of values for searching the set of searchable financial instrument screening parameters. In response, investors are presented with the set of option spreads or other investment strategies, in sorted order, that satisfy the investor-supplied search values.

According to another aspect of the present invention, there is provided systems and method for assisting users in formulating searches for financial instruments and their derivatives. The system prompts users for responses to a series of questions directed at defining users' general investment preferences. Based upon a user's responses and the preferences reflected therein, the system formulates a search using some basic business rules and assumptions and executes the search.

According to still another aspect of the invention, the system provides functionality that allows users to automatically execute trades of investment strategies, such as option spreads, that involve a plurality of underlying instruments. Thus, when a user selects an option spread to be executed, the system identifies the associated underlying option trades and automatically executes these trades. Thus, the system provides for automatically executing the multiple trades that underly a selected investment strategy.

BRIEF DESCRIPTION OF THE DRAWINGS

Other features of the invention are further apparent from the following detailed description of presently preferred exemplary embodiments of the invention taken in conjunction with the accompanying drawings, of which:

FIGS. 9A and 9B are diagrams of an exemplary user interface screen for searching for covered calls;

FIGS. 10A and 10B are diagrams of an exemplary user interface screen for searching for covered puts;

FIGS. 11A and 11B are diagrams of an exemplary user interface screen for searching for naked calls;

FIGS. 12A and 12B are diagrams of an exemplary user interface screen for searching for naked puts;

FIGS. 14A and 14B are diagrams of an exemplary user interface screen for searching for bull-put spreads;

FIGS. 16A and 16B are diagrams of an exemplary user interface screen for searching for bear-call spreads;

FIG. 17 is a diagram of an exemplary user interface screen for responding to system prompts regarding investment preferences;

FIGS. 21A and 21B are diagrams of exemplary user interface screens for presenting alert and portfolio management information to users;

FIGS. 22A and 22B are diagrams of an exemplary user interface screen for listing chains of option strikes;

FIG. 23 is a diagram of an exemplary user interface screen for listing chains of spread investment strategies;

FIG. 25 is a diagram of an exemplary user interface screen for displaying an industry specific report;

FIG. 26 is a diagram of an exemplary user interface screen for displaying an exemplary pre-defined report;

FIGS. 29A and 29B are diagrams of an exemplary user interface screen for a Black-Scholes calculator.

DETAILED DESCRIPTION OF THE INVENTION

Figure 1:
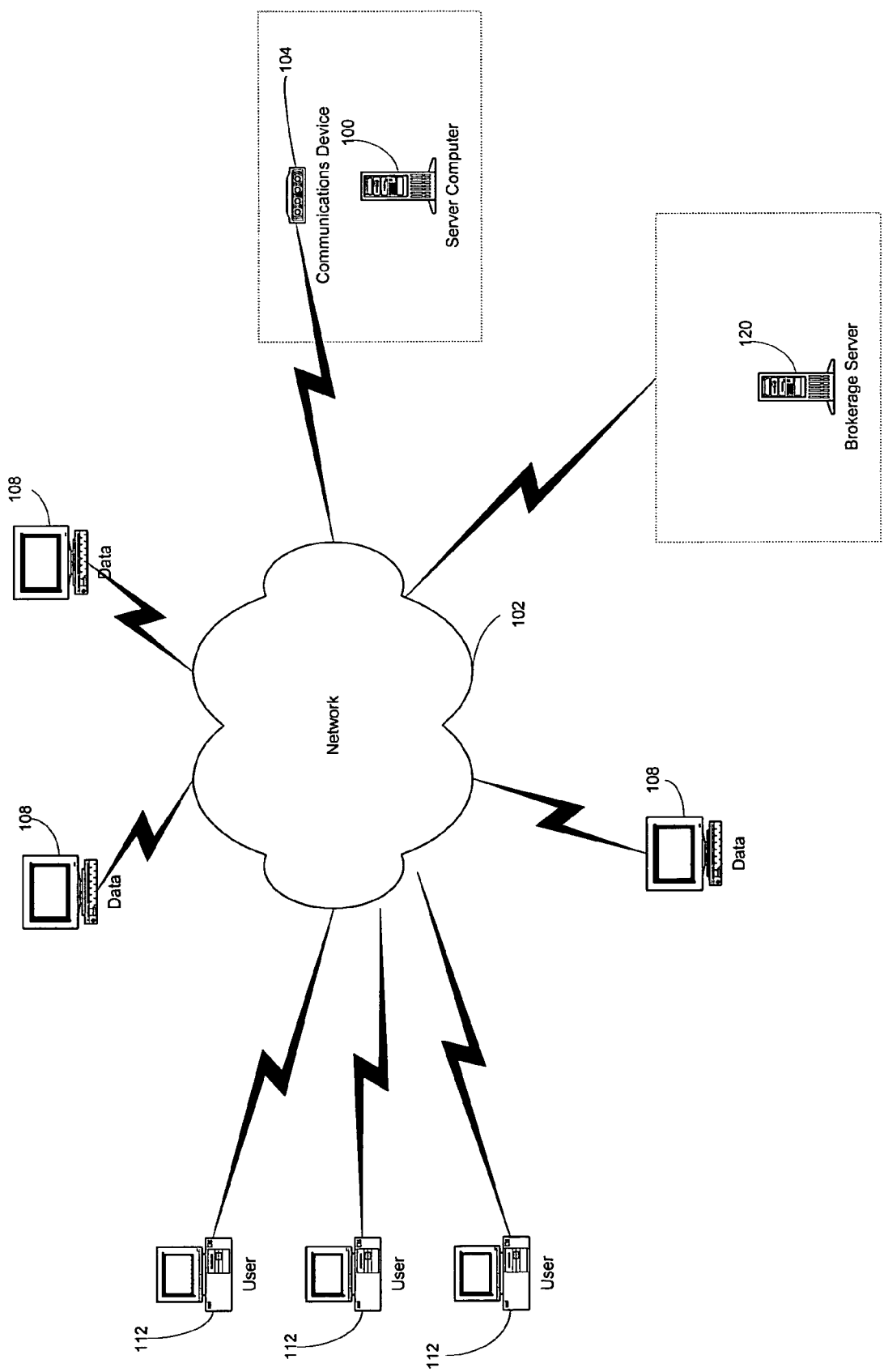
FIG. 1 is a high level diagram of a network for providing financial data in accordance with the invention.

A system and method with the above-mentioned beneficial features in accordance with a presently preferred exemplary embodiment of the invention will be described below with reference to FIGS. 1-29. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Generally, there is provided computerized network systems and methods for financial data analysis. According to an aspect of the invention, a system is provided wherein financial data associated with various financial instruments is collected from multiple sources and calculations performed thereon to derive values for a set of searchable financial instrument screening parameters. Users, typically non-institutional investors, may access the system and provide values and ranges of values for searching the set of searchable financial instrument screening parameters. In response, users are presented with the set of financial instruments, or derivatives, in sorted order, that satisfy the user-supplied search values.

Applicants' invention is directed toward assisting users in searching for sophisticated investment strategies. Virtually any investment strategy involving financial instruments may be facilitated by applicants' system. Set forth below is an exemplary system for analyzing stock option strategies, such as option spreads, in accordance with applicants' invention. It should be noted that the exemplary system described below is provided for illustrative purposes only and in no way is meant to limit applicants' invention. While the exemplary system is described with respect to collecting, analyzing, and searching stock and stock option data, the system likewise could be applied to collect, analyze, and search data related to bonds, mutual funds, commodities, indexes, currencies, and their derivatives, or any other type of instrument as well.

Generally, users employ the exemplary system to search for stock options including call options and put options. A call option is an option contract that gives the holder the right to buy a certain quantity (usually 100 shares) of an underlying security, such as a stock, from the writer of the option, at a specified price (the strike price) up to a specified date (the expiration date). A put option is an option contract that gives the holder the right to sell a certain quantity of an underlying security to the writer of the option, at the strike price up to the expiration date.

Investments related to put options and call options include covered calls and covered puts. A covered call is an investment wherein a call option is sold while simultaneously holding an equivalent position in the underlying security. A covered put is an investment wherein a put option is sold while maintaining a short position on an equivalent amount in the underlying security. When an option is purchased without owning the underlying stock, the option is said to be naked. Thus, a naked call is an investment wherein a call option is written without owning the corresponding number of shares of the underlying stock. A naked put is an investment wherein a put option is written without shorting the underlying stock.

The put option and the call option are basic financial instruments to which the exemplary system is directed. However, the exemplary system is more sophisticated and provides greater assistance to investors by providing analysis of spread strategies, which are investments that involve simultaneous positions in a plurality of stock options. Specifically, the exemplary system in accordance with the invention assists users in identifying desirable option spread strategies such as the following: bull put spreads; bear call spreads; calendar spreads; collar spreads; strangle spreads; butterfly spreads; and straddle spreads.

Definitions

A bull put spread is a spread strategy wherein a first put option is purchased and a second put option is sold, both generally having the same expiration date.

A bear call spread is a spread strategy wherein a call option with a higher striking price is purchased and a call option with a lower striking price is sold, both options generally having the same expiration date.

A butterfly spread is a spread strategy that involves combining a bull put spread and a bear call spread wherein four striking prices are involved, with the lower two being utilized in the bull spread and the higher two in the bear spread.

A calendar spread is a spread strategy in which a short-term option is sold and a longer-term option is purchased, wherein each option has the same strike price.

A collar spread is an a spread strategy consisting of a standard covered call, wherein a call option is written and the underlying stock is purchased, and purchasing of a put option in the underlying company for downside protection.

A straddle spread is a spread strategy wherein an equal number of puts and calls having the same terms are either purchased or sold.

A strangle spread is a spread strategy involving a put option and a call option with the same expiration dates and different strike prices.

A system in accordance with the present invention automatically calculates returns for the above listed spread strategies and allows users to search the return data as well as other parameters to identify desirable investments. Upon locating a desirable spread strategy, for example a particular bull-put spread, the system can automatically have executed the options and/or stock trades that comprise the investment strategy. Thus, by selecting to execute a single spread strategy, all of the component transactions that are comprised in that investment strategy are automatically executed. The user does not need to specify the component transactions; is this is done by the system automatically.

FIG. 1 is a high level diagram of the exemplary system for analyzing financial data. Server 100 is a computing system that collects, analyzes, and provides access to financial data. Server 100 operates as a database server and a hypertext transfer protocol server and may comprise a single computing machine or a plurality of computers.

Data source servers 108 are computing systems that operate as repositories of financial data. The repositories may include both public and private sources. For example, data source servers 108 may include data servers operated by Data Transmission Network Corporation (DTN), Chicago Board of Options Exchange (CBOE), and Zacks Investment Research, as well as others.

Network 102 may be any electronic network including the Internet.

User or investor terminals 112 provide users with access to server 100 via network 102 and communications device 104. User terminals 112 may be personal computers, hand-held computing systems, or even wireless phones. User terminals 112 are generally loaded with Internet browser software such as Netscape Navigator or Microsoft Explorer and are operable to communicate over network 102 to download data including web pages from server 100.

Brokerage server 120 is a server machine that provides a gateway to an organization such as a brokerage house that executes trades in stocks, stock options, and the like. Brokerage server 120 provides an interface to the brokerage through which requests for execution of trades are routed.

Generally, server 100 communicates with data source servers 108 to gather financial data related to financial instruments. After downloading financial data from the data source servers 108, server 100 calculates various searchable financial instrument-screening parameters. With respect to the exemplary embodiment, server 100 calculates returns for potential investments and searchable financial instrument screening parameters that may be used to screen for stock options. Users access server 100 over network 102 to search for options and option spread strategies. Upon identifying a particular option or option spread strategy, a user may issue a request to execute a trade on the option or option spread strategy. The request is routed from user terminal 112 to server 100. Server 100 forwards the request over network 102 to brokerage server 120 where the transaction is executed.

Figure 2:
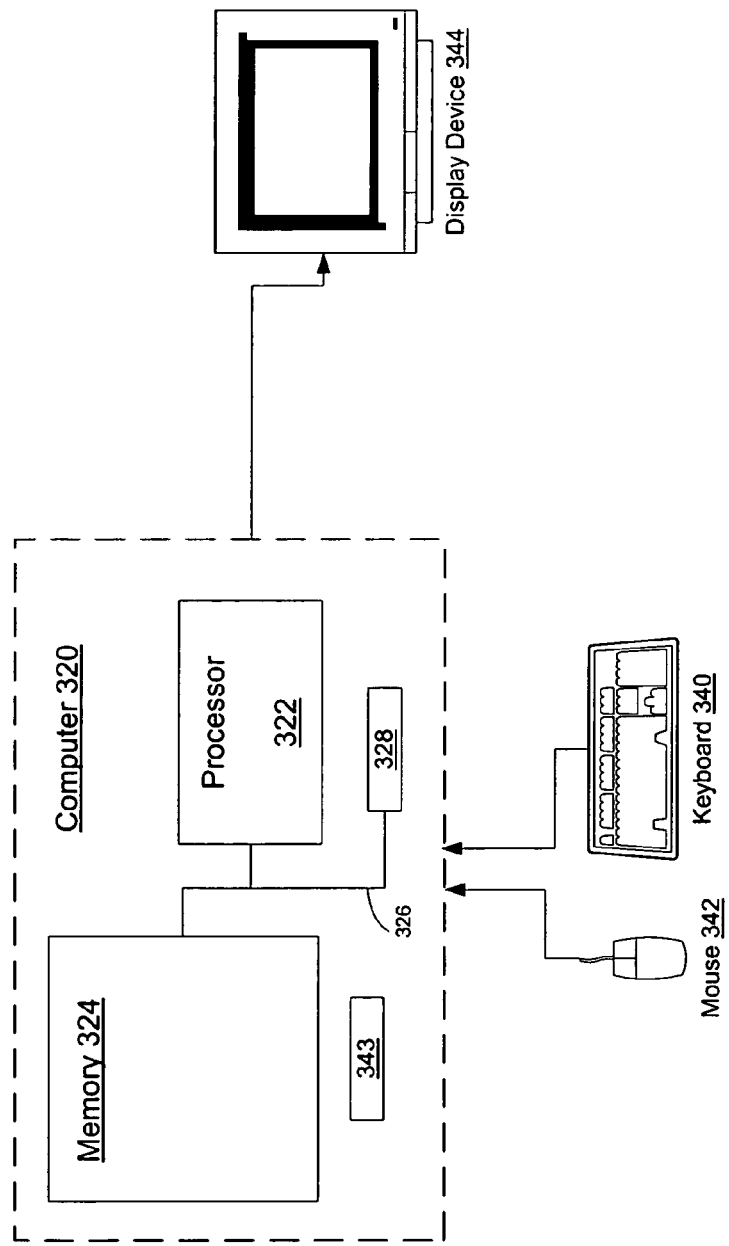
FIG. 2 is a diagram of a computing system for use in a system in accordance with the invention.

Server computer 100, data servers 108, brokerage server 120, and customer terminals 112 are generic computing systems. FIG. 2 is a block diagram of a computing system suitable for this use. As shown, computing device 320 includes processing unit 322, system memory 324, and system bus 326 that couples various system components including system memory 324 to the processing unit 322. The system memory 324 might include read-only memory (ROM) and random access memory (RAM). The system might further include hard-drive 328, which provides storage for computer readable instructions, data structures, program modules and other data. In use, a user may enter commands and information into the computer 320 through input devices such as a keyboard 340 and pointing device 342. A monitor 344 or other type of display device is also connected to the system for output. Communications device 343, which in one embodiment may be a modem, provides for communications over network 102. Processor 322 can be programmed with instructions to interact with other computing systems so as to perform the algorithms and serve the web pages described below with reference to FIGS. 4 through 28. The instructions may be received from network 102 or stored in memory 324 and/or hard drive 328. Processor 322 may be loaded with any one of several computer operating systems such as Windows NT, Windows 2000, or Linux.

Figure 3:
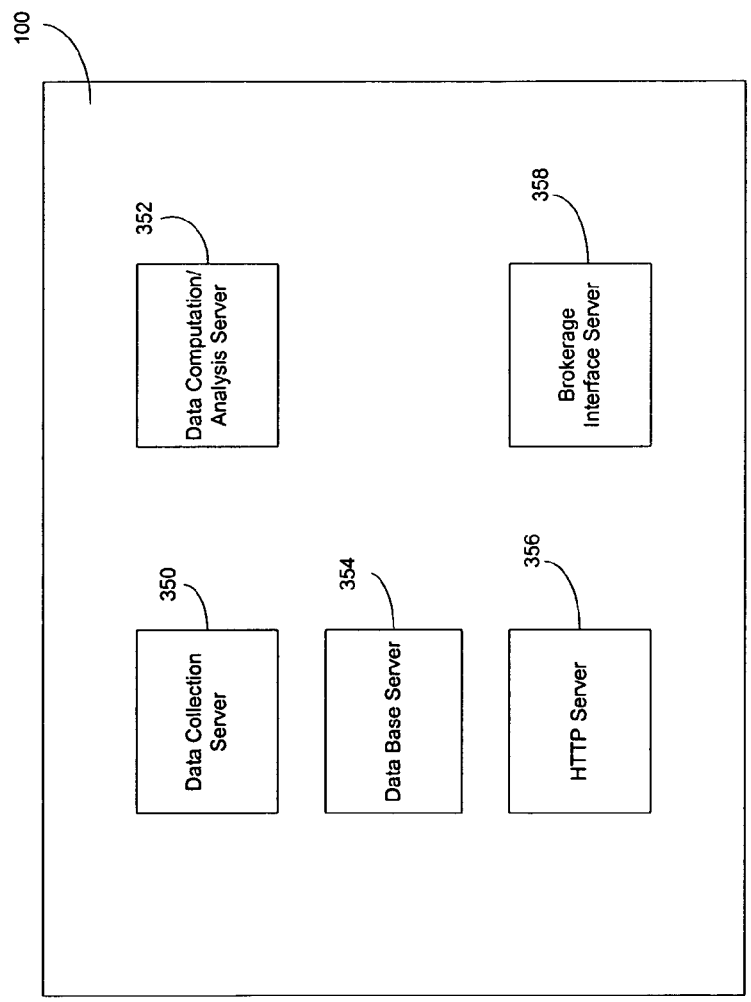
FIG. 3 is a block diagram depicting functional components of a server machine in accordance with the invention.

FIG. 3 is a diagram of the functional components of server 100. As shown, server 100 comprises data collection server 350, data computation/analysis server 352, database server 354, hypertext transfer protocol (HTTP) server 356, and brokerage interface server 358. Data collection server 350 operates to download financial instrument data from data servers 108. Data computation/analysis server 352 operates to compute searchable financial instrument screening parameters from the financial instrument data. Database server 354 maintains and provides access to the financial instrument data and searchable parameters. Database server 354 may comprise any of numerous commercial database software systems such as those produced by Oracle Corporation and Microsoft Corporation. Database server 354 handles queries of the financial instrument data and searchable financial instrument screening parameters. HTTP server 356 maintains hypertext mark up language (HTML) pages, serves dynamic HTML objects, and provides fault tolerance and load balancing. HTTP server 356 may comprise any of several well-known HTTP server software systems, but is preferably the Windows NT server produced by the Microsoft Corporation. Brokerage interface server 358 operates to forward trade orders for financial instruments. It should be noted that server 100 might comprise a single computing machine or a plurality of computing machines. Furthermore, data collection server 350, data computation/analysis server 352, database server 354, HTTP server 356, and brokerage interface server 358 may be comprised in a single software server and further may be located on a single computer system.

Figure 4:
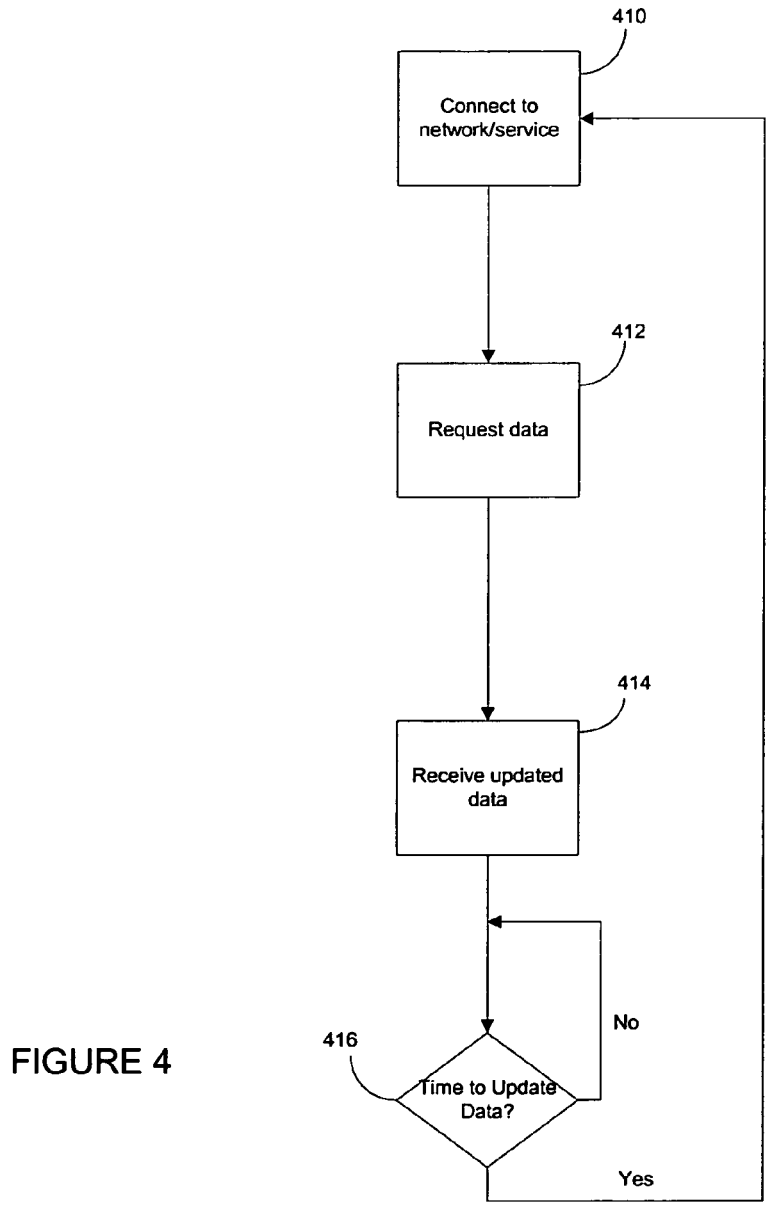
FIG. 4 is a flow chart of a process for retrieving financial data over a network in accordance with the invention.

FIG. 4 provides a flow chart of a process performed by server 100 for retrieving financial data from data servers 108. As shown, at step 410 servers 100 establishes a connection to network 102 if one does not already exist: At step 412, server 100 issues a request to one or more data servers 108. The request identifies to data server 108 which data is being requested. At step 414, the requested data is received at server 100.

In the exemplary embodiment, the financial data that is downloaded relates to stocks and stock options. Accordingly, in the exemplary embodiment, the financial data may comprise the following: stock symbol—denoting the trading symbol for stock in a particular company; option symbol—denoting the trading symbol for a stock option in a particular company; stock ask price—denoting the asked price or closing price of the underlying stock; expiration/strike price—denoting the month a particular option expires and the price of the option; option bid—denoting the highest price for a market sell order of a particular option; option volume—denoting the number of options contracts traded in the current trading day; open interest—denoting the number of option contracts in the life of a contract; p/e ratio—denoting the price to earnings ratio using last years earnings; average recommendation—denoting the average broker recommendation for a particular stock (a numerical rating with numeral 1 signifying the best and numeral 5 signifying the worst); share—denoting the number of common shares outstanding; beta—denoting a measure of stock volatility relative to the Standard and Poor's 500 index; company name—indicating the name of a company; Zack's indicator—denoting an industry classification; and recommended list—denoting a list of advisory service recommendations. This data may be downloaded from one or multiple sites to server 100.

In an embodiment of the invention, the financial data is periodically downloaded so that the data and parameters calculated therefrom reflect recent market fluctuations. In one embodiment, for example, the data may be updated every 20 minutes. However, periods of greater or lesser frequency may be employed. For example, financial data may be updated continuously in real time. Thus, as shown in FIG. 4, at step 416, it is determined whether the financial data should be updated. If not, the system continues to monitor as to whether the data should be updated. If the financial data needs to be refreshed, control returns to step 410.

Figure 5:
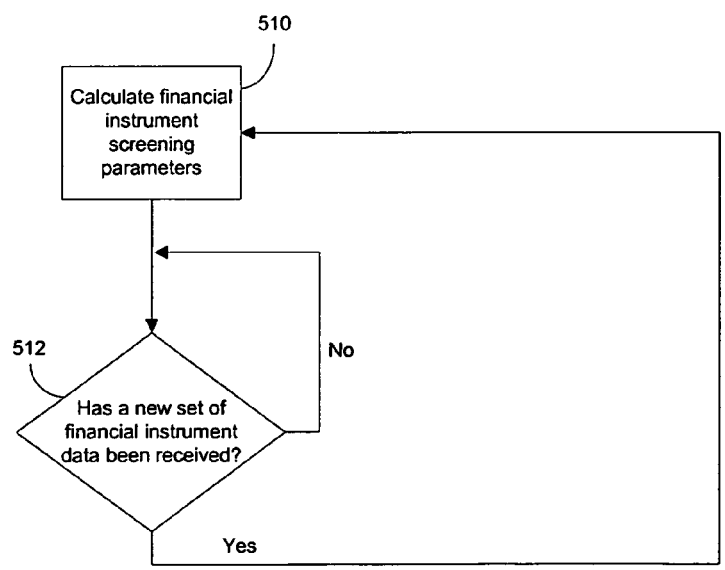
FIG. 5 is a flow chart of a process for calculating financial screening parameters in accordance with the invention.

Server 100 uses the downloaded financial data to calculate returns on options and option spread strategies and to calculate values for a plurality of screening parameters. FIG. 5 provides a flowchart of this process. As shown, at step 510, server 100 uses the financial data that was previously downloaded to calculate returns on possible spread strategies such as bull-put spreads and bear call spreads as well as other screening parameters. At step 512, server 100 determines whether the financial instrument data has been updated. If so, the screening parameters are updated at step 510.

The screening parameters that may be calculated by server 100 include the following: percentage option volume—denoting the ratio of the number of options contract traded that day to the average option volume over a defined number of previous days, e.g. 30 days; percentage if not assigned—denoting the ratio of the sum of the option bid and stock price appreciation to the difference between stock price and option bid; percentage if assigned—denoting the ratio of option bid to the difference between stock price and option bid; percentage EPSG (Earnings Per Share Growth)—denoting the ratio of the difference between earnings last year and earnings this year to earnings last year; percentage range denoting the percentage of range between the year's high and low for the stock which is calculated as the ratio of the difference between the current stock price and the low stock price for the year to the difference between the high stock price for the year and the low stock price for the year; percentage volume—denoting the percentage change from the previous day's volume on the stock and calculated as the ratio of the previous day's stock volume to the average number of shares traded in 60 days; percentage yield—denoting the annual dividend yield on the underlying stock and calculated as the ratio of four times the dividend yield per quarter to the price of the underlying stock; delta—denoting the change in option price versus the change in stock price; Black-Scholes Ratio—denoting the bid price divided by the Black-Scholes value for the particular option; volatility—denoting the historical price volatility of the stock and calculated by measuring the annual standard deviation of the daily price changes in the stock; implied volatility—denoting the volatility based on the actual price of the option as opposed to the historical price fluctuation; and percentage to double price—denoting the percent price movement in the stock price to cause the option to double in price.

The calculated parameters are useful to potential investors in deciding which investments to make. For example, the Black-Scholes ratio provides an effective tool for comparing investment values. Generally, Black-Scholes is a model for options pricing. The Black-Scholes model uses information such as the historical volatility of the underlying stock, time to expiration, and the risk free interest rate to estimate a fair value for an option. In a system in accordance with the present invention, the Black-Scholes ratio is calculated by dividing the option estimate calculated using the Black-Scholes model into the actual value of the option as determined by the market. The ratio provides the investor with an indication whether a particular option is under or over valued. The ratio is greater than one if the option is over valued relative to the Black-Scholes theoretical value. The ratio is less than one if the option is under valued relative to the Black-Scholes theoretical value. The ratio information can be very useful to investors who are considering buying or selling an option or spread strategy.

Option volume percentage is another of the calculated parameters. Stock volume has long been used as an indicator of stock activity but has not been as reliable with the advent of derivative products such as options. Option volume provides faster feedback than stock volume on breaking news but analysts are faced with the problem of deciding which month or strike price to consider. The option volume percentage parameter employed in the system in accordance with the invention solves this problem by creating an indicator, which is the sum of all option volume for puts and calls for all months. The aggregate number is a good indicator of this activity and is not as sensitive to the time of the month relative to expiration or the closeness of the stock price to the strike price. It is a more universal indicator of activity. In order to observe relative changes to this activity, the option volume for the day is compared to the average volume over some period of time, such as 30 or 50 days average. The volume is measured as a percentage change from this average.

In addition to calculating the various parameters mentioned above, the system also calculates returns for a plurality of different options and option spread strategies including covered calls, covered puts, naked calls, naked puts, bull put spreads, bear call spreads, strangle spreads, straddle spreads, calendar spreads, collars spreads, and butterfly spreads. With respect to the covered calls and covered puts, the return values include the percentage if assigned, which represents the percentage return if the option is called, and percentage if not assigned, which represents the percentage return on the transaction if the option is called. With respect to the naked calls and naked puts, the percentage naked return is calculated, which represents the return based on the margin requirements for the particular option. With respect to the various spreads, the percentage returns are calculated which represent the maximum profit realized from the spread as a percentage of the margin requirement.

It should be noted that, with respect to all of the options and option spread strategies, the percentage returns are available as search parameters in addition to the many other search parameters that are described in detail below. Accordingly, users can locate an option or option spread based upon percentage return and evaluate the return in light of the investment risk as dictated by the other investment parameters. Having the return data available is especially useful to investors in assessing the risk verses reward of an investment.

Figure 6:
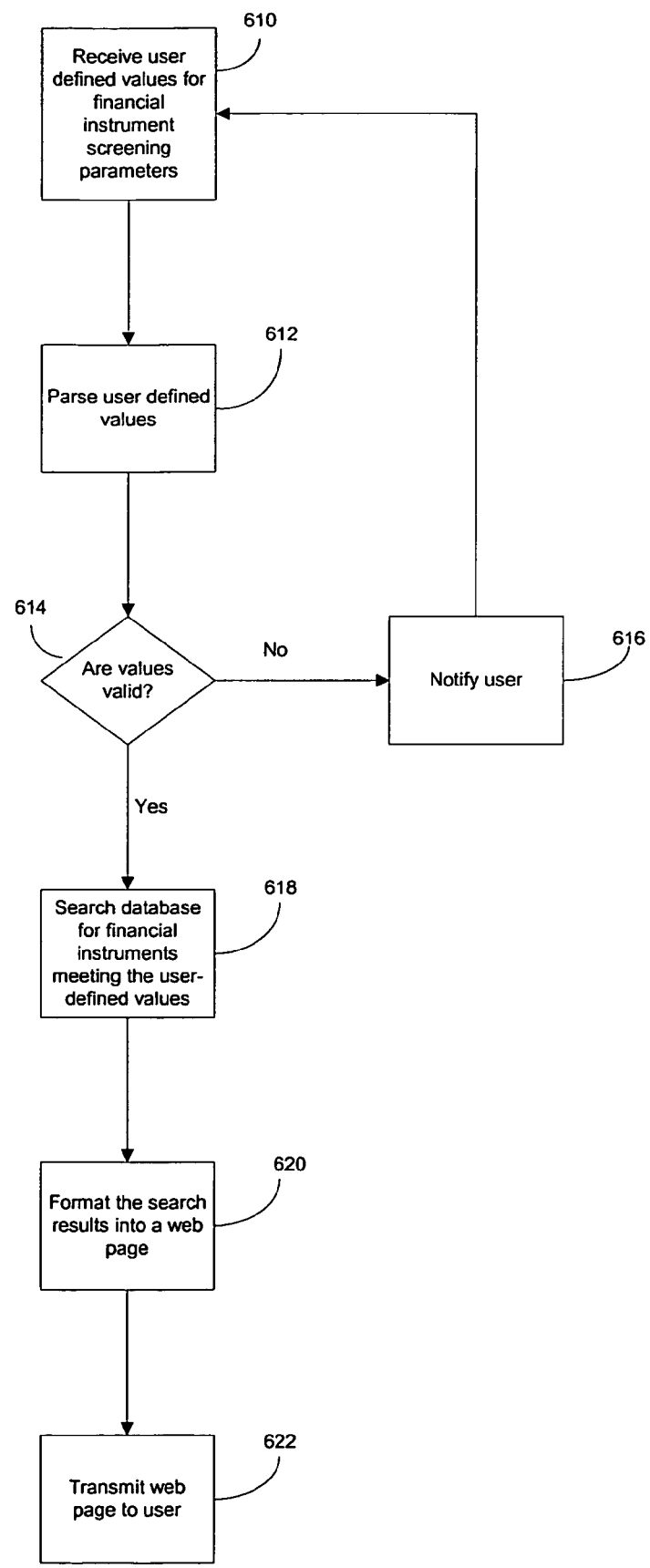
FIG. 6 is a flow chart of a process for servicing user requests for financial data in accordance with the invention.

After values for the above described parameters have been calculated, users at terminals 112 may issue requests to server 100 to search for stock options and related stock option spread strategies such as bull put spreads and bear call spreads. A flowchart of a process for servicing user search requests is depicted in FIG. 6. As shown, at step 610, server 100 receives user-defined search values for the financial data and financial instrument screening parameters. The user requests may define values and/or ranges of values for any or all of the financial data items and searchable parameters mentioned above. At step 612, server 100 parses the user defined values to determine if the values entered by the user are logical and operable for searching the database. For example, at step 612 server 100 might validate that a negative value is not inputted for a parameter that cannot, by definition, be negative. Accordingly, if at step 614, it is determined that the values entered by the user are not valid, at step 616, server 100 transmits a notification of such to the user. If the user-defined values are valid, however, at step 618, server 100 searches the database of financial data items and searchable parameters for stock options and/or stock option spread strategies that satisfy the user-defined values. At step 620, server 100 formats the results of the database search for viewing via a web browser. The results include the list of stock options and/or stock option spread strategies that satisfy the user-defined query. At step 622, the search results, usually formatted as a web page, are transmitted to the user.

According to an aspect of a system in accordance with the present invention, there is provided a capability to execute a trade on an option or option spread strategy that has been located using the above described searching technique. When a user receives the results of the query, he or she may decide to execute one or more of the transactions that are specified in the query results. For example, the user may decide to execute one of the covered calls, i.e. buy a call option and purchase the underlying stock, or one of the bull put spreads, i.e. buy a put option and sell a put option, that are listed in a query result.

Executing an option spread strategy that is specified in the results of a search, therefore, may involve the simultaneous execution of multiple trades. For example, a bull put spread requires two trades of a put option at different strike prices. Executing a butterfly spread may involve simultaneously executing four trades. A system in accordance with the present invention provides the capability to automatically have these types of multiple trades executed simultaneously. Accordingly, option spread strategies that may be located using the net credit or the percentage return search parameters, can be easily executed, including all component trades, simply by selecting to execute a single investment strategy.

Figure 7:
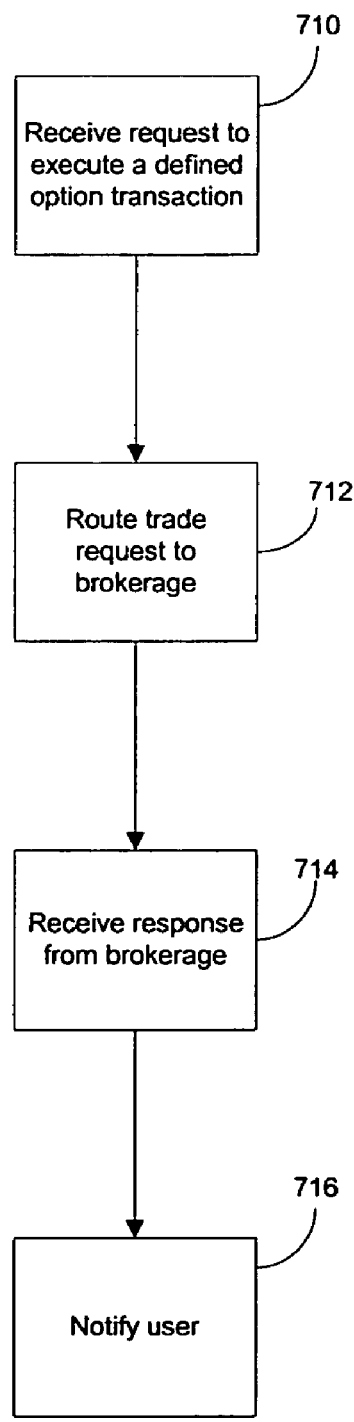
FIG. 7 is a flow chart of a process for executing a trade in accordance with the invention.

A high level diagram for executing a transaction that is specified in the results of a query is shown in FIG. 7. As shown, at step 710, server 100 receives a request from user station 112 to execute an investment transaction. Server 100 routes the request to brokerage server 120. Brokerage server 120 processes the transaction. The transaction may either be executed or denied for any number of reasons. At step 712, server 100 receives a response from the brokerage. At step 714, server 100 transmits an indication of the status of the transaction to the user at user station 112.

Figure 8:
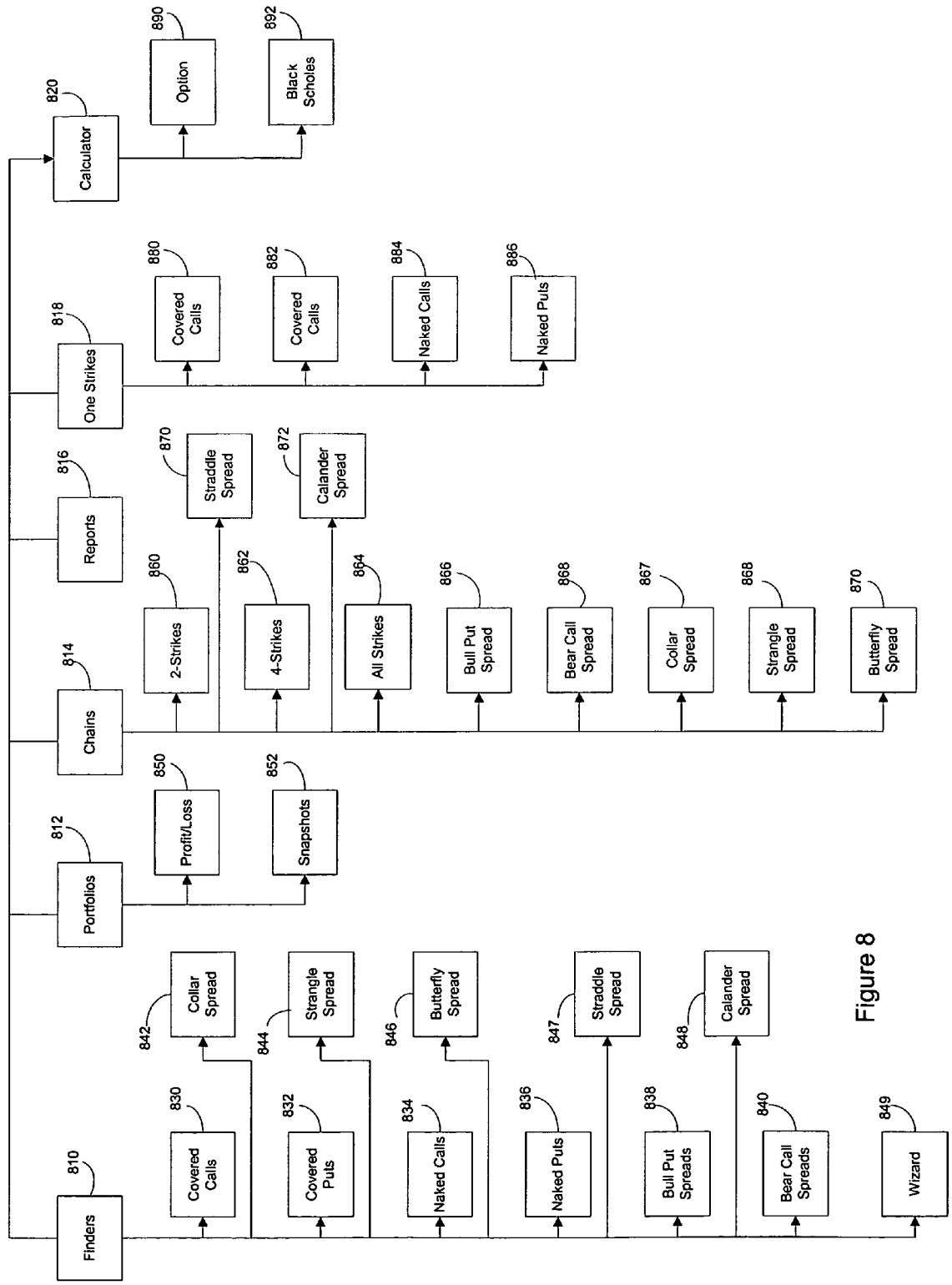
FIG. 8 is a schematic diagram of the search functions provided by a system in accordance with the invention.

According to an aspect of the invention, there is provided an interface that provides various means by which users may search for options and option spread strategies using the financial data and financial search parameters that were previously discussed. FIG. 8 provides a tree diagram representing the structure of an exemplary interface embodiment wherein each box represents a functional area that may be accessed by users to assist them in analyzing and trading stock options and option spreads. As shown, users may access the following functional areas: finders 810—to screen for stock options and option spreads that meet a user's criteria; portfolio 812—to list transactions and the related worth of the transaction; chains 814—to view the option strike price and the option months for a selected stock or stocks; reports 816—to view predefined reports generated using the finders 810 functionality; one strikes 818—to view stock and option data related to specific stocks; calculator 820—to recalculate the percentage return if a stock or stock price changes. Each of these functional areas, along with related sub-functions, is discussed in detail below.

Finders function 810 is used to screen for stock options and option spreads that meet user defined investment criteria. Several sub-function areas have been defined to assist users in locating options and option spread strategies that meet a particular investment objective. Specifically, referring to FIG. 8, finders function 810 provides searching for covered call opportunities 830, covered put opportunities 832, naked call opportunities 834, naked put opportunities 836, bull put spread opportunities 838, bear call spread opportunities 840, collar spread opportunities 842, strangle spread opportunities 844, butterfly spread opportunities 846, straddle spread opportunities 847, and calendar spread 848 opportunities.

A covered call is a transaction wherein a call option is sold and the underlying stock is purchased. For example, a covered call might involve buying 100 shares in Cisco Systems, Incorporated and writing an option to sell 100 shares of Cisco Systems. A covered call is said to be "in-the-money" when the stock price is lower than the call option strike price. Conversely, a covered call is said to be "out-of-the-money" when the stock price is higher than the option strike price. A covered call is "at-the-money" when the market price of the stock is equal to the strike price of the call option.

Figure 9A:
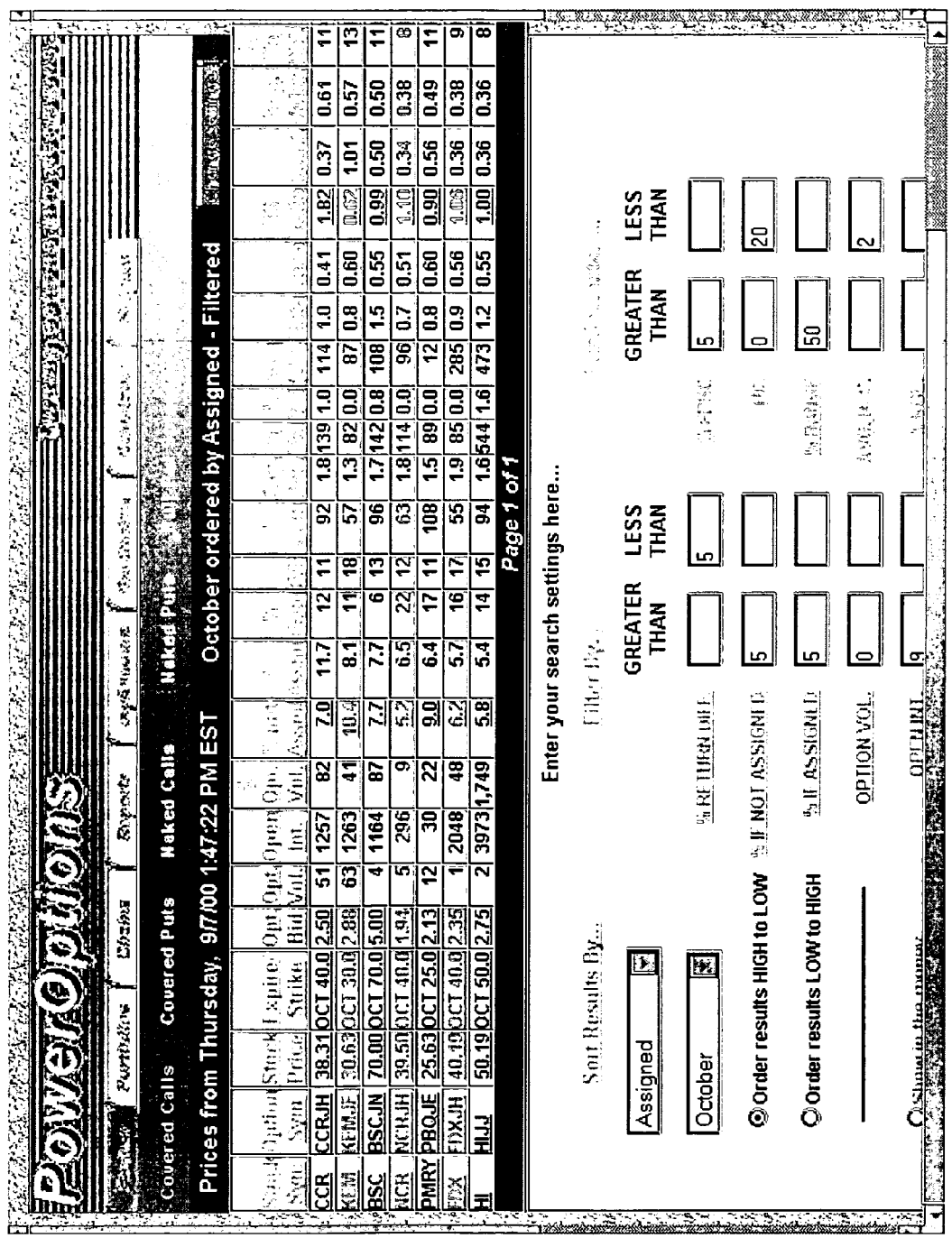
Figure 9B:
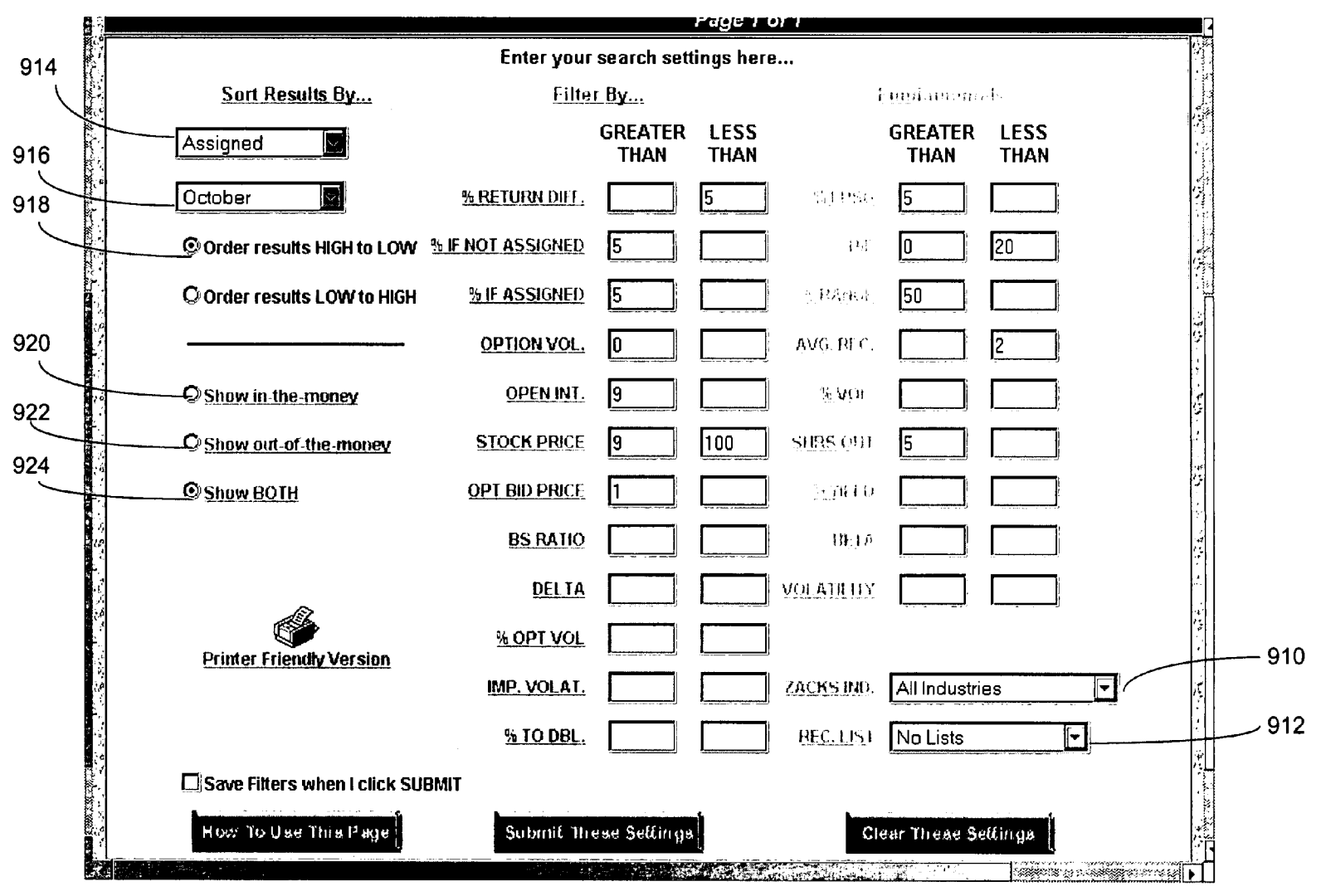

FIGS. 9A and 9B provide an illustrative example of a screen that may be employed to search for covered calls, wherein FIG. 9A represents the top portion of the screen and FIG. 9B represents the bottom portion of the screen. As shown in FIG. 9A, a list of call options with related stock and stock option data that satisfy user defined search parameters is displayed at the top of the covered call screen. Specifically, the following data elements are displayed for each option in the list: stock symbol; option symbol; stock price; expiration month and strike price; option bid price; option daily trading volume; the number of option contracts in the life of the contract; percentage option volume; percentage if not assigned; percentage if is assigned; percentage earnings per share; price to earnings ratio; percentage range; average recommendation; percentage volume; percentage yield; shares traded; beta; delta; Black-Scholes ratio; volatility; implied volatility; percentage to double; and company name. Rows in the list of call options corresponding to covered call option opportunities that are "in-the-money" are displayed in a first color, such as black. Rows in the list of call options corresponding to covered call option opportunities that are "out-of-the-money" are displayed in a second color, such as red. Finally, rows in the list of call options corresponding to covered call option opportunities that are "at-the-money" are displayed in a third color, such as green.

The bottom portion of the covered call screen, as shown in FIG. 9B provides users with the ability to define a search for covered calls by allowing for users to input ranges of values for a plurality of the financial data and financial search parameters that are discussed above. As shown, in an embodiment of the inventive system users may enter ranges of values for numerous search parameters including the following: percentage return difference; percentage if not assigned; percentage if assigned; option volume; open interest; stock price; option bid price; Black-Scholes ratio; delta; percentage option volume; implied volatility; percentage to double; percentage earnings per share growth; price to earnings ratio; percentage of range between the year's high and low stock price; average broker recommendation; percentage change in volume; number of shares outstanding; the annual dividend yield on the stock; beta which is a measure of the sensitivity of the security's price to changes in the S&P 500; and volatility. Users may also screen for options related to companies in a particular industry segment using industry segment pull down menu 910 or by whether an option is listed in a particular organization's recommended list using recommended list pull down menu 912. Using pull down menus 910 and 912, users can limit consideration to options relating to stocks of a particular quality and industry segment. It should be noted that in an embodiment of the invention, recommended list pull down menu may include one or more selections that are customized by the user to include companies that the customer finds desirable. Using the recommended list pull down menu 912, filtering and calculations can be restricted to the user's customized list. Thus, the customized list can be applied to the screening mechanism to optimize it and determine the best options to write.

Sorting column pull down list 914 allows a user to specify whether the results should be sorted by the values in a particular search parameter including any of the following: stock price; option bid price; option volume; open interest; percentage option volume; company name; percentage earnings per share; price to earnings ratio; percentage range; average brokerage recommendation; percentage volume; shares outstanding; expiration date; percentage yield; beta; volatility; Black-Scholes ratio; delta; implied volatility; and percent to double. Sorting month pull down list 916 allows a user to specify whether the results should be sorted by options coming due in a particular month. Order results radio buttons 918 allow for the user to specify whether the results should be listed by value from high-to-low or from low-to-high for the selection made in sort by pull down list 914. In-the-money radio button 920 allows the user to specify whether only options corresponding to covered call opportunities that are "in-the-money" should be displayed in the list of options. Out-of-the-money radio button 922 allows the user to specify whether only options that correspond to covered option opportunities that are "out-of-the-money" should be displayed. Both may be displayed by selecting show both radio button 924. Options corresponding to covered options that are "at-the-money" are displayed regardless of which radio button is selected.

The screens presented in FIGS. 9A and 9B provide the capability to define a search for covered calls. It is envisioned that a user could assign a name to the set of search criteria and save the search for use at a later time. Of course, a user could define multiple searches in this way and retrieve the search for use at a later date. This same functionality is available for all of the search screens that are described below.

Thus, users can search for covered calls by defining a search in a screen such as that shown in FIG. 9B to arrive at a list of search results such as that shown in FIG. 9A. Upon locating a covered call that the user finds desirable, a user may request that the covered call be executed. Execution of the covered call requires purchasing a call option and purchasing the underlying stock. Thus, the request forwarded by server 100 to brokerage server 120 comprises both a request to purchase an option and the underlying stock.

Referring back to FIG. 8, in the finders function 810, users may also query for covered puts 832. As previously mentioned, a covered put involves shorting the underlying stock and writing a put. For example, a covered put may involve shorting 100 shares of Cisco Systems, Incorporated, and writing a put option for 100 shares of Cisco systems. While the market price of the Cisco stock is lower than the strike price of the put option, the covered put is said to be "in-the-money." However, when the market price of the stock is higher than the strike price of the put option, the covered put is said to be "out-of-the-money." A covered call wherein the market price of the Cisco stock is the same as the strike price of the put option, is said to be "at-the-money."

Figure 10A:
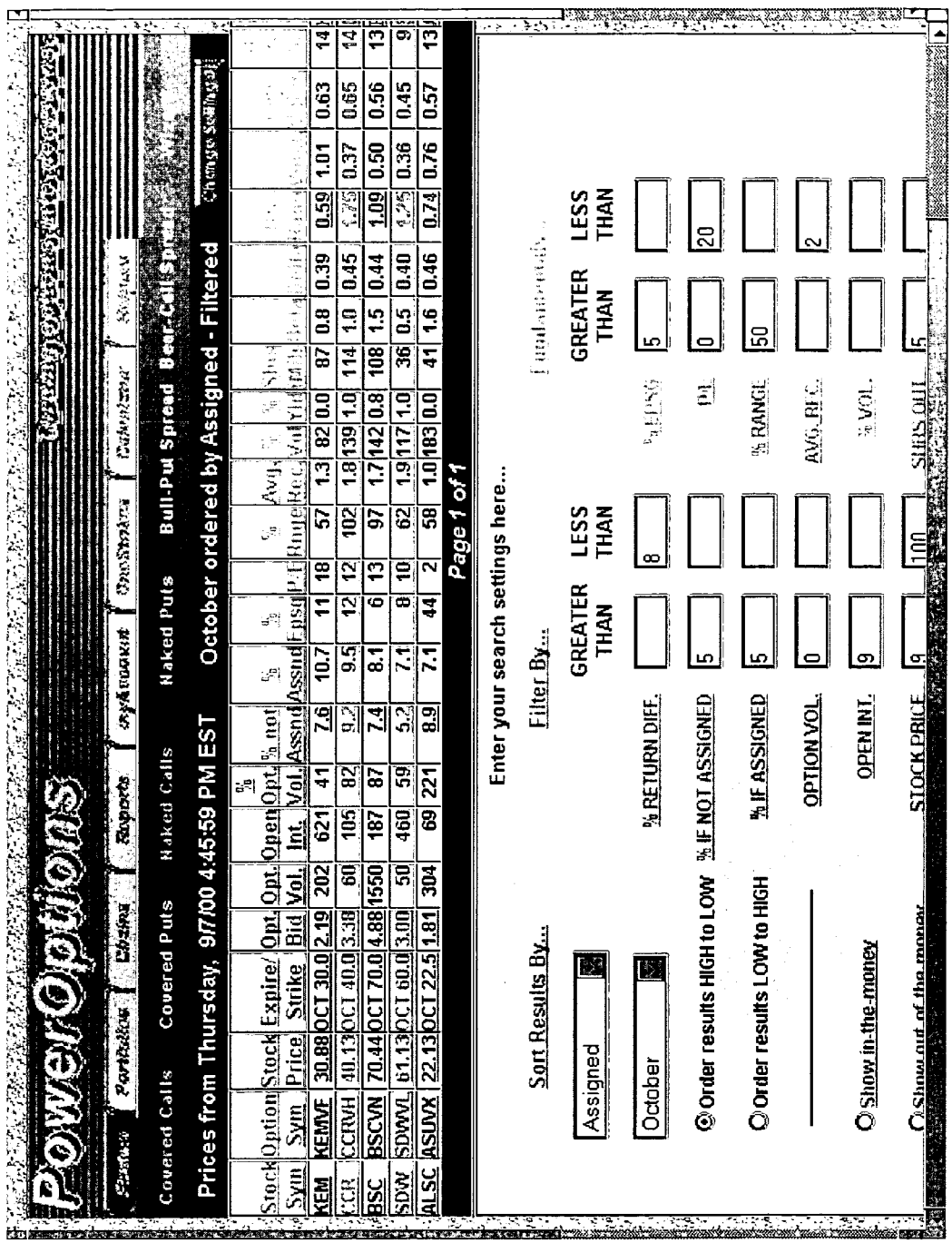
Figure 10B:
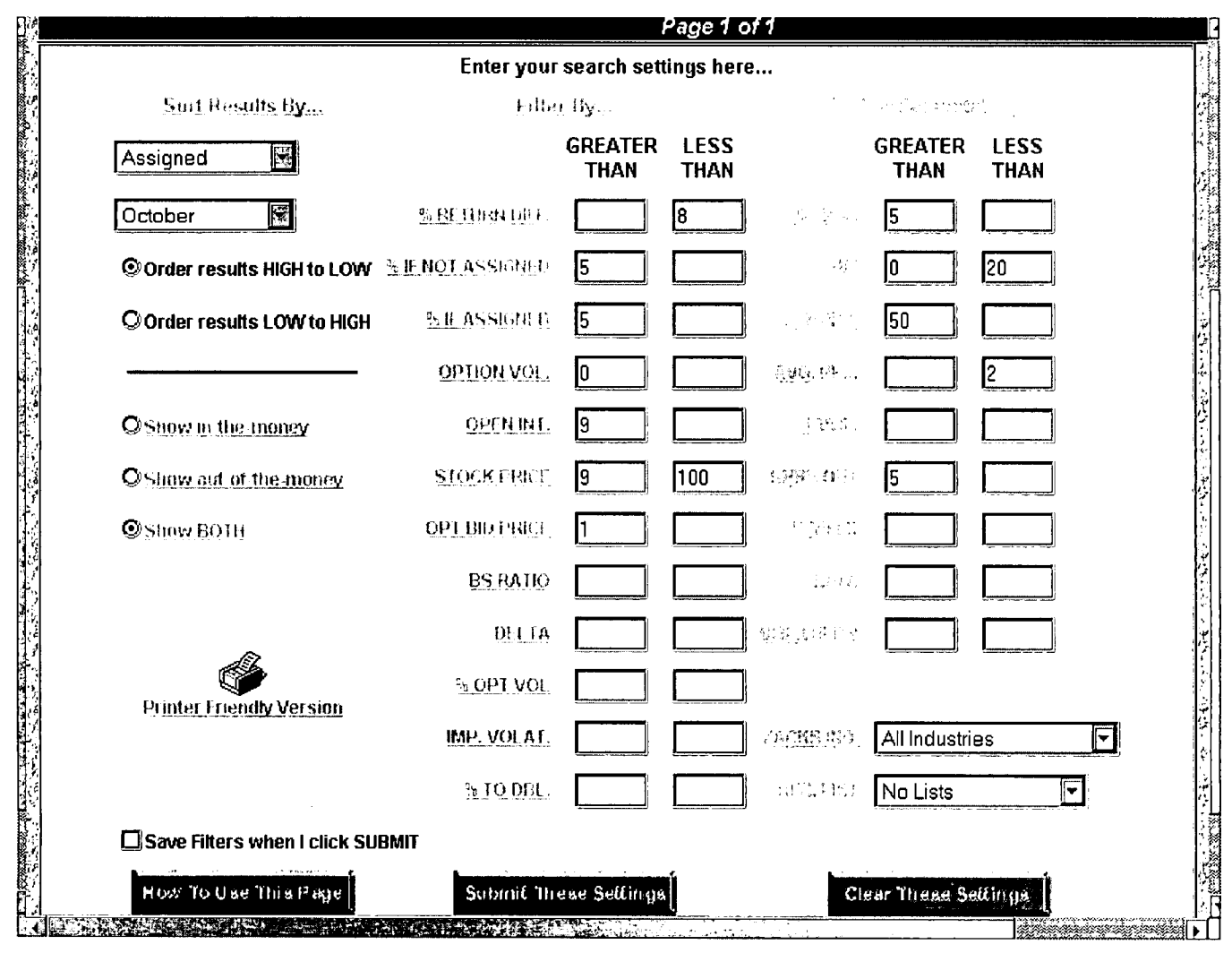

FIGS. 10A and 10B provide an illustrative example of a screen that may be employed to search for covered puts, wherein FIG. 10A represents the top portion of the screen and FIG. 10B represents the bottom portion of the screen. As shown in FIG. 10A, a list of put options with related stock and stock option data that satisfy user defined search parameters is displayed at the top of the covered put screen. The data and parameters that are displayed are the same as those described above with reference to FIG. 9A with the exception that the option symbol represents put options as opposed to call options. Rows in the list of put options corresponding to covered put option opportunities that are "in-the-money" are displayed in a first color, such as black. Rows in the list of put options corresponding to covered put option opportunities that are "out-of-the-money" are displayed in a second color, such as red. Finally, rows in the list of put options corresponding to covered put option opportunities that are "at-the-money" are displayed in a third color, such as green.

FIG. 10B provides a view of the bottom of the same screen wherein the search criteria are defined. The screen shown in FIG. 10B serves to allow users to define screening parameters for covered puts and operates similarly to the screen described above with reference to FIG. 9B.

Thus, users can search for covered puts by defining a search in a screen such as that shown in FIG. 10B to arrive at a list of search results such as that shown in FIG. 10A. Upon locating a covered put that the user finds desirable, a user may request that the covered put be executed. Execution of the covered put requires selling a put option and taking a short position in the underlying stock. Thus, the request forwarded by server 100 to brokerage server 120 comprises both a request to sell a put option and a request to short the underlying stock.

Referring back to FIG. 8, in the finders function 810, users may also query for naked calls 834. As previously mentioned, a naked call involves writing a call option without owning the underlying stock. A naked call is said to be "in-the-money" when the strike price of the call is above the market price of the stock. A naked call is said to be "out-of-the-money" when the strike price of the call is below the market price of the underlying stock. A naked call is said to be "at-the-money" when the strike price of the call is equal to the market price of the stock.

Figure 11A:
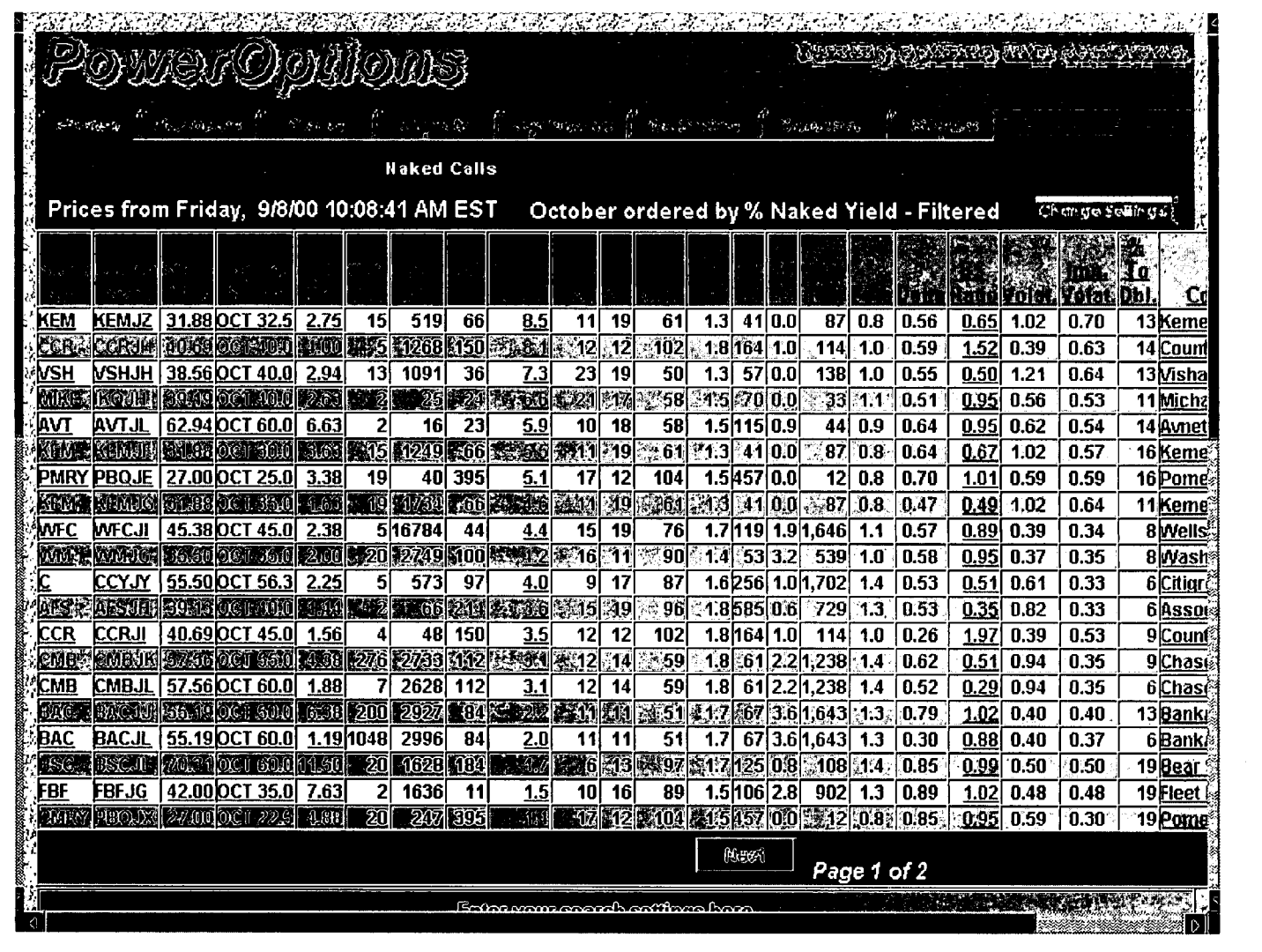
Figure 11B:
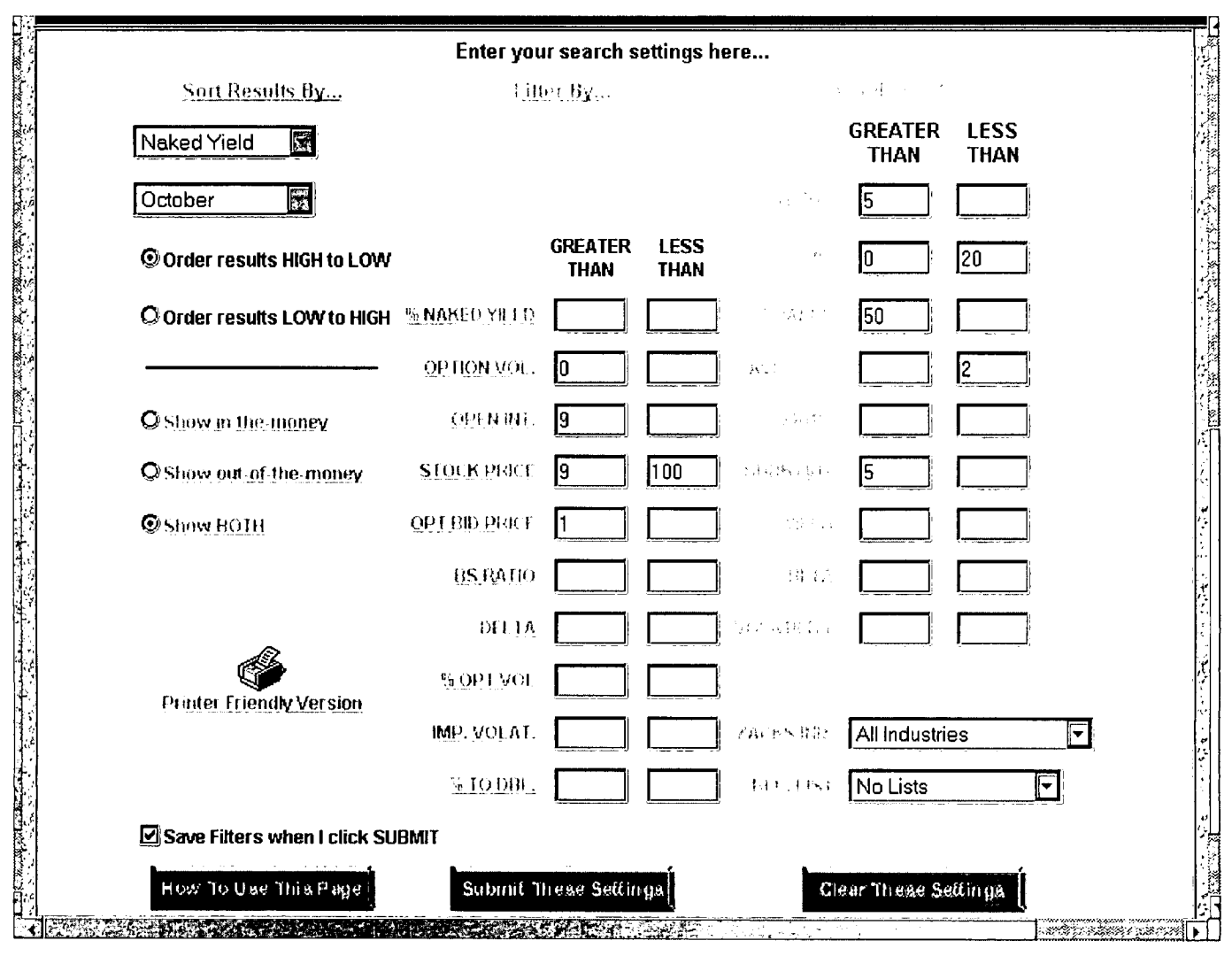

FIGS. 11A and 11B provide an illustrative example of a screen that may be employed to search for naked calls, wherein FIG. 11A represents the top portion of the screen and FIG. 11B represents the bottom portion of the screen. As shown in FIG. 11A, a list of call options with related stock and stock option data that satisfy user defined search parameters is displayed at the top of the naked call option screen. The data and parameters that are displayed are largely the same as those described above with reference to FIG. 9A in the context of the covered call option with the exception that the percentage naked yield is displayed while percentage return difference, percentage if not assigned, and percentage if assigned are displayed for each option in the list of options. Understandably, percentage naked yield is an important variable an investor may wish to consider in deciding to pursue a naked call option opportunity while percentage return difference, percentage if not assigned, and percentage if assigned do not apply to the naked call situation.

FIG. 11B provides a view of the bottom of the same screen wherein the search criteria are defined. The screen shown in FIG. 11B serves to allow users to define screening parameters for naked calls and operates similarly to the screen described above with reference to FIG. 9B with the exception being that ranges of values may be established by users for percentage naked call but not for percentage return difference, percentage if not assigned, and percentage if assigned.

Thus, users can search for naked calls by defining a search in a screen such as that shown in FIG. 11B to arrive at a list of search results such as that shown in FIG. 11A. Upon locating a naked call that the user finds desirable, a user may request that the naked call be executed. Execution of the naked call requires purchasing a call option. Therefore, the request forwarded by server 100 to brokerage server 120 comprises a request to purchase a call option.

Referring back to FIG. 8, in the finders function 810, users may also query for naked puts 836. As previously mentioned, a naked put involves writing a put option without having a corresponding short position in the underlying stock. A naked put is said to be "in-the-money" when the strike price of the put is above the market price of the stock. A naked put is said to be "out-of-the-money" when the strike price of the put is below the market price of the underlying stock. A naked put is said to be "at-the-money" when the strike price of the put is equal to the market price of the stock.

Figure 12B:
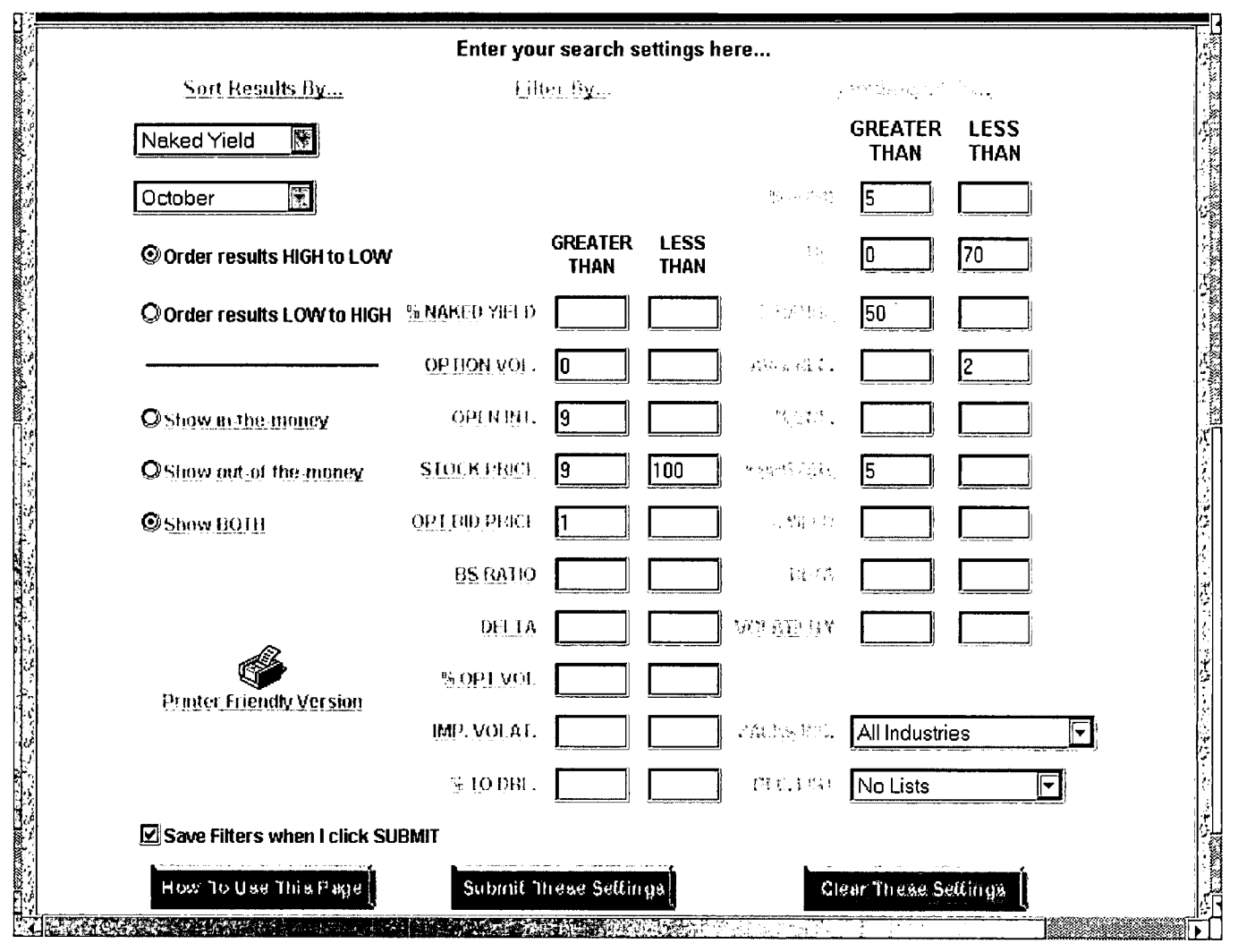

FIGS. 12A and 12B provide an illustrative example of a screen that may be employed to search for naked puts, wherein FIG. 12A represents the top portion of the screen and FIG. 12B represents the bottom portion of the screen. As shown in FIG. 12A, a list of put options with related stock and stock option data that satisfy user defined search parameters is displayed at the top of the naked put screen. The data and parameters that are displayed are the same as those described above with reference to FIG. 11A.

FIG. 12B provides a view of the bottom of the same screen wherein the search criteria are defined. The screen shown in FIG. 12B serves to allow users to define screening parameters for naked puts and operates similarly to the screen described above with reference to FIG. 11B.

Thus, users can search for naked puts by defining a search in a screen such as that shown in FIG. 12B to arrive at a list of search results such as that shown in FIG. 12A. Upon locating a naked put that the user finds desirable, a user may request that the naked put be executed. Execution of the naked put requires purchasing a put option. Thus, the request forwarded by server 100 to brokerage server 120 comprises a request to purchase a put option.

Referring back to FIG. 8, in the finders function 810, users may also query for bull put spreads 838. As previously mentioned, a bull put spread is a combined transaction wherein a first put option is sold, usually at or near money, and a second option is purchased, usually one or more strikes below the sold option, to create a spread with a net credit. The maximum profit realized, or the net credit, is the difference in premiums between the two put options. The break-even point for the spread is the strike price of the first option (i.e. the option with the higher strike price) minus the net credit. While the maximum profit is realized when the strike price rises above the first put option (i.e. the option with the higher strike price), a profit of some sort is realized on the transaction provided that the stock price of the underlying stock rises above the break-even point.

The percentage return on a bull put spread is calculated as follows:

$$\% \text{ return} = (\text{premium on sold put} - \text{premium on bought put}) / (\text{margin} - \text{net credit})$$

wherein $$\text{margin} = \text{sold put strike price} - \text{bought put strike price}$$

and $$\text{net credit} = \text{premium on sold put} - \text{premium on bought put}$$

For example, a bull put spread may be written on options for Hewlett Packard Company. A first put option for Hewlett Packard with a March call and a strike price of 130 may be written or sold for 6¾ points. A second call option for Hewlett Packard with a March call and a strike price of 125 may be purchased for 4¾ points. The percentage return for the bull put spread is calculated $$\% \text{ Return} = (6\tfrac{1}{4} - 4\tfrac{1}{4})((130-125) - (2\tfrac{5}{8} - 1\tfrac{1}{8}))$$

$$\% \text{ Return} = 2/(5-2)$$

% Return=67% if the stock price is higher than $130

Figure 13:
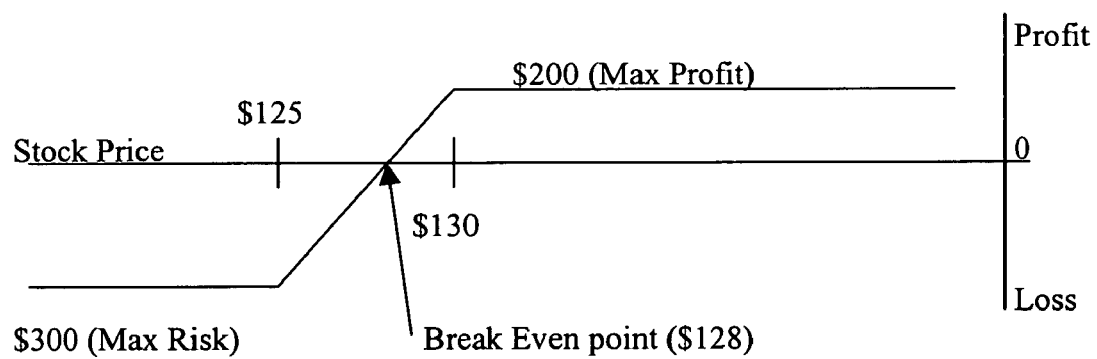
FIG. 13 is a graph of the potential return on an exemplary bull put spread.

The maximum risk on a bull put spread is calculated as the difference between the margin and the net credit. In the present example, the maximum risk is 3 points (5-2). Accordingly, the maximum risk is $300 if the stock value is lower than $125. The maximum profit on a bull put spread is equivalent to the net credit, which in the present example is 2 points. In the present example, the maximum profit is $200, which is realized when the stock is higher than $130. The break-even point for a bull put spread is calculated as the difference between the higher strike price and the net credit. In the present example, the break-even point is $128 (130-2). FIG. 13 provides a graph showing the maximum profit, maximum risk, and break-even point for the example.

Generally, the bull put spread is a bullish strategy wherein profit is realized when the stock price rises to between the break-even point and the net credit value. When this is the case, an investor loses the premium on the bought put and gains the premium on the sold put. Of course, if the stock goes very high, the gains are limited to the net credit. A bull put spread is said to be "out-of-the-money" when the market price of the underlying stock is higher than the strike price of both options. A bull put spread is said to be "at-the-money" when the market price of the underlying stock is between the strike prices of the two options. A bull put spread is said to be "in-the-money" when the market price of the underlying stock is below the strike prices of both options.

Figure 14B:
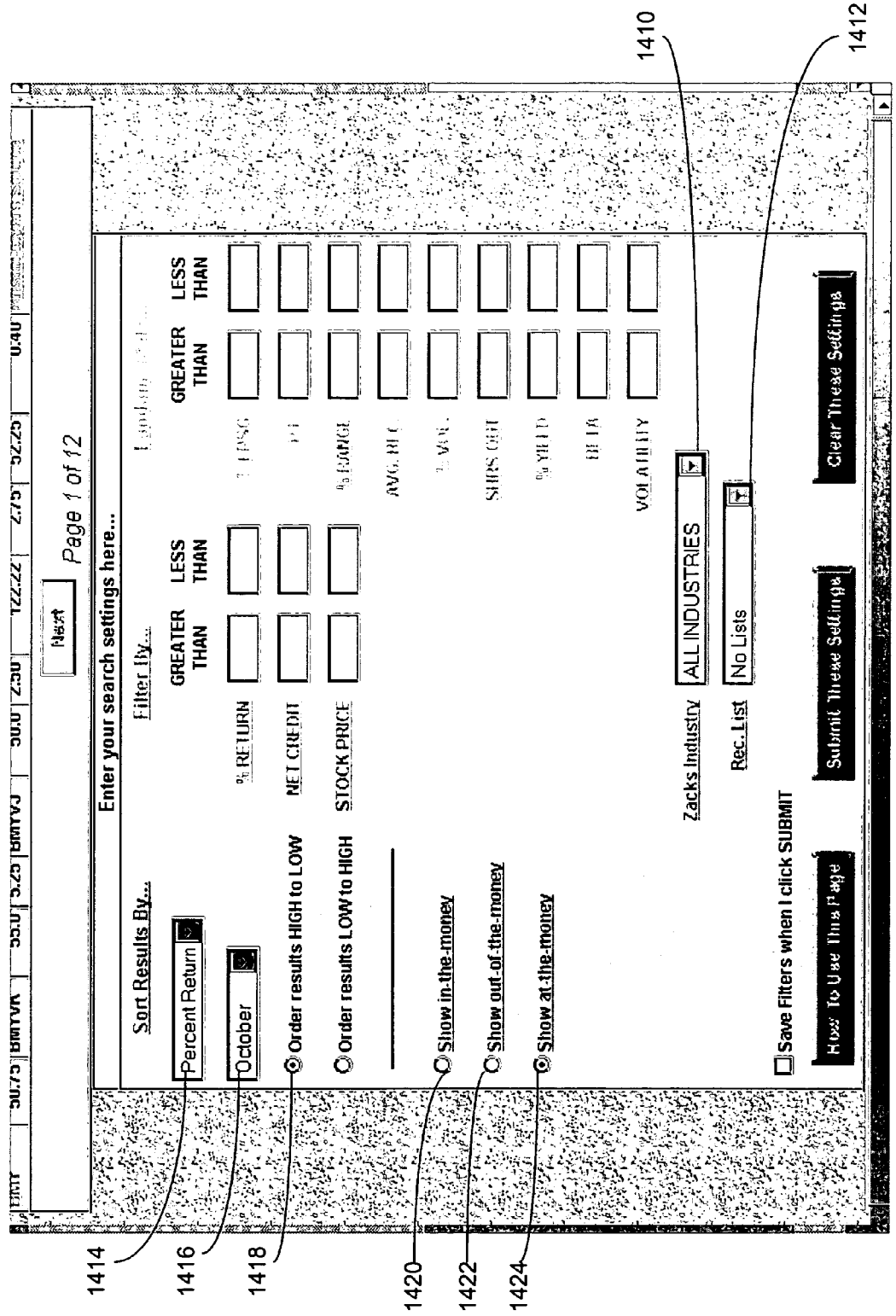

FIGS. 14A and 14B provide an illustrative example of a screen that may be employed to search for bull put spreads, wherein FIG. 14A represents the top portion of the screen and FIG. 14B represents the bottom portion of the screen. The top portion of the bull put spread screen provides a list of bull put spreads wherein each spread comprises for a particular company an option that can be sold and an option that can be purchased. As shown in FIG. 14A, for each bull-put spread in a particular company the following data is displayed: company stock symbol; company stock price; option trading symbol for the option that would be sold as part of the bull-put spread; strike price for the put option that would be sold as part of the spread; market is bid for the put option that would be sold; option symbol for the option that would be purchased as part of the bull-put spread; strike price for the option which would be purchase; asking price in the market for the option that will be purchased; percentage return from the spread between the two options which is calculated as the net credit divided by the margin requirement wherein the margin requirement is the amount of money that the investor must have available to secure the broker loan; net credit which represents the difference between the bid price for the sell option and the ask price for the buy option; break even stock price which represents the stock price to which the stock can deteriorate before the bull put spread would become a unprofitable transaction; volatility which represents the annual standard deviation of the daily price changes in the underlying stock; and company name. Rows in the list of bull-put spreads corresponding to covered spread opportunities that are "in-the-money" are displayed in a first color, such as black. Rows in the list of bull-puts spreads corresponding to spread opportunities that are "out-of-the-money" are displayed in a second color, such as red. Finally, rows in the list of bull-puts spreads corresponding to spread opportunities that are "at-the-money" are displayed in a third color, such as green.

The bottom of this same screen, as shown in FIG. 14B provides users with the ability to define a search for bull put spreads by allowing for users to input ranges of values for a plurality of the financial data and financial search parameters. As shown, in an embodiment of the inventive system, users may enter ranges of values for numerous search parameters including the following: percent return; net credit; stock price of underlying stock; percentage earnings per share; price to earnings ratio; percentage range; average recommendation; percent volume; number of shares outstanding; percent yield; beta; and volatility. Users may also screen by a particular industry segment using screening pull down menu 1410 or by whether an option is listed in a particular organization's recommended list using recommended list pull down menu 1412. Sorting column pull down list 1414 allows a user to specify whether the results should be sorted by the values in a particular search parameter including any of the following: percent return; net credit; stock price; company name; percentage earnings per share; price to earnings ratio; percent is range; average brokerage recommendation; percent volume; share outstanding; expiration date; percent yield; beta; and volatility. Sorting month pull down list 1416 allows a user to specify whether the results should be sorted by options coming due in a particular month. Order results radio buttons 1418 allow for the user to specify whether the results should be listed by value from high-to-low or from low-to-high. In-the-money radio button 1420 allows a user to specify that only spreads that are "in-the-money" be displayed. Out-of-the-money radio button 1422 allows a user to specify that only spreads that are out of the money be displayed. At-the-money radio button 1424 allows a user to specify that only spreads that are at the money be displayed.

Thus, users can search for bull put spreads by defining a search in a screen such as that shown in FIG. 14B to arrive at a list of search results such as that shown in FIG. 14A. Upon locating a bull put spread that the user finds desirable, a user may request that the bull put spread be executed. Execution of the bull put spread requires selling a put option and purchasing a put option. Thus, the request forwarded by server 100 to brokerage server 120 comprises both a request to purchase an option and sell an option.

Referring back to FIG. 8, in the finders function 810, users may also query for bear call spreads 840. As previously mentioned, a bear call spread is a combined transaction wherein a call option is sold, usually at or near money, and another is purchased, usually one or more strikes above the sold option, to create a spread with a net credit. The maximum profit realized, or the net credit, is the difference in premiums between the two put options. The break-even point for the spread is the strike price of the first option (i.e. the option with the lower strike price) plus the net credit. While the maximum profit is realized when the strike price falls below the first put option (i.e. the option with the lower strike price), a profit of some sort is realized on the transaction provided that the stock price of the underlying stock falls below the break even point.

The percentage return on a bear call spread is calculated as follows:

$$\% \text{ return} = (\text{premium on sold call} - \text{premium on bought call}) / (\text{margin} - \text{net credit})$$

wherein $$\text{margin} = \text{sold call strike price} - \text{bought call strike price}$$

and $$\text{net credit} = \text{premium on sold call} - \text{premium on bought call}$$

For example, a bear call spread may be written on options for Microsoft Corporation. A first call option for Microsoft Corporation with an April call and a strike price of 110 may be written or sold for 2 points. A second call option for Microsoft Corporation with an April call and a strike price of 120 may be purchased for ¾ points. The percentage return for the bear call spread is calculated as follows:

% Return=(2−¼)/((120−110)−(2−¾))

% Return=1¼/(10−1¼)

% Return=14.3% if the stock price is lower than $110

Figure 15:
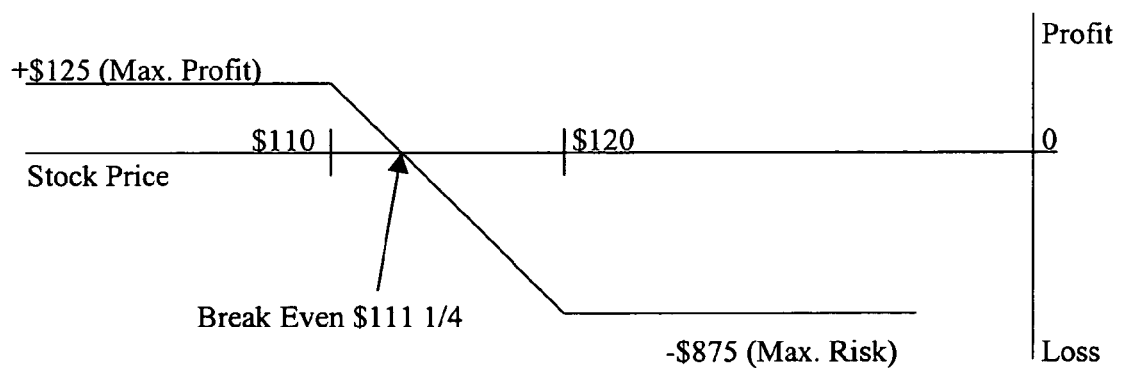
FIG. 15 is a graph of a the potential return on an exemplary bear call spread.

The maximum risk on a bull put spread is calculated as the difference between the margin and the net credit. In the present example, the maximum risk is 8¾ points (10-1¼). Accordingly, the maximum risk is $875 if the stock value is higher than $120. The maximum profit on a bear call spread is equivalent to the net credit, which in the present example is 1¼ points. In the present example, therefore, the maximum profit is $125, which is realized when the stock is higher than $110. The break even point for a bear call spread is calculated as the sum of the lower strike price and the net credit. In the present example, the break-even point is $111¼ (110+1¼). FIG. 15 provides a graph showing the maximum profit, maximum risk, and break-even point for the example.

Generally, the bear call spread is a bearish investment strategy wherein profit is realized when the stock price falls below the break-even points. When this is the case, an investor loses the premium on the bought call and gains the premium on the sold call. If the stock goes very low, the gains are limited to the net credit. Losses are limited to the difference in strike prices, usually 5 to 10 points, minus the net credit. A bear call spread is said to be "out-of-the-money" when the market price of the underlying stock is lower than the strike price of both options. A bear call spread is said to be "at-the-money" when the market price of the underlying stock is between the strike prices of the two options. A bear call spread is said to be "in-the-money" when the market price of the underlying stock is above the strike prices of both options.

Figure 16B:
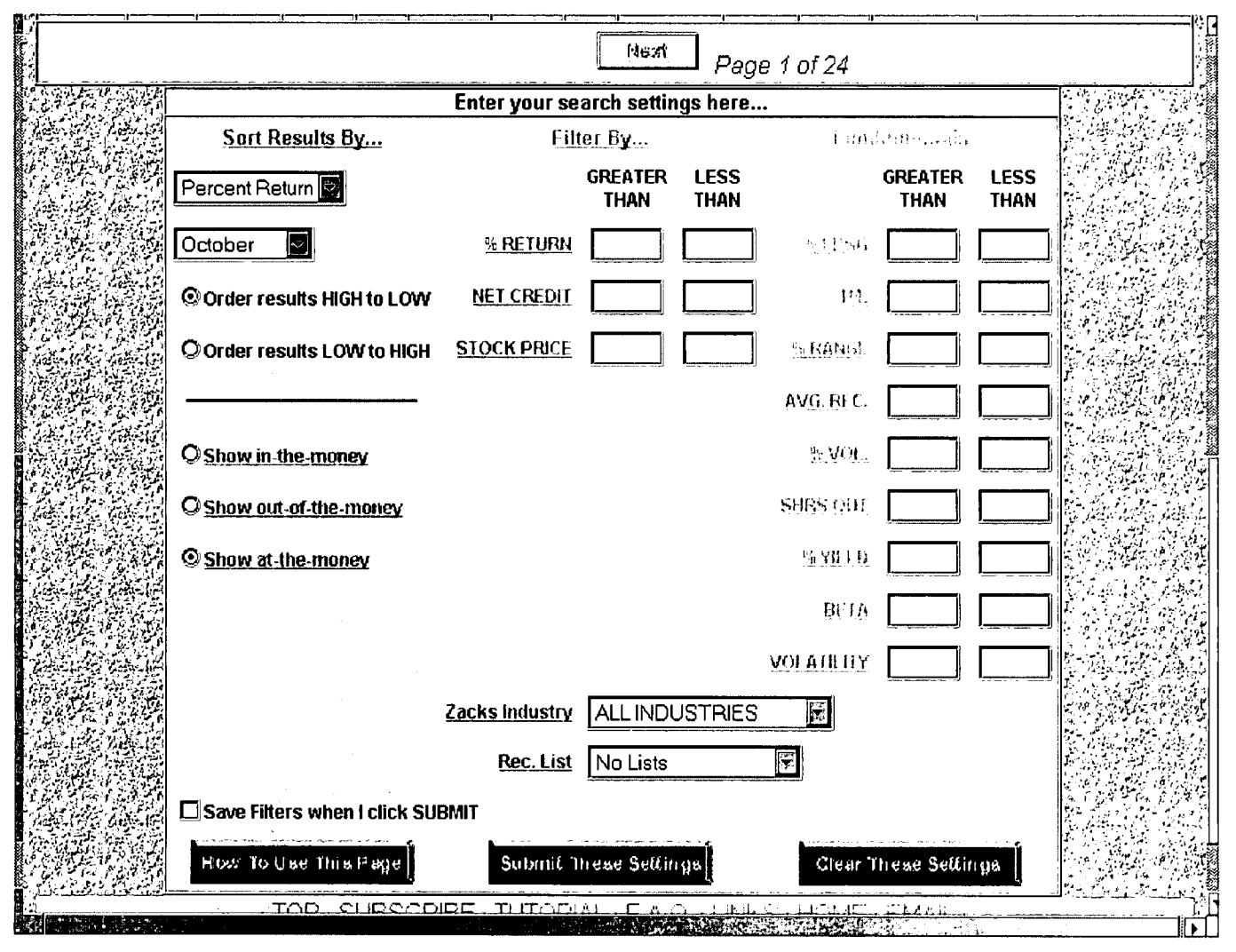

FIGS. 16A and 16B provide an illustrative example of a screen that may be employed to search for bear call spreads, wherein FIG. 16A represents the top portion of the screen and FIG. 16B represents the bottom portion of the screen. The top portion of the bull put spread screen provides a list of bear call spreads wherein each spread comprises for a particular company a call option that can be sold and a call option that can be purchased. The data that is displayed for each spread is the same as that described above in connection with FIG. 14A, with the exception being that the options that are displayed are call options as opposed to put options.

FIG. 16B provides a view of the bottom of the bear call spread screen. The portion of the screen shown in FIG. 16B serves to allow users to define screening parameters for bear call spreads and operates similarly to the screen described above with reference to FIG. 14B.

Thus, users can search for bear call spreads by defining a search in a screen such as that shown in FIG. 16B to arrive at a list of search results such as that shown in FIG. 16A. Upon locating a bear call spread that the user finds desirable, a user may request that the bear call spread be executed. Execution of the bear call spread requires writing a first call option and purchasing a second call option. Thus, the request forwarded by server 100 to brokerage server 120 comprises both a request to purchase an option and a request to sell an option.

Again referring to FIG. 8, finders function 810 further comprises the capability to screen for collar spread opportunities 842. A collar refers to a transaction combining a standard covered call, wherein a call option is sold and a stock is purchased, with the purchase of a put option. The put option is generally one or two strike prices below the stock price. The return on the collar spread is the same as that for the covered call, reduced by the cost of the put option. Generally, the user interface for searching for collar spreads is similar to that described above for covered calls with some adjustments to account for the put option.

Referring to FIG. 8, finders function 810 further comprises the capability to search for strangle spread opportunities 844, butterfly spread opportunities 846, straddle spread opportunities 847, and calendar spread opportunities 848. With respect to each of these option spread strategies, the user interface is similar to that described above with respect to the bull put spreads and bear call spreads. Furthermore, it should be noted that if a user selects to execute one of the above spread strategies using the system, the request that is forwarded to the brokerage server requests the simultaneous execution of multiple option trades that comprise the spread strategy.

Referring back to FIG. 8, a wizard function 849 is also provided as part of the finders function 810. Wizard function 849 is directed at assisting investors who may not be adept at defining values for search parameters in locating option investment opportunities. The wizard function 849 directs a series of questions to the user regarding general investment preferences. Using the user responses, the system formulates values for the search parameters described above and searches the database for investment opportunities meeting the system defined parameter values.

Figure 17:
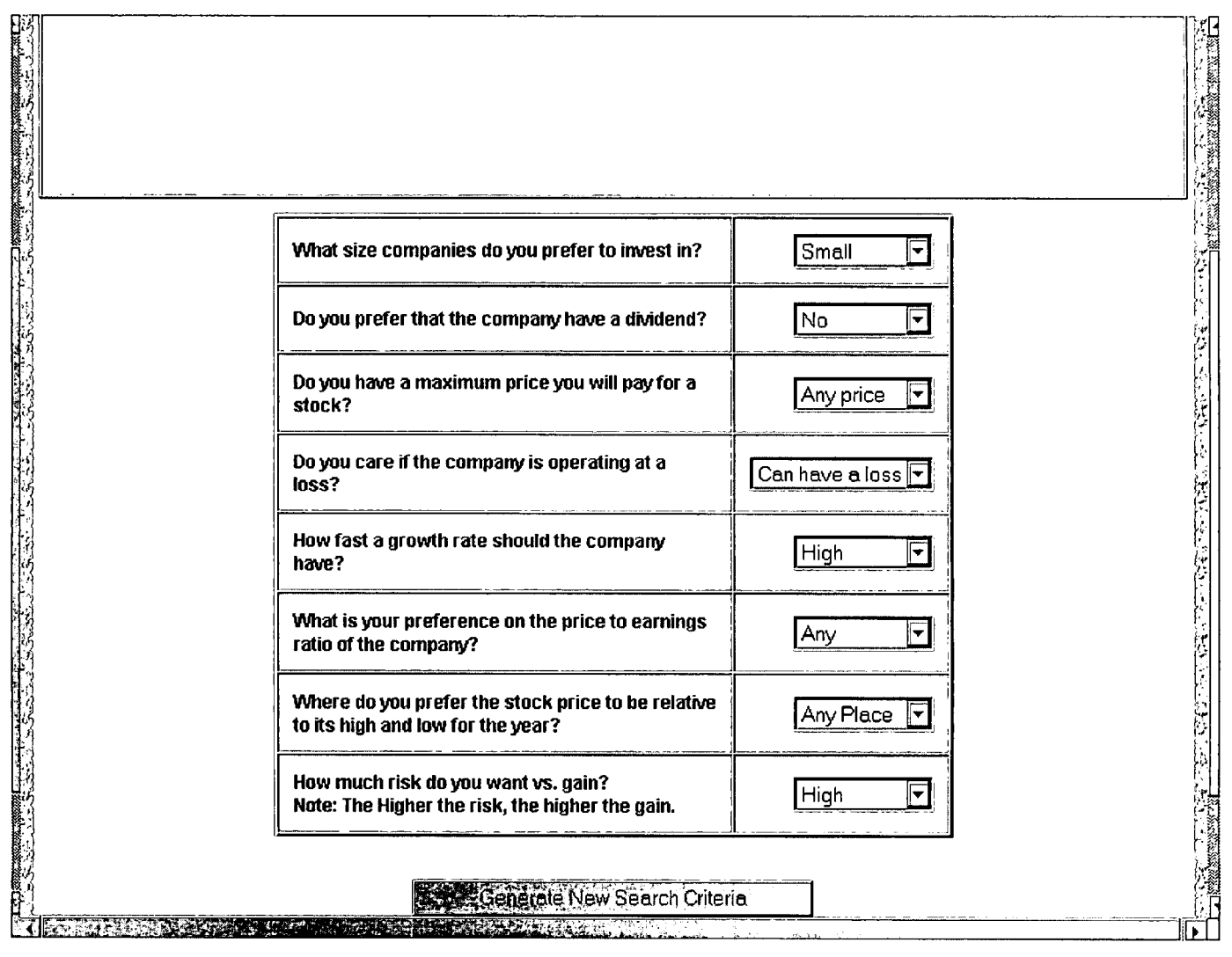

FIG. 17 provides a view of an exemplary screen for gathering information from a user as part of the wizard function 849. As shown, a series of questions are presented to the user regarding investment preferences. In the exemplary system the user is prompted to provide responses to the following questions: What size companies do you prefer to invest in?; Do you prefer that the company have a dividend?; Do you have a maximum price you will pay for a stock?; Do you care if the company is operating at a loss?; How fast a growth rate should the company have?; What is your preference on the price to earnings ratio of the company?; Where do you prefer the stock price to be relative to its high and low for the year?; and How much risk do you want vs. gain?. Upon submission of the user responses, the system selects search values using the user responses, executes a search using these values, and presents the results to the user. In an exemplary embodiment, the user responses are employed to formulate and execute a search for covered calls. It should be noted, however, that user responses to questions could similarly be used to search for other types of investments such as bull put spreads, bear call spreads, collar spreads, strangle spreads, butterfly spreads, and straddle spreads.

Figures 18A, 18B:
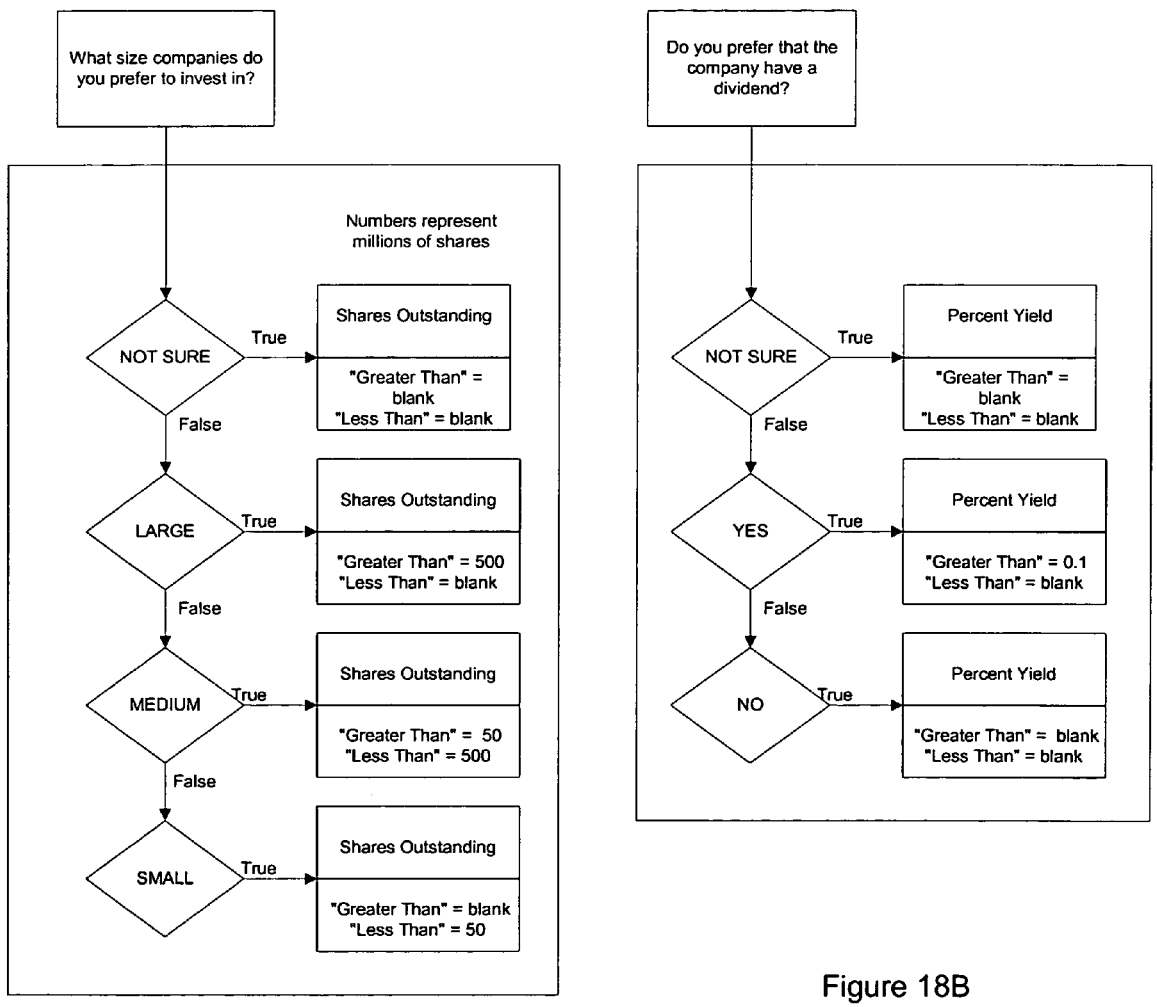
FIGS. 18A through 18F provide flow charts of processes for deriving search parameters from user responses to system prompts.

FIGS. 18A-18F provide flow charts of the processes employed by the system to select values for search variables corresponding to the user's responses to the above-described questions. Referring to FIG. 18A, a flowchart is provided of the process for selecting values for the "shares outstanding" search parameter that reflect the user response to the question "what size companies do you prefer to invest in." As shown, if the user responds that he/she is not sure, the "shares outstanding" parameter that appears on a search screen such as is assigned a blank value for both the "greater than" and "less than" limits. If the user responds that he/she prefers large companies, the "shares outstanding" parameter is assigned a value of 500 for the "greater than" limit and a blank value for the "less than" limit. If the user responds that he/she prefers medium sized companies, the "shares outstanding" search parameter is assigned a value of 50 for the "greater than" limit and a value of 500 for the "less than" limit. If the user responds that he/she prefers small companies, the "shares outstanding" search parameter is assigned a value of 50 for the "less than" limit and a blank value for the "greater than" limit.

Referring to FIG. 18B, a flowchart is provided of the process for selecting values for the shares outstanding parameter that reflect the user response to the question "do you prefer that the company have a dividend." As shown, if the user responds that he/she is not sure, the "percent yield" search parameter is assigned a blank value for both the "greater than" and "less than" limits. If the user responds that he/she prefers companies with a dividend, the "percent yield" parameter is assigned a value of 0.1 for the "greater than" limit and a blank value for the "less than" limit. If the user responds that he/she prefers companies that do not pay a dividend, the "percent yield" search parameter is assigned a blank value for both the "greater than" and "less than" limits.

Figures 18C, 18D:
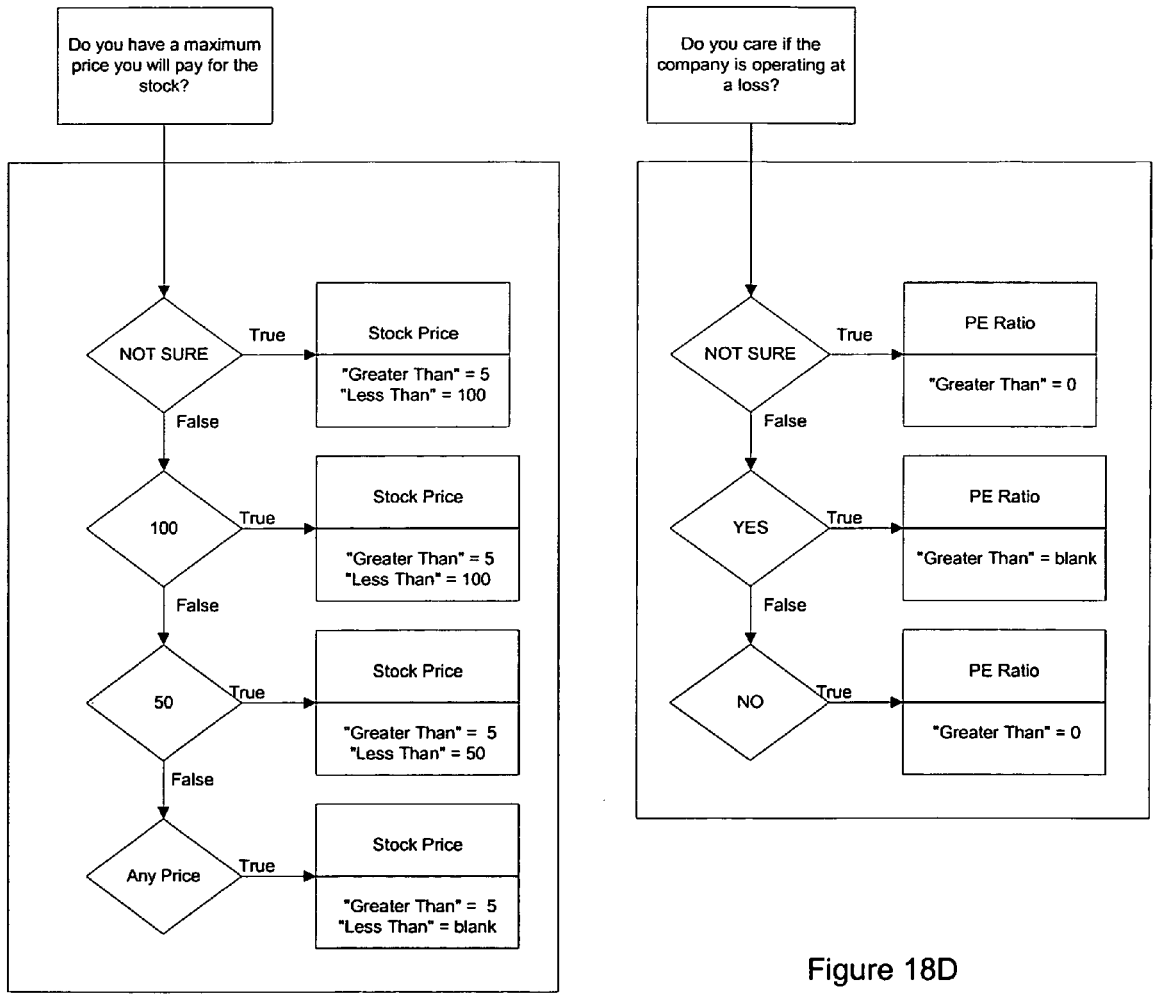

Referring to FIG. 18C, a flowchart is provided of the process for selecting values for the "stock price" search parameter that reflect the user response to the question "do you have a maximum price you will pay for the stock price." As shown, if the user responds that he/she is not sure, the "stock price" parameter is assigned a value of 5 for the "greater than" limit and a value of 100 for the "less than" limit. If the user responds that the maximum price he/she will pay for a stock is 100, the "stock price" parameter is assigned a value of 5 for the "greater than" limit and a value of 100 for the "less than" limit. If the user responds that the maximum price he/she will pay for a stock is 50, the "stock price" search parameter is assigned a value of 5 for the "greater than" limit and a value of 50 for the "less than" limit. If the user responds that he/she is willing to pay any price, the "stock price" search parameter is assigned a value of 5 for the "greater than" limit and a blank value for the "less than" limit.

Referring to FIG. 18D, a flowchart is provided of the process for selecting values for the price to earnings ratio parameter that reflect the user response to the question "do you care if the company is operating at a loss." As shown, if the user responds that he/she is not sure, the "price to earnings ratio" is assigned a value of 0 for the "greater than" limit. If the user responds that he/she cares if the company is operating at a loss, the "price to earnings ratio" parameter is assigned a blank value for the "greater than" limit. If the user responds that he/she does not care if the company is operating at a loss, the "price to earnings ratio" search parameter is assigned a value of 0 for the "greater than" limit.

Figure 18E:
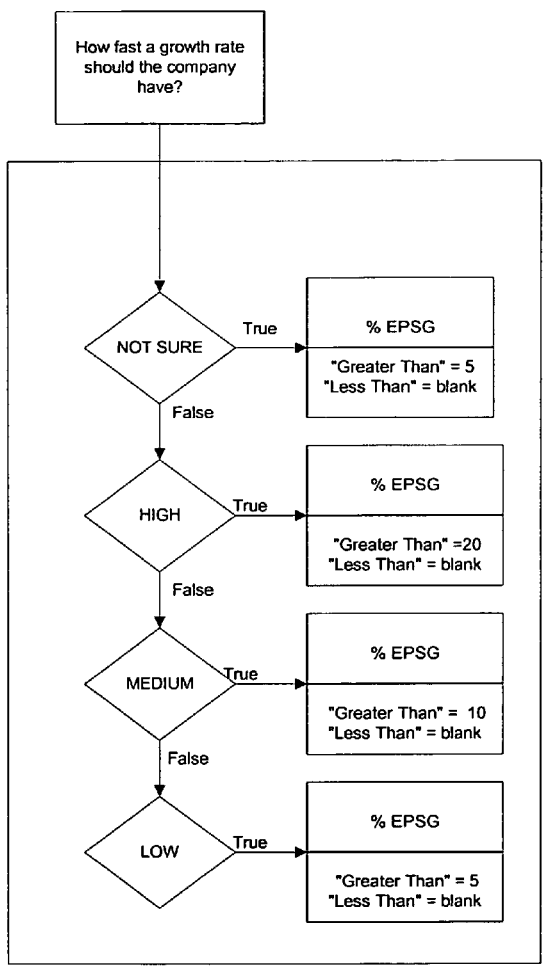

Referring to FIG. 18E, a flowchart is provided of the process for selecting values for the "percent EPSG" search parameter that reflect the user response to the question "how fast a growth rate should the company have." As shown, if the user responds that he/she is not sure, the "% EPSG" parameter is assigned a value of 5 for the "greater than" limit and a blank value for the "less than" limit. If the user responds that he/she prefers companies with a high growth rate, the "% EPSG" parameter is assigned a value of 20 for the "greater than" limit and a blank value for the "less than" limit. If the user responds that he/she prefers companies with a medium growth rate, the "% EPSG" search parameter is assigned a value of 10 for the "greater than" limit and a blank value for the "less than" limit. If the user responds that he/she prefers companies with a low growth rate, the "% EPSG" search parameter is assigned a value of 5 for the "greater than" limit and a blank value for the "less than" limit.

Figure 18F:
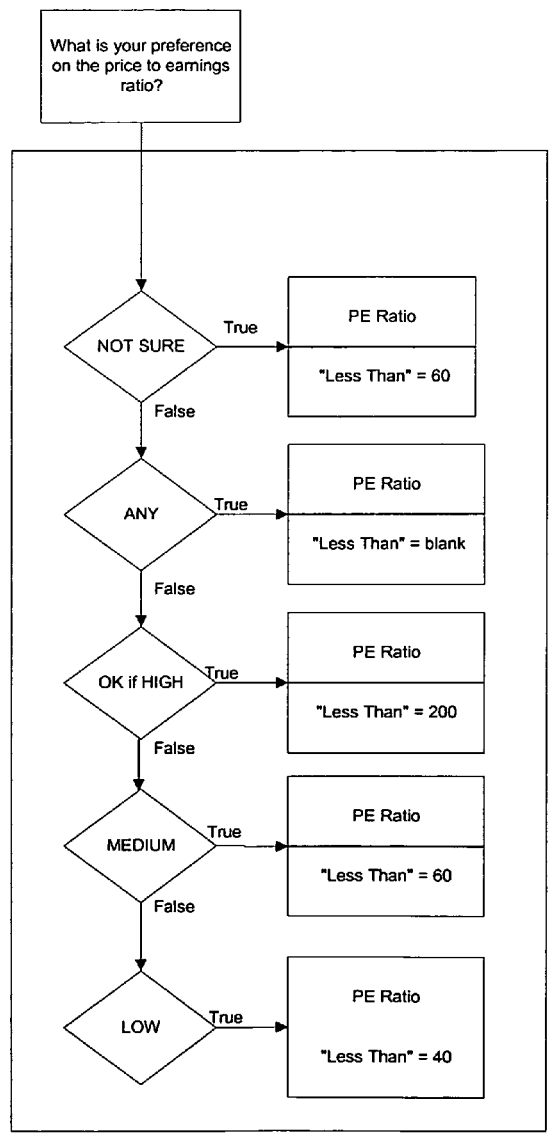

Referring to FIG. 18F, a flowchart is provided of the process for selecting values for the "PE ratio" search parameter that reflect the user response to the question "what is your preference on the price to earnings ratio." As shown, if the user responds that he/she is not sure, the "PE ratio" parameter is assigned a value of 60 for the "less than" limit. If the user responds that the PE ratio can be anything, the "PE ratio" parameter is assigned a blank value for the "less than" limit. If the user responds that the price to earnings ratio can be high, the "PE ratio" search parameter is assigned a value of 200 for the "less than" limit. If the user responds that he/she prefers companies with medium price to earnings ratios, the "PE ratio" search parameter is assigned a value of 60 for the "less than" limit. If the user responds that he/she prefers companies with a low price to earnings ratio, the "PE ratio" search parameter is assigned a value of 40 for the "less than" limit.

It should be noted that the business rules reflected in the flowcharts of FIGS. 18A through 18F are in no way meant to be limiting, but represent exemplary values and business rules that may be employed to translate user-defined investment preferences to actual search values. Applicants contemplate that a systems employing other values and business rules also fall within the scope of the invention.

Referring back to FIG. 8, according to another aspect of the exemplary system, there is provided a portfolio function 812 that allows for listing stock and stock option transactions to track the value of the portfolio. The transactions can be tracked in a format to evaluate transactions on a profits and losses basis 850 or by a snapshot 852 from the current day of trading.

Figure 19:
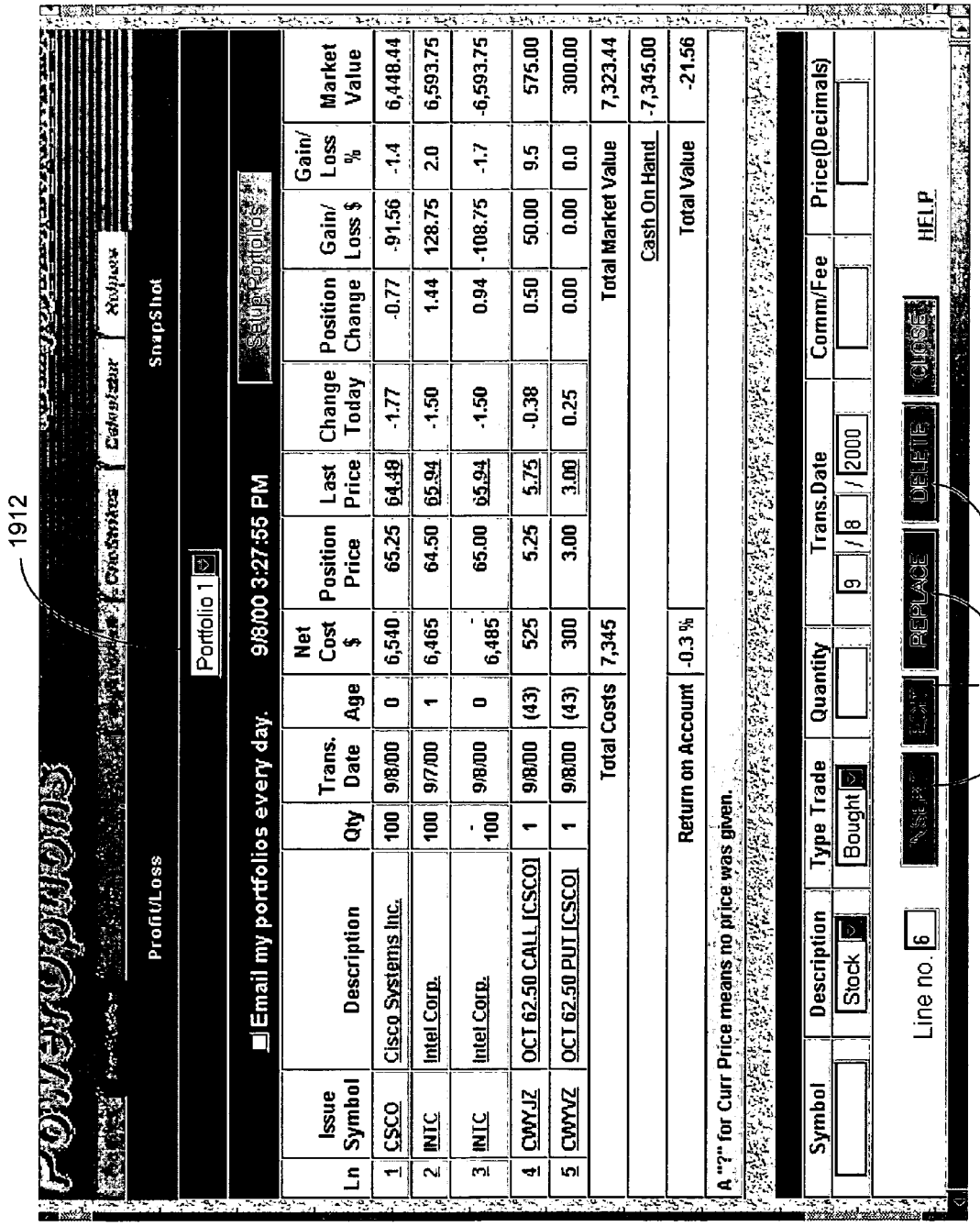
FIG. 19 is a diagram of an exemplary user interface screen for tracking profits and losses on an investment portfolio.

FIG. 19 provides a view of an exemplary screen for tracking the profits and losses 850 encountered in a portfolio of stock and stock option transactions. As shown, the profit/loss portfolio screen contains a line for each transaction that has been entered into the portfolio. For each transaction that is listed in the portfolio, the following data items are displayed: issue symbol—denoting the call symbol for the stock or stock option that has been bought or sold; description—providing the name of the company for stocks and the name of the option for options; quantity—denoting the quantity of the issue that was either bought or sold; transaction date—denoting the date the transaction was executed; age—denoting the period that has elapsed since the transaction; net cost—denoting the amount of money that was involved in the transaction; position price—denoting the dollar amount paid or received for the particular issue at the time of the transaction; last price—denoting the last price paid for the same issue in current trading; change today—denoting the amount the issue has changed in the present day's trading; position change—denoting the amount the issue price has changed since the transaction was executed; gain/loss—denoting the amount that would be either gained or loss if profits were taken today; and market value—denoting the current market value of the position in the particular issue. The profit and loss portfolio screen also provides for aggregating the total cost of the portfolio, the total market value of the portfolio; the amount of cash on hand; the total value of the portfolio; and the percentage return on the account. Transactions may be added and removed from those listed and existing transaction data may be edited using the lower portion of the screen. Specifically, the lower portion of the screen allows users to enter and edit values for the issue symbol, whether the issue is a stock or option; the type of transaction such as whether the stock is bought or sold; the quantity of the issue that are being bought or sold; the date of the transaction; any commission that may been part of the transaction; and the price that was paid for the issue. When this information has been entered or edited, it can be reflected in the portfolio using buttons 1910. It should be noted that multiple portfolios may be stored and analyzed using a system in accordance with the present invention. Pull down list 1912 provides for switching between portfolios.

Figure 20:
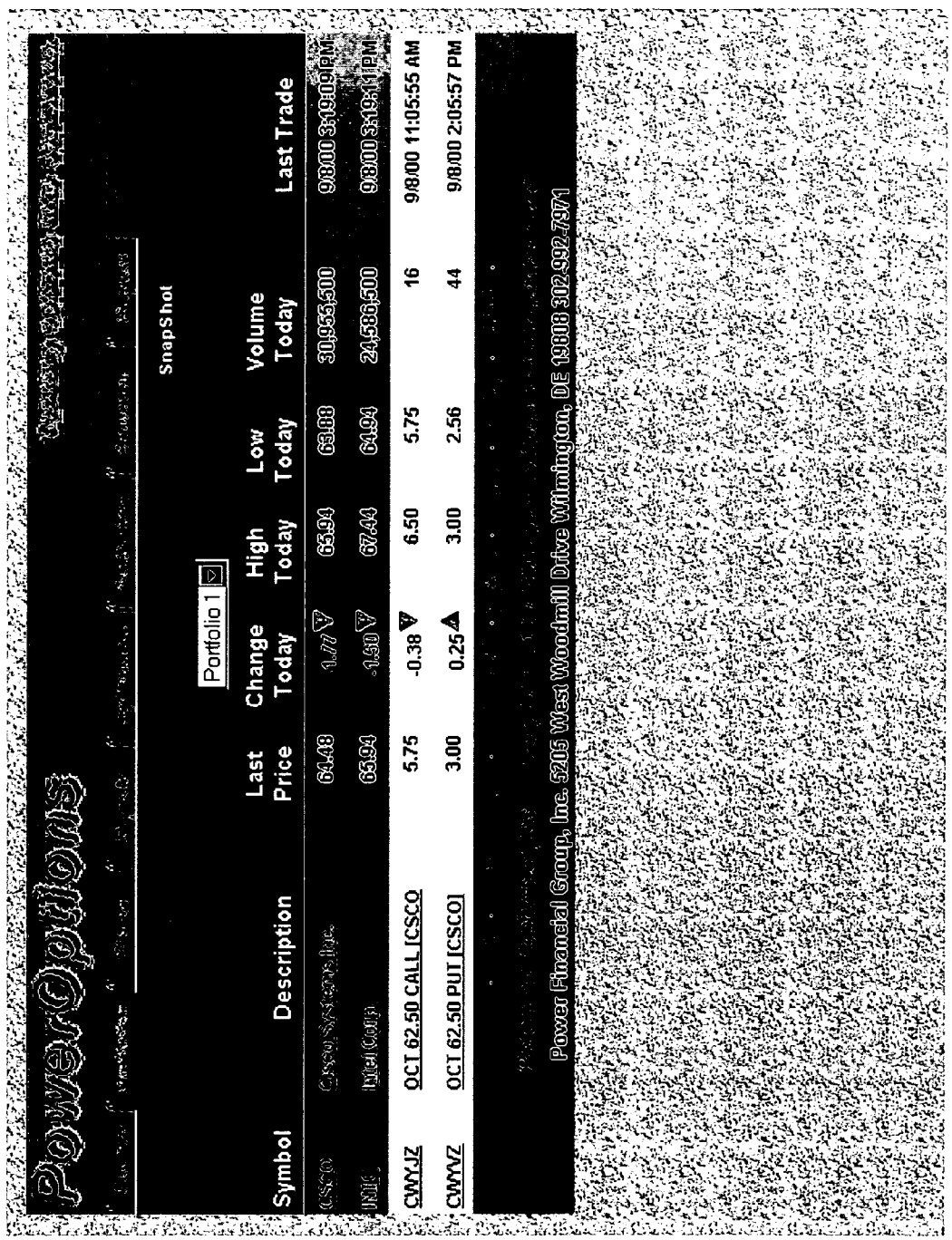
FIG. 20 is a diagram of an exemplary user interface screen for tracking snap shots of an investment portfolio.

Portfolios of issue transactions may also be listed to show the most recent market information regarding the issues. FIG. 20 provides a view of an exemplary screen for listing such a market "snapshot" related to a portfolio of transactions. As shown, a market "snapshot" of a portfolio of transactions involves displaying the following for each issue that is part of a portfolio: a trading symbol; a description of the issue meaning the company name for stocks and option description for options; the most recent trade price for the issue; the change in the price of the issue in the current day of trading; the highest price paid for the issue in the current day of trading; the lowest value paid for the issue in the current day of trading; the total volume of the issue that has been traded in the current day of trading; and the time and date the last trade on the issue was made. The data in a snapshot of a portfolio is updated periodically so as to provide users with current information regarding the issues in their portfolio.

According to an aspect of the invention, there is provided an alert function that provides guidance to users in managing his/her portfolio. The alert function of the present system improves upon existing alert systems, which merely provide notice to a user, by suggesting actions that ought to be taken with respect to the portfolio in response to the event that triggered the alert.

An exemplary alert function in accordance with this aspect of the present invention is one based upon percentage of profit realized on an investment. In the case of this exemplary alert, when the percentage of profit on an investment drops below a certain value, the user is notified of the condition. The user is provided with one or more suggested actions that should/ could be taken in response to the drop in return on investment.

FIG. 21A is a diagram of an exemplary user interface screen for presenting an alert. As shown in the middle of the screen, the user is alerted to the fact that an option, XLWJQ, that is being tracked in the user's portfolio has dropped 80% in price from 35.50 to 5.75. Since the price has declined 83.5%, as noted in the profit/loss % column, an alert has been generated. A user may click on the underlined hot link "Line#2" to obtain advice regarding actions that may be taken with respect to his/her portfolio to react to the drop in profit.

Figure 21B:
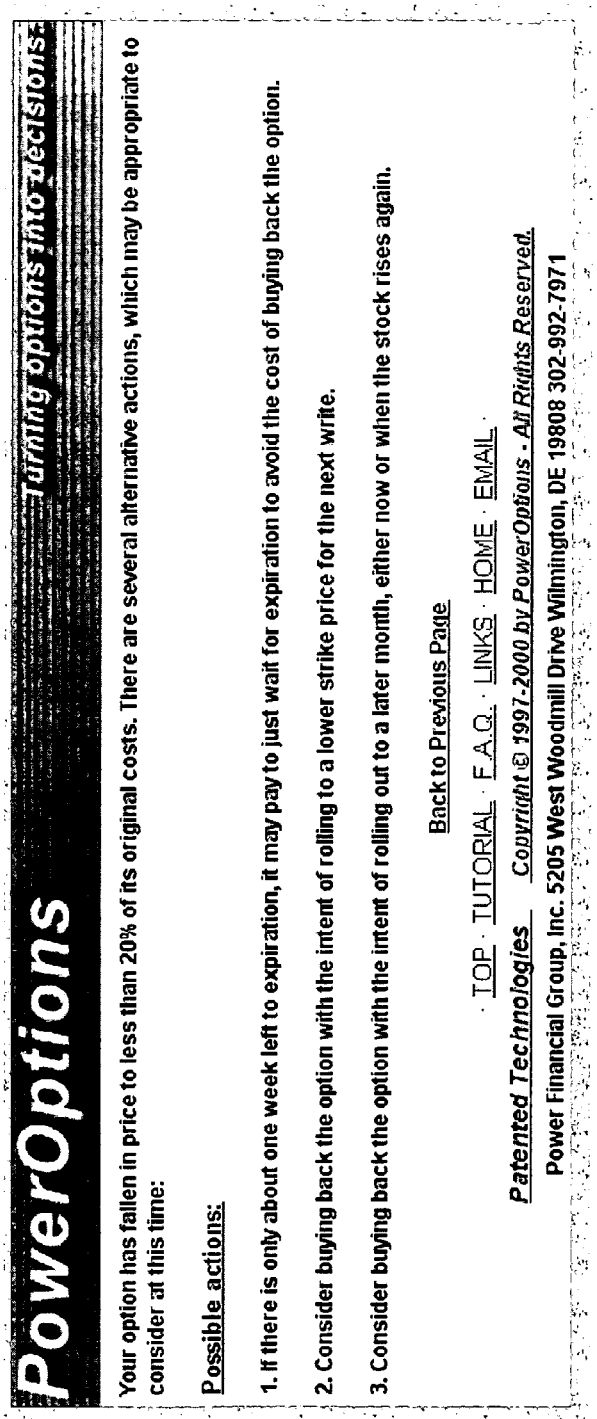

If the user clicks on the link, they are presented with a screen such as is shown in FIG. 21B. As shown, the user is presented with a short explanation of three possible actions that may be taken in response to the drop in profit. The user can select any one of the three to obtain more detailed information regarding the particular action. For example, if the user were to select suggested action #2, which suggests buying back the option with the intent of rolling to a lower strike price for the next write, the user is presented the several options that have a lower strike price, for example 80 or 75, along with the associated potential income and percentage profit. The financials associated with these suggested alternatives are automatically calculated and presented to the user based upon the initial profit observation. This concept could be extended to present the profit and income for several months out in time. Of course, if the user selects either suggested action 1 or 2, they would be provided with similar information associated with taking that particular course of action.

The percent profit is only one of several alerts that are provided by a system in accordance with the invention. Other alerts include the following: time of year (for tax purposes); actual price vs. the number of strikes away an option may be; percentage loss; amount of premium relative to the Black-Scholes value (i.e. whether the investment is overvalued or undervalued); large percentage change in a stock or option value. Alerts may be set with respect to any of these. Should any of these alerts be triggered, similarly to the percent profit example explained above, the user is presented with suggested actions to be taken with respect to his/her portfolio in response to the trigger event.

Option investors may wish to view all or a large portion of the options relating to a particular stock. Accordingly, referring to FIG. 8, a system in accordance with the present invention further provides a "chain" function 814 which allows users to view the strike option prices and option months available for a selected stock. The options can be viewed all together 864 or can be limited either to only those with two strikes above and below the present stock price 860, or to only those within four strikes of the present stock price 862.

It is also useful to view an option chain as they apply to a spread strategy. A spread chain presents the combinations of options that can be used to create a spread between various strike prices for several months of expiration. Accordingly, chain function 814 further comprise bull put spread chain 866, bear call spread chain 868, collar spread chain 867, strangle spread chain 868, butterfly spread chain 870, straddle spread chain 870, and calendar spread chain 872.

Figure 22A:
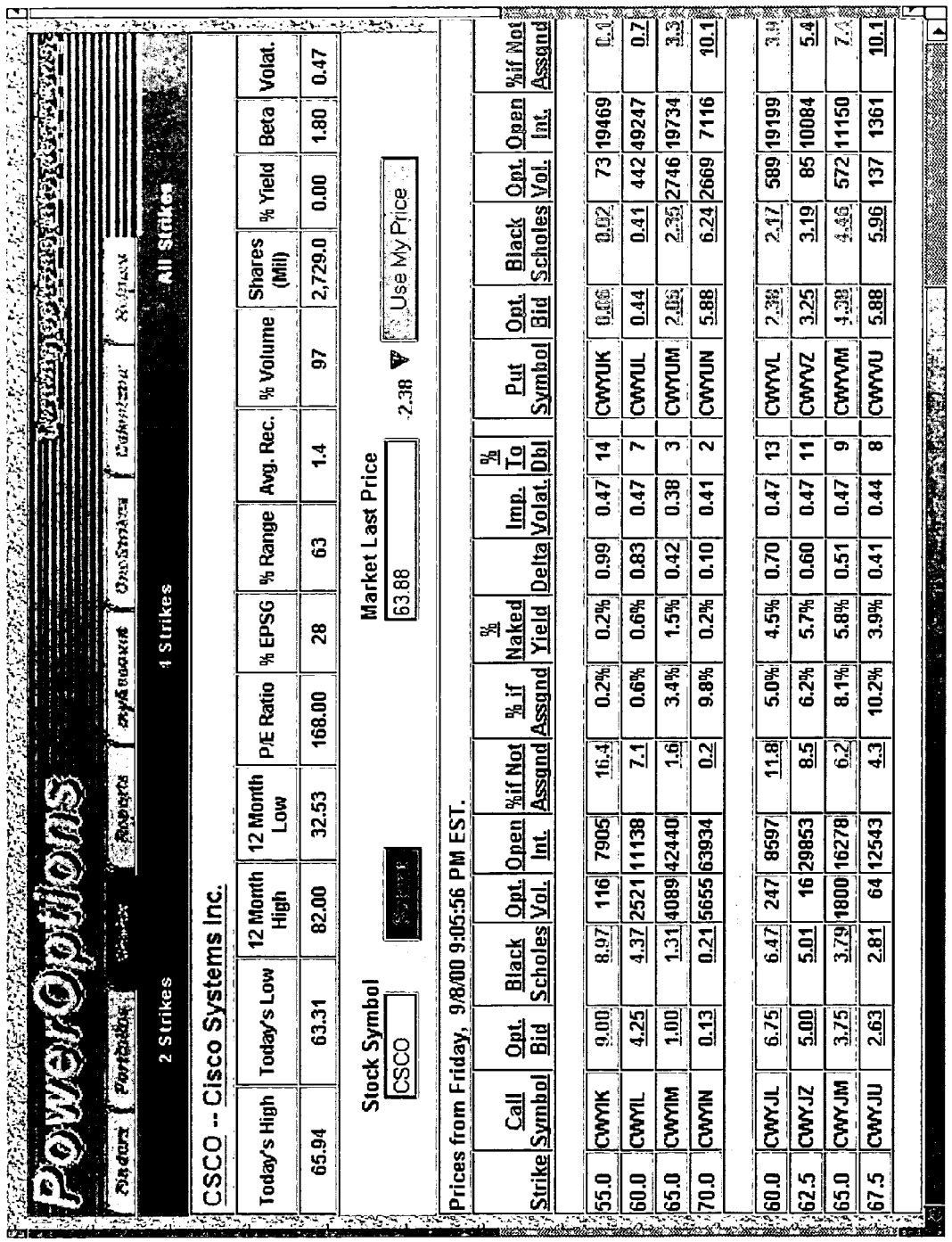

FIGS. 22A and 22B provide a schematic diagram of an exemplary screen in accordance with the present invention for viewing chains of options having two strikes above and two strikes below the market value of the stock in a particular company, wherein FIG. 22A represents the top portion of the screen and FIG. 22B represents the bottom portion of the screen. As shown, for a user-selected stock, the system displays the following information: current stock price; the highest trading price for the stock in the present day of trading; the lowest trading price for the stock in the present day of trading; the highest trading price for the stock price in the past twelve months; the lowest trading price for the stock in the past twelve months; the price to earnings ratio; the percentage earnings per share; the percentage range; the average broker recommendation; the percentage volume; the number of shares traded in the present day of trading; the percentage yield; the beta; and the volatility of the stock.

The put and call options related to the stock are shown below the stock data for the particular corporation. As shown in FIGS. 22A and 22B, for each option, the following data items are displayed: strike price; call symbol; option bid price; Black-Scholes value; option volume; open interest; percent if not assigned; percent if assigned; the yield on a naked transaction; delta; implied volatility; and percent to double. In the exemplary embodiment displayed in FIGS. 22A and 22B corresponding to displaying two strike option chains, only those options within two strikes of the current trading price are displayed. As shown, the options are grouped by the month in which they become due. For each group of options, the price basis or the market last price, expiration date, and days left to expiration are displayed.

Chains of options can also be viewed to show those options within four strikes of the current stock price. Furthermore, a system in accordance with the present invention can display all of the options related to a particular stock. Screens for presenting four-strike and all-strike embodiments are not shown but are the same as those displayed in FIGS. 22A and 22B with the exception that more options are displayed.

Referring back to FIG. 8, chains may also be generated for bull put spreads 866, bear call spreads 868, collar spreads 867, strangle spreads 868, butterfly spreads 870, straddle spreads 870, and calendar spreads 872. Generally, the chains for the various spread strategies involve listing for a particular underlying stock, the spread opportunities for options expiring in a particular month. An exemplary user interface report for a bull put spread chain is shown in FIG. 23. As shown, the bull put spreads for Agilent technologies are listed and grouped by the date that the underlying put options expire. The information displayed for each spread includes the percentage return, the net credit, and the break-even point. The reports for the other spread chains are similar to that of the bull put spread.

Figure 24:
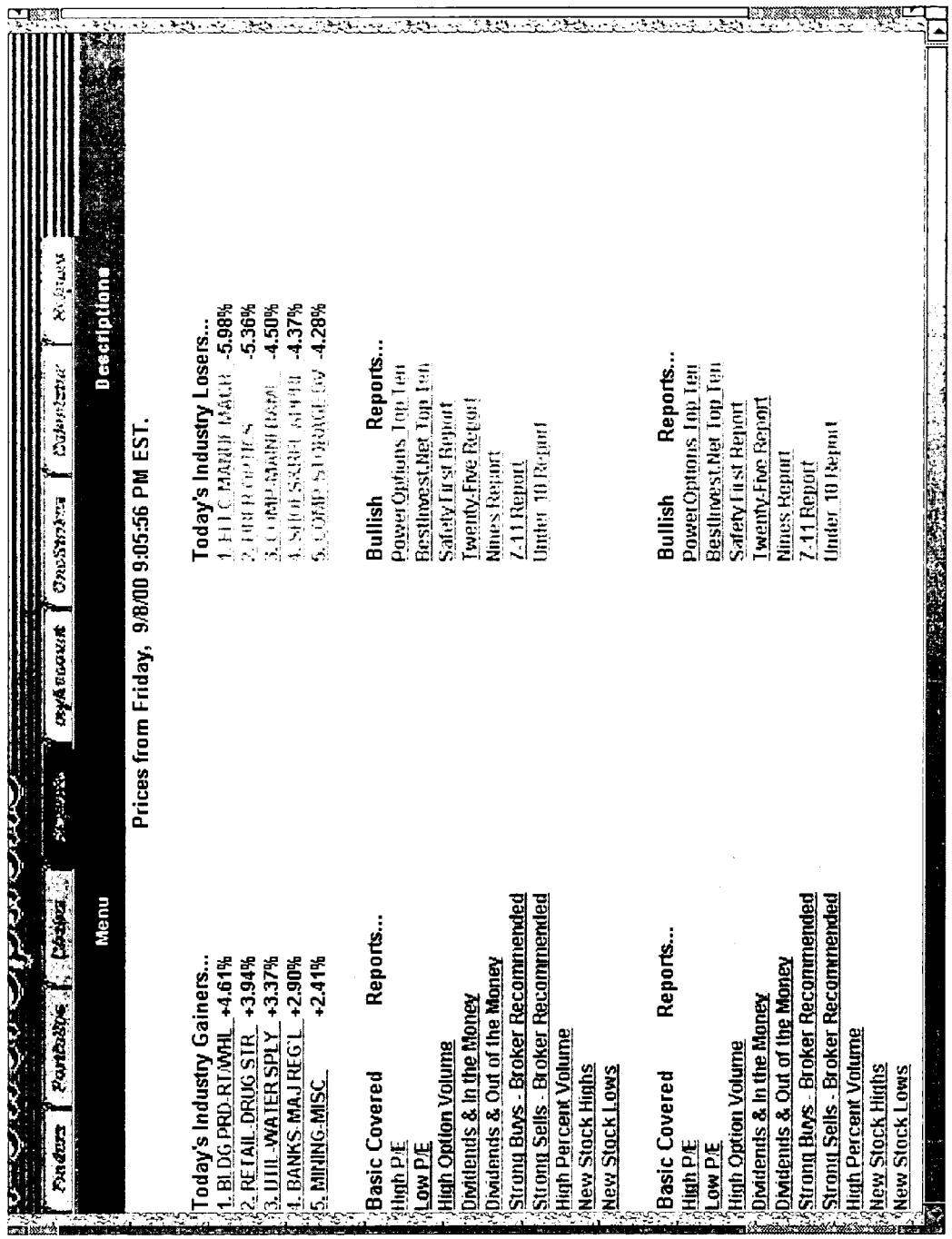
FIG. 24 is a diagram of an exemplary user interface screen for listing reports containing financial data.

Referring again to FIG. 8, a system in accordance with the present invention further provides a predefined reports function 816. The predefined reports are generated using the finders functionality described above with reference to FIGS. 9A and 9B. The search values have been saved and are available for repeated reference as predefined reports. The predefined report has an investment theme. FIG. 24 is a diagram of an exemplary screen listing some of the predefined reports that are available. As shown, users may select to view reports on the industry groups that were gainers and losers in the most recent day of trading. FIG. 25 provides a view of an exemplary industry report. As shown, an industry report may include the following data related to each listed company: industry rank; company name; stock symbol; previous average recommendation; average recommendation; last quarter earnings per share; percent surprise earnings per share which refers to the percentage higher or lower that the actual earnings are as compared to the forecast or expected value; an earnings per share estimate for the next quarter; an earnings per share estimate for the current year; and an earnings per share estimate for the next year. Links to additional web pages providing additional information regarding the listed companies are also provided. Specifically, links to the following are provided: charts; options; income; balances; and news.

Referring back to FIG. 24, the reports functionality also provides access to certain predefined reports for put and call options. These reports can generally be categorized into basic covered reports, which includes reports having particular relevance to covered options trading, and bullish reports, which have particular relevance to trading in options which have a bullish outlook. As shown in FIG. 24, predefined reports in the area of covered option reports include the following: high price to earnings ratio report—a report screened to show issues with the very highest price to earnings ratios for the underlying stocks; low price to earnings ratio report—a report screened to show issues with the lowest price to earnings ratios for the underlying stocks; high option volume—a reports which screens for stocks with the very highest option volume and which also have good returns and option premiums of greater than $1.00; broker recommended strong buys—report which screens for issues with the highest broker recommendations, returns of over 5%, and an open interest greater than 10 contracts; broker recommended strong sells—report which screens for issues which have hold or sell brokerage recommendations; new stock highs report—report which screens for issues that reached new stock price highs since and/or during the last update; new stock lows report—report which screens for issues that have a percentage range of less than five which implies the stock is reaching a new low or near a new low; dividend & in the money report—report which screens for stocks that pay dividends, have lower price/earnings ratios, and are in the money only with a return potential larger than 6 percent; and dividends & out of the money—report which screens for stocks that pay dividends, have lower price to earnings ratios, and are also only out of the money with a return potential larger than 6 percent.

Bullish issue reports may include the following: power options top ten report—report which screens for a selected group of companies with finite, yet growing earnings, good broker recommendations, high relative strength, and reasonable price to earnings ratios; bestinvest.net report—reports which screens for conservative stocks with characteristics including fairly low price to earnings ratios, favorable broker recommendations, and good relative strength; safety first report—report which screens for stocks that are good for long term holding due to the companies large capitalization, proven earnings, lower price earnings ratio, and favorable stock broker recommendations; twenty five report—report which screens for stocks with a trading price under $25, an average broker recommendation of buy or strong buy, and returns over nine percent, wherein with respect to call options each stock has finite earnings and a favorable broker recommendation, and with respect to put reports, each stock has a favorable recommendation and may have negative earnings; nines report—report which screens for options trading at or in the money and with an assigned return of at least nine percent; 7-11 report—report which screens for issues that will return 7% or greater IF NOT assigned and will return 11% or greater IF assigned wherein with respect to reports on call options, each stock has finite earnings, and a favorable broker following, and with respect to put options, each stock has less than favorable broker recommendations and may have negative earnings; and under 10 report—report which screens for options with underlying stocks less than 10 but more than 5.

FIG. 26 provides a view of an exemplary predefined report. As shown, the report comprises values for a plurality of financial data items related to each listed option. The data items that are listed in this exemplary report and the other option reports are the same or similar to those described above with reference to FIGS. 9 and 11A.

Figure 27:
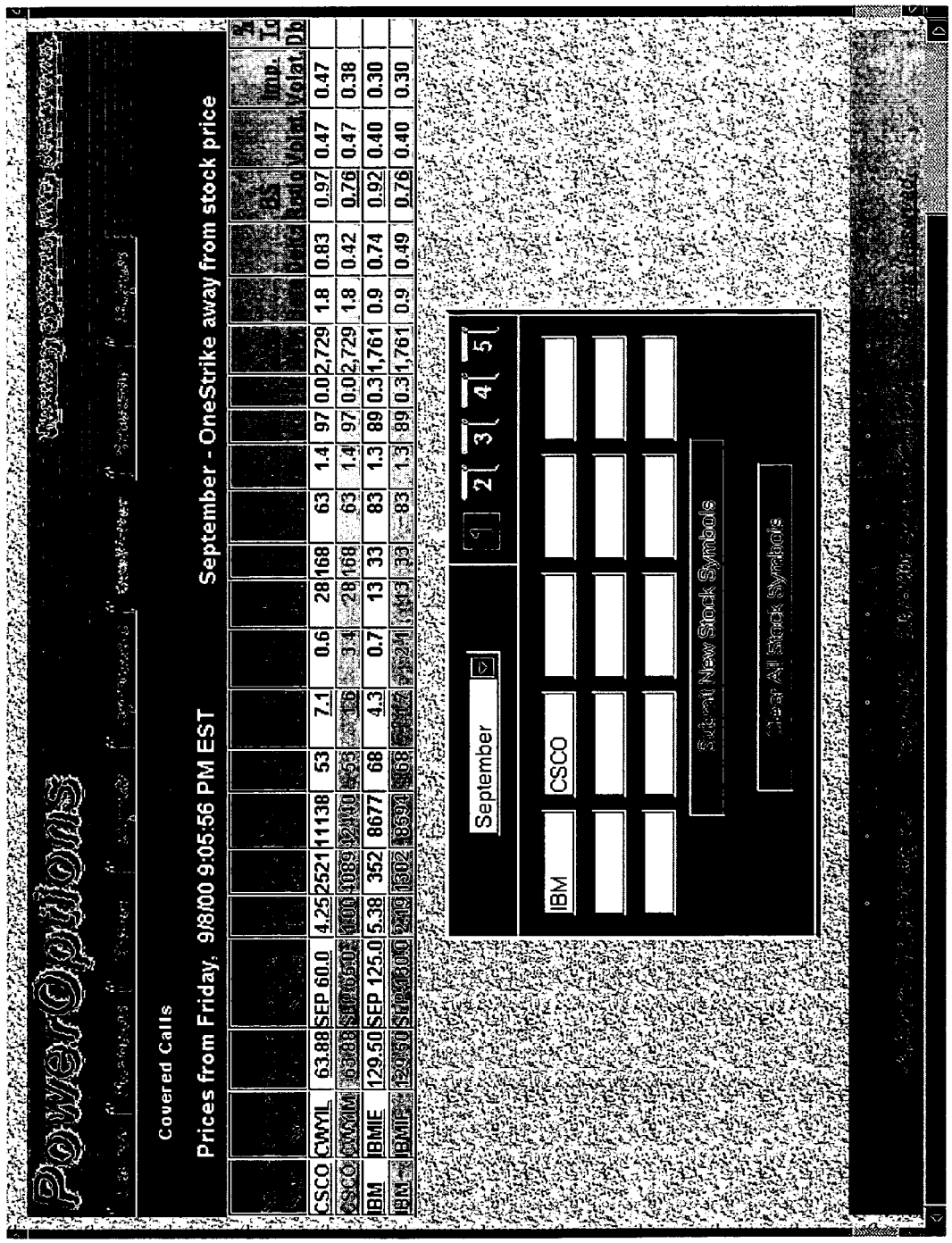
FIG. 27 is a diagram of an exemplary user interface screen for displaying one-strikes of a covered call.

Referring back to FIG. 8, a system in accordance with the invention may also provide a one-strike function 818. The one-strike feature provides the capability to list for a plurality of stocks, the options that are within one strike of the current stock price. Thus, the function is similar to that described above in relation to chains function 814, with the main difference being that only options within one strike of the stock price are listed. As shown in FIG. 8, the one strike function 818 is available to list one-strikes for covered calls 880, covered puts 882, naked calls 884, and naked puts 886. It should be noted, however, that while not shown, the one strike functionality might further be provided for option spread strategies as well. FIG. 27 provides a view of a screen for presenting one strike for covered calls. As shown in FIG. 27, users submit the companies for which they desire to see the list of one strikes and are presented with a list of the data related to those particular companies. The information displayed for each option is the same as that described above in connection with finders function covered calls 830 and shown in FIG. 9A. The screens for displaying one strikes for covered puts, naked calls, and naked puts are similarly analogous to those described above in connection with the finders function 810.

Figure 28:
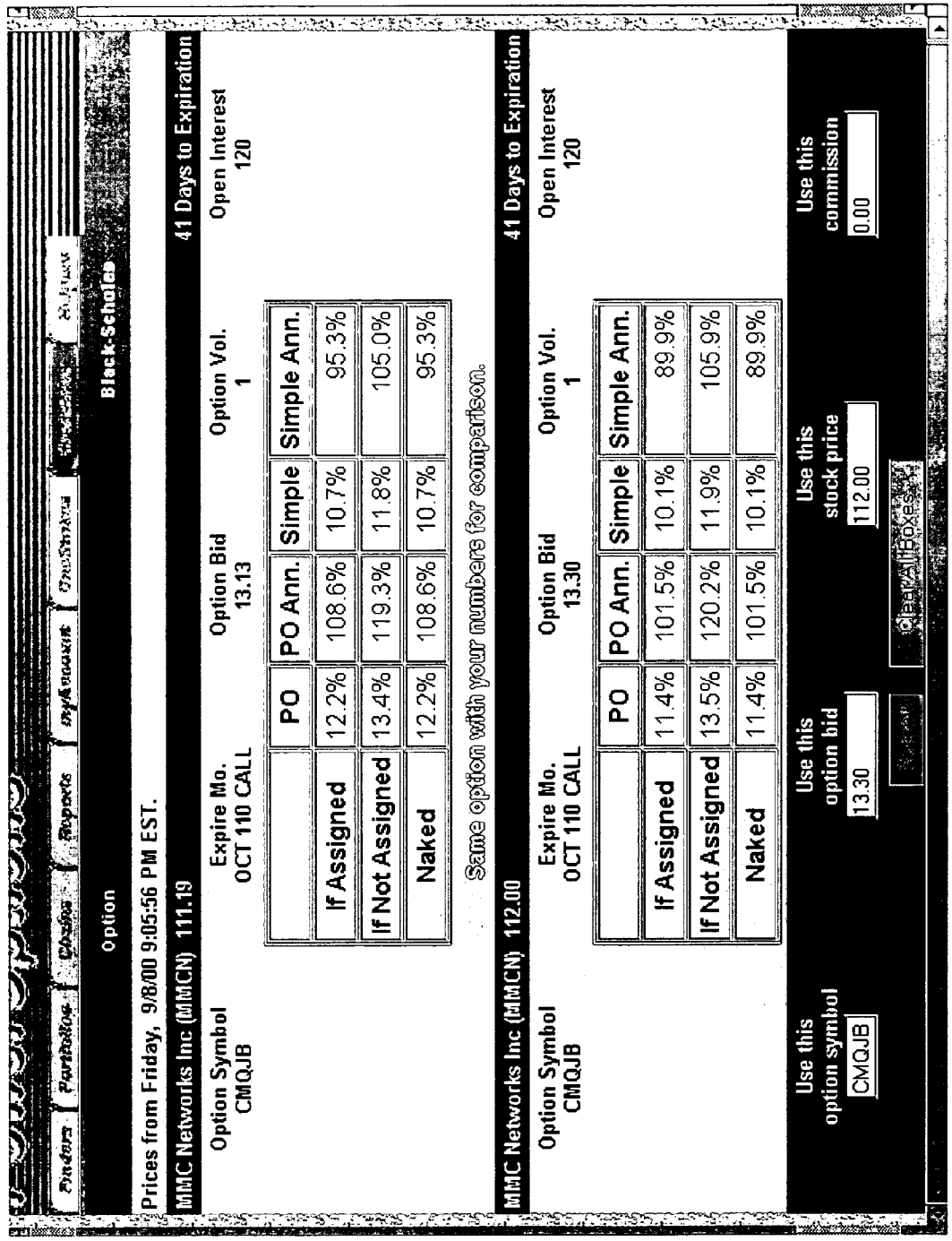
FIG. 28 is a diagram of an exemplary user interface screen for displaying an option calculator.

Referring back to FIG. 8, the system further provides a calculator function 820 for calculating the percentage return on an investment if the price of the stock or stock option changes. The calculator function has been applied to both options 890 and to Black-Scholes 892 calculations. FIG. 28 provides a view of a user is interface screen for calculating the effect of a change in option price and stock price on an investment in a particular option. The top portion of the screen provides return information using the actual option and stock price. The return information is calculated for three different scenarios: the option is assigned, the option is not assigned, and the underlying stock is not owned (naked). Furthermore, for each of these scenarios, the return calculations are performed using four different methods: power options return; power options annualized return; simple return; and annualized simple return. The power options return for the assigned scenario is calculated as follows:

Power options return for % assigned=(option bid price+stock gain or loss)/(stock price−option bid price)

The power options return for the not assigned scenario is calculated as follows:

Power options return for % not assigned=option bid price/(stock price−option bid price)

The simple return for the assigned scenario is calculated as follows:

Simple return for % assigned=(option bid price+stock gain or loss)/stock price

The simple return for the not assigned scenario is calculated as follows:

Simple return for % not assigned=option bid price/stock price

All return calculations can be annualized by multiplying the return result by the ratio of the number of days in a year to the number of days until expiration.

The bottom portion of the screen provides these same return valuations but employ the user-defined option and stock prices in the calculations. Thus, the system provides a side-by-side comparison of the return under existing conditions and under conditions supplied by the user.

Figure 29A:
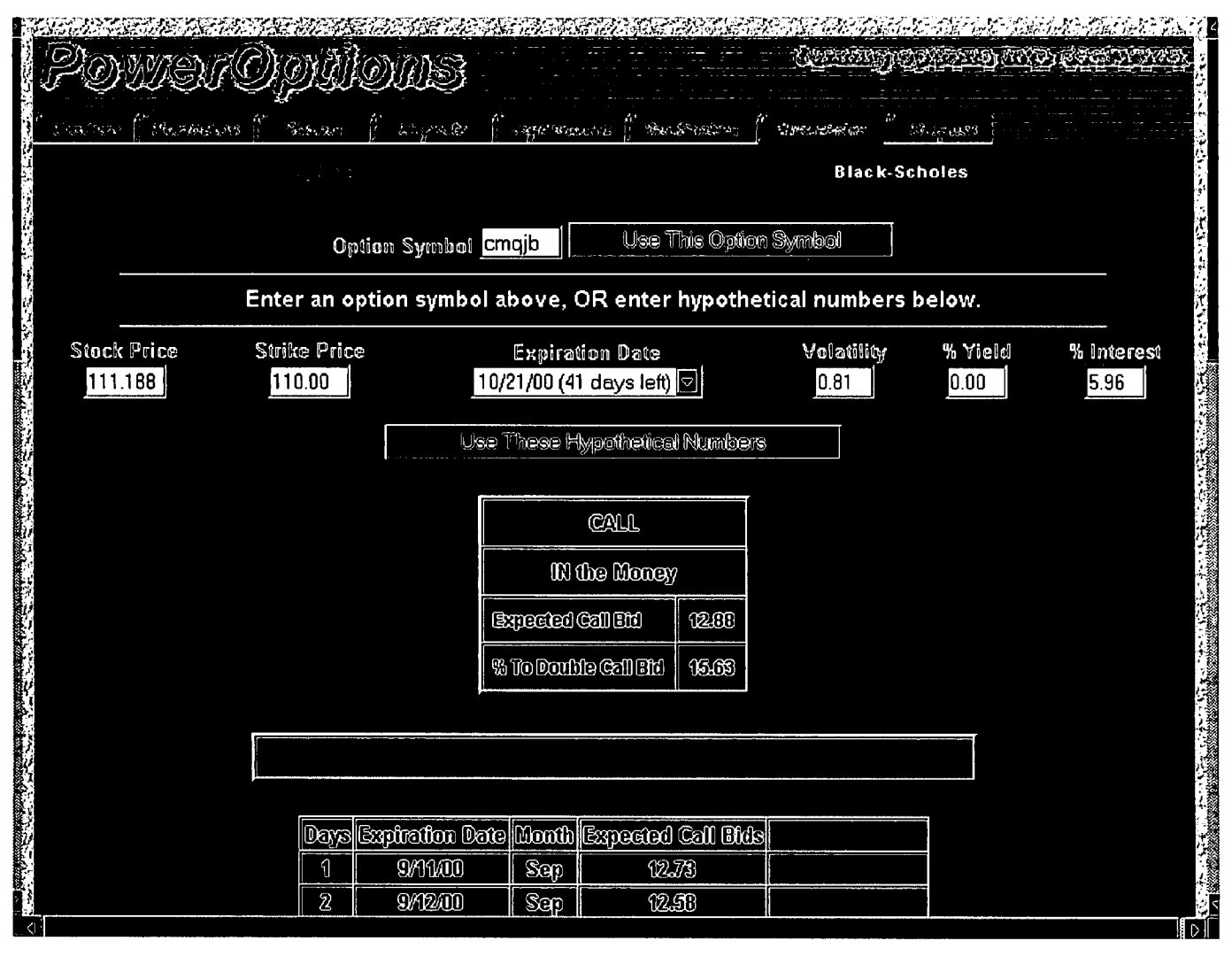
Figure 29B:
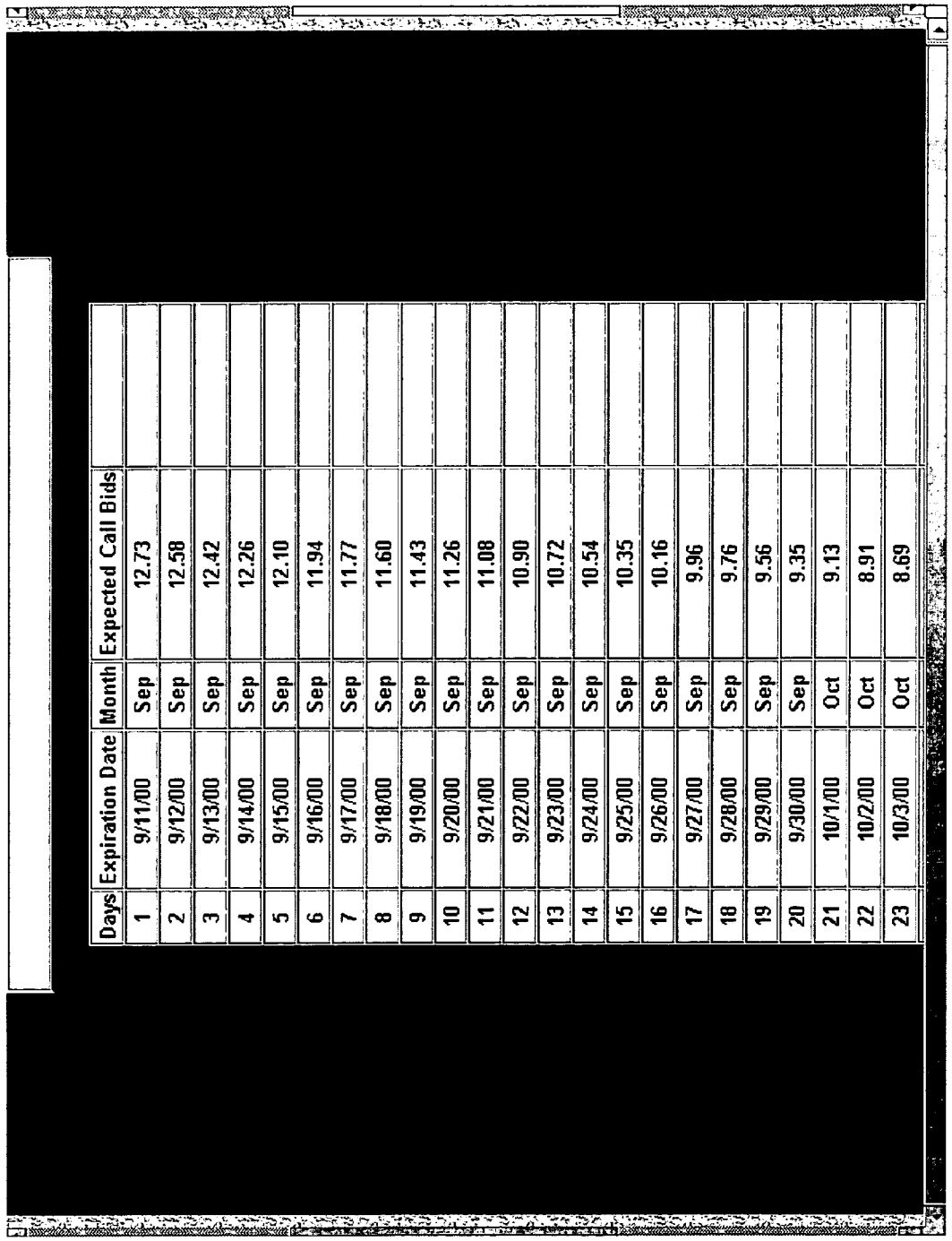

The Black-Scholes calculator function 892 provides the capability to calculate the fair market value of an option. FIGS. 29A and 29B provide a view of an exemplary screen for use in providing Black-Scholes calculator functionality. As shown in FIG. 29A, a user n may either enter an option symbol or input hypothetical D values defining various parameters of an option. Specifically, a user may input the following to define an option: stock price; strike price; expiration date; volatility; percent yield; and percent interest. As shown in FIG. 29B, the information displayed by the system in response to the user inputting either an option symbol or information defining a hypothetical option includes the following: the type of option, i.e. whether a put or call; whether the option is in-the-money or out-of-the-money; expected call bid which is the theoretical price of the call; percent to double call bid which represents the percentage change in the stock price needed to double the price of the option call bid given above it; and a breakdown of how the option price is expected to decline over time until expiration of the option.

Thus, there have been disclosed systems and methods for analyzing and searching financial instrument data. According to systems and methods in accordance with aspects of the invention, financial data associated with stocks and stock options, or any other type of instrument and its derivatives, is collected from multiple sources and calculations performed thereon to derive values for a set of searchable screening parameters. Users may access the system and provide values and ranges of values for searching the set of searchable screening parameters. In response, users are presented with the set of options and option spreads, in sorted order, that satisfy the user-supplied search values. Users may select to automatically execute a trade that is defined in the query results.

Accordingly, the systems and methods of the present invention provide users the capability to search for option spreads using a wide range of sophisticated search parameters. The system assists novice investors in formulating search values. Further, the system provides the capability to execute all of the option trades comprised in an option spread by selecting simply to execute the spread.

Those skilled in the art understand that computer readable instructions for performing the above described processes and presenting the above described screens, such as those described with reference to FIGS. 4 through 29, can be generated and stored on a computer readable medium such as a magnetic disk or CD-ROM. Further, a computer such as that described with reference to FIG. 2 may be arranged with other similarly equipped computers in a network, and each computer may be loaded with computer readable instructions for performing the above described processes.

While the invention has been described and illustrated with reference to specific embodiments, those skilled in the art will recognize that modification and variations may be made without departing from the principles of the invention as described above and set forth in the following claims. For example, the invention may be applied to gather and sort data related to financial instruments other than stock options. Thus, the invention could be applied to gather and make accessible financial data related to stocks, bonds, mutual funds, commodities, currencies, indexes, and their derivatives. Accordingly, reference should be made to the appended claims as indicating the scope of the invention.

What is claimed is:

1. A computer-implemented method of processing financial instrument data to identify stock option spreads, comprising:

receiving by a computer system financial data from at least one data source;

processing within the computer system the financial data to derive values for a set of searchable parameters corresponding to stock option spreads;

receiving by the computer system user defined search criteria for searching the searchable parameters corresponding to the stock option spreads;

searching by the computer system the values derived for the set of searchable parameters for values having the user defined search criteria; and formatting at the computer system results from searching, the formatting results comprising creating a list of option spreads having values for the set of searchable parameters that match the user defined search criteria, wherein processing within the computer system the financial data to derive values for a set of searchable parameters comprises calculating values for a plurality of searchable parameters including, but not limited to, percentage returns for a plurality of different option spreads, wherein receiving by the computer system user defined search criteria comprises receiving a plurality of user defined search criteria including, but not limited to, a value relating to percentage return, and wherein searching by the computer system the values derived for the set of searchable parameters for values having the user defined criteria comprises searching for option spreads with a percentage return satisfying the value relating to percentage return.

2. The computer-implemented method of claim 1, wherein said step of processing within the computer system the financial data to derive values for a set of searchable parameters corresponding to stock option spreads comprises processing the financial data to derive values for at least one of the following: bull-put spreads; bear call spreads; collar spreads; strangle spreads; butterfly spreads; straddle spreads; and calendar spreads.

3. The computer-implemented method of claim 1, wherein said step of processing within the computer system the financial data to derive values for a set of searchable parameters corresponding to stock option spreads comprises the step of processing the financial data to derive values for at least one of the following searchable parameters: Black-Scholes ratio; option volume percentage; implied volatility; percentage to double; industry groupings; recommended listings; net credit; break even; whether in-the-money; whether out-of-the-money; and percentage return on an option spread.

4. The computer-implemented method of claim 1, further comprising:
   transmitting from the computer system to a user a series of questions regarding investment preferences;
   receiving by the computer system responses to said series of questions; and
   formulating by the computer system from said responses, search criteria for searching the searchable parameters.

5. The computer-implemented method of claim 1, further comprising the steps of:
   receiving by the computer system a request to execute one of the set of option spreads; and
   forwarding by the computer system said request to execute one of the set of option spreads to a brokerage computer system operable to execute trades on stocks and stock options, wherein said request entails executing trades on a plurality of stock options.

6. The computer-implemented method of claim 1, wherein formatting at the computer system results from searching, the results comprising a list of option spreads, comprises ordering the list in a user-specified manner.

7. The computer-implemented method of claim 1, wherein formatting at the computer system results from searching, the results comprising a list of option spreads, comprises formatting a set of option spreads, said set of option spreads including a list of option spreads having options expiring in the same month.

8. A computer-implemented method for processing trades in a computer system of financial instrument strategies including multiple financial instruments, comprising:
   a computing system receiving a request to execute a trade of a financial instrument strategy;
   the computing system formulating a trade request defining trades to be executed on a plurality of financial instruments included in the financial instrument strategy; and
   the computing system routing the trade request to a brokerage.

9. A system for processing financial instrument data to identify stock option spreads, comprising:
   a communication device for receiving data from external systems;
   a processing device in communication with said communication device, wherein said processing device is programmed to perform the following:
   receiving financial data via said communication device from at least one data source;
   processing the financial data to derive values for a set of searchable parameters corresponding to stock option spreads;
   receiving user defined search criteria for searching the searchable parameters corresponding to the stock option spreads;
   searching the values derived for the set of searchable parameters for values having the user defined search criteria; and
   identifying a set of option spreads corresponding to values for the set of searchable parameters matching the user defined search criteria
   wherein processing the financial data to derive values for a set of searchable parameters comprises calculating values for a plurality of searchable parameters including, but not limited to, percentage returns for a plurality of different option spreads,
   wherein receiving user defined search criteria comprises receiving a plurality of user defined search criteria including, but not limited to, a value relating to percentage return, and
   wherein searching the values derived for the set of searchable parameters for values having the user defined criteria comprises searching for option spreads with a percentage return satisfying the value relating to percentage return.

10. The computer-implemented method of claim 1, wherein said step of receiving financial data from at least one data source comprises the step of receiving for at least one stock option, at least one of the following: option symbol; underlying stock symbol; stock as price; option expiration date; option strike price; option bid; option volume; open interest; p/e ratio; average recommendation; the number of common shares outstanding; beta; company name; and Zack's indicator.

11. The computer-implemented method of claim 3, wherein said step of processing the financial data to derive values for a set of searchable parameters corresponding to stock option spreads further comprises the step of receiving at least one of the following: percentage if not assigned; percentage if assigned; percentage earnings per share growth; percentage range; stock percentage volume; percentage yield; delta; implied volatility; and historical price volatility.

12. The computer-implemented method of claim 1, wherein said step of processing the financial data to derive values for a set of searchable parameters corresponding to stock option spreads comprises the step of processing the financial data to derive the percentage return on a stock option spread.

13. The computer-implemented method of claim 1, further comprising the step of determining if the user defined search criteria are operable for searching the searchable parameters.

14. The computer-implemented method of claim 1, wherein the step of receiving user defined search criteria for searching the searchable parameters comprises the step of receiving search criteria for at least one of the following: percentage return; net credit; stock price of underlying stock; percentage earnings per share growth; price to earnings ratio; percentage of range between the year's high and low stock price; average broker recommendation; percentage change in volume; number of shares outstanding; percent yield; beta; size of company; and volatility.

15. The computer-implemented method of claim 14 wherein said step of receiving user defined search criteria for searching the searchable parameters further comprises the step of receiving search criteria identifying an industry segment.

16. The computer-implemented method of claim 14 wherein said step of receiving user defined search criteria for searching the searchable parameters further comprises the step of receiving search criteria identifying a recommended list.

17. The computer-implemented method of claim 16, wherein said step of receiving search criteria identifying a recommended list comprises the step of receiving search criteria identifying a user defined customized list.

18. The computer-implemented method of claim 1, further comprising the step of receiving sorting criteria for sorting stock option spreads.

19. The computer-implemented method of claim 18, wherein said step of receiving sorting criteria for sorting stock option spreads comprises the step of receiving criteria identifying sorting stock option spreads by at least one of the following: percent return; net credit; stock price; option bid price; option volume; open interest; percentage option volume; company name; percentage earnings per share; price to earnings ratio; percentage range; average brokerage recommendation; percentage volume; shares outstanding; expiration date; percentage yield; beta; volatility; Black-Scholes ratio; delta; implied volatility; break even; whether in-the-money; whether out-of-the-money; and percent to double.

20. The computer-implemented method of claim 19, wherein said step of receiving sorting criteria further comprises the step of receiving criteria identifying sorting on options coming due in a particular month.

21. The computer-implemented method of claim 19, wherein said step of receiving sorting criteria further comprises the step of receiving criteria identifying sorting results from high-to-low or low-to-high.

22. The computer-implemented method of claim 1, wherein said step of receiving user defined search criteria comprises the step of receiving criteria identifying searching for stock option spreads in-the-money or stock option spreads out-of-the- money.

23. The computer-implemented method of claim 1, wherein said step of formatting results from searching, the results comprising a list of option spreads having values for the set of searchable parameters that match the user defined search criteria comprises the step of compiling a list of stock option spreads, wherein the list identifies for each stock option spread at least one of the following: stock symbol; stock price; option symbol; strike price; bid; ask; percentage return on spread; net credit; break even; volatility; and company name.

24. The computer-implemented method of claim 1, further comprising the step of saving user defined search criteria for searching the searchable parameters corresponding to the stock option spreads.

25. The computer-implemented method of claim 24, further comprising, in response to a user request, the step of searching the values derived for the set of searchable parameters for values having the saved user defined search criteria.

26. The computer-implemented method of claim 1, wherein said step of formatting by the computer system a list of option spreads comprises the step of formatting a set of option spreads, said set of option spreads including a list of option spreads having options expiring in different months.

27. The system of claim 9, wherein said processing device is programmed, in connection with processing the financial data to derive values for a set of searchable parameters corresponding to stock option spreads, to process the financial data to derive values for at least one of the following: bull-put spreads; bear call spreads; collar spreads; strangle spreads; butterfly spreads; straddle spreads; and calendar spreads.

28. The system of claim 9, wherein said processing device is programmed, in connection with processing the financial data to derive values for a set of searchable parameters corresponding to stock option spreads, to process the financial data to derive values for at least one of the following searchable parameters: Black-Scholes ratio; option volume percentage; implied volatility; percentage to double; industry groupings; recommended listings; net credit; break even; whether in-the-money; whether out-of-the-money; and percentage return on an option spread.

29. The system of claim 9, wherein said processing device is programmed to further perform:
transmitting from the system to a user a series of questions regarding investment preferences;
receiving by the system responses to said series of questions; and
formulating by the system from said responses, search criteria for searching the searchable parameters.

30. The system of claim 9, wherein said processing device is programmed to further perform:
receiving by the system a request to execute one of the set of option spreads; and
forwarding by the system said request to execute one of the set of option spreads to a brokerage computer system operable to execute trades on stocks and stock options, wherein said request entails executing trades on a plurality of stock options.

31. The system of claim 9, wherein said processing device is programmed, in connection with identifying a set of options spreads, to order a list of option spreads in a user-specified manner.

32. The system of claim 9, wherein said processing device is programmed, in connection with identifying a set of option spreads, to format a set of option spreads, said set of option spreads including a list of option spreads having options expiring in the same month.

33. The system of claim 9, wherein said processing device is programmed, in connection with receiving financial data from at least one data source, to receive for at least one stock option, at least one of the following: option symbol; underlying stock symbol; stock as price; option expiration date; option strike price; option bid; option volume; open interest; p/e ratio; average recommendation; the number of common shares outstanding; beta; company name; and Zack's indicator.

34. The system of claim 33, wherein said processing device is programmed, in connection with processing the financial data to derive values for a set of searchable parameters corresponding to stock option spreads, to receive at least one of the following: percentage if not assigned; percentage if assigned; percentage earnings per share growth; percentage range; stock percentage volume; percentage yield; delta; implied volatility; and historical price volatility.

35. The system of claim 9, wherein said processing device is programmed, in connection with processing the financial data to derive values for a set of searchable parameters corresponding to stock option spreads, to process the financial data to derive the percentage return on a stock option spread.

36. The system of claim 9, wherein said processing device is programmed to further perform determining if the user defined search criteria are operable for searching the searchable parameters.

37. The system of claim 9, wherein said processing device is programmed, in connection with receiving user defined search criteria for searching the searchable parameters, to receive search criteria for at least one of the following: percentage return; net credit; stock price of underlying stock; percentage earnings per share growth; price to earnings ratio; percentage of range between the year's high and low stock price; average broker recommendation; percentage change in volume; number of shares outstanding; percent yield; beta; size of company; and volatility.

38. The system of claim 37 wherein said processing device is programmed, in connection with receiving user defined search criteria for searching the searchable parameters, to receive search criteria identifying an industry segment.

39. The system of claim 37 wherein said processing device is programmed, in connection with receiving user defined search criteria for searching the searchable parameters, to receive search criteria identifying a recommended list.

40. The system of claim 39, wherein said processing device is programmed, in connection with receiving search criteria identifying a recommended list, to receive search criteria identifying a user defined customized list.

41. The system of claim 9, wherein said processing device is programmed to receive sorting criteria for sorting stock option spreads.

42. The system of claim 41, wherein said processing device is programmed, in connection with receiving sorting criteria for sorting stock option spreads, to receive criteria identifying sorting stock option spreads by at least one of the following: percent return; net credit; stock price; option bid price; option volume; open interest; percentage option volume; company name; percentage earnings per share; price to earnings ratio; percentage range; average brokerage recommendation; percentage volume; shares outstanding; expiration date; percentage yield; beta; volatility; Black-Scholes ratio; delta; implied volatility; break even; whether in-the-money; whether out-of-the-money; and percent to double.

43. The system of claim 42, wherein said processing device is programmed, in connection with receiving sorting criteria, to receive criteria identifying sorting on options coming due in a particular month.

44. The system of claim 42, wherein said processing device is programmed, in connection with receiving sorting criteria, to receive criteria identifying sorting results from high-to-low or low-to-high.

45. The system of claim 9, wherein said processing device is programmed, in connection with receiving user defined search criteria, to receive criteria identifying searching for stock option spreads in-the-money or stock option spreads out-of-the- money.

46. The system of claim 9, wherein said processing device is programmed, in connection with identifying a set of option spreads corresponding to values for the set of searchable parameters matching the user defined search criteria, to compile a list of stock option spreads, wherein the list identifies for each stock option spread at least one of the following: stock symbol; stock price; option symbol; strike price; bid; ask; percentage return on spread; net credit; break even; volatility; and company name.

47. The system of claim 9, wherein said processing device is programmed to save user defined search criteria for searching the searchable parameters corresponding to the stock option spreads.

48. The system of claim 47, wherein said processing device is programmed, in response to a user request, to search the values derived for the set of searchable parameters for values having the saved user defined search criteria.

* * * * *